(12) United States Patent
Hsieh

(10) Patent No.: US 12,527,764 B2
(45) Date of Patent: Jan. 20, 2026

(54) METHODS AND COMPOSITIONS FOR TREATING ANDROGEN RECEPTOR DEFICIENT, ANDROGEN RECEPTOR LOW, AND CASTRATION-RESISTANT PROSTATE CANCERS

(71) Applicant: FRED HUTCHINSON CANCER CENTER, Seattle, WA (US)

(72) Inventor: Andrew Hsieh, Seattle, WA (US)

(73) Assignee: Fred Hutchinson Cancer Center, Seattle, WA (US)

( * ) Notice: Subject to any disclaimer, the term of this patent is extended or adjusted under 35 U.S.C. 154(b) by 812 days.

(21) Appl. No.: 17/629,333

(22) PCT Filed: Jul. 23, 2020

(86) PCT No.: PCT/US2020/043203
§ 371 (c)(1),
(2) Date: Jan. 21, 2022

(87) PCT Pub. No.: WO2021/016422
PCT Pub. Date: Jan. 28, 2021

(65) Prior Publication Data
US 2022/0249439 A1 Aug. 11, 2022

Related U.S. Application Data

(60) Provisional application No. 62/877,732, filed on Jul. 23, 2019.

(51) Int. Cl.
| | |
|---|---|
| *A61K 38/00* | (2006.01) |
| *A61K 31/167* | (2006.01) |
| *A61K 31/277* | (2006.01) |
| *A61K 31/4025* | (2006.01) |
| *A61K 31/4166* | (2006.01) |
| *A61K 31/4188* | (2006.01) |
| *A61K 31/426* | (2006.01) |
| *A61K 31/427* | (2006.01) |
| *A61K 31/4439* | (2006.01) |
| *A61K 31/519* | (2006.01) |
| *A61K 31/58* | (2006.01) |
| *A61K 38/09* | (2006.01) |
| *A61P 35/00* | (2006.01) |

(52) U.S. Cl.
CPC ........ *A61K 31/4025* (2013.01); *A61K 31/167* (2013.01); *A61K 31/277* (2013.01); *A61K 31/4166* (2013.01); *A61K 31/4188* (2013.01); *A61K 31/426* (2013.01); *A61K 31/427* (2013.01); *A61K 31/4439* (2013.01); *A61K 31/519* (2013.01); *A61K 31/58* (2013.01); *A61K 38/09* (2013.01); *A61P 35/00* (2018.01)

(58) Field of Classification Search
CPC .............. A61K 31/4025; A61K 31/167; A61K 31/277; A61K 31/4166; A61K 31/4188; A61K 31/426; A61K 31/427; A61K 31/4439; A61K 31/519; A61K 31/58; A61K 38/09
See application file for complete search history.

(56) References Cited

U.S. PATENT DOCUMENTS

2015/0374707 A1 12/2015 Wagner et al.

FOREIGN PATENT DOCUMENTS

WO WO-2006078942 A2 * 7/2006 ........... A61K 31/426

OTHER PUBLICATIONS

International Preliminary Report on Patentability mailed Jan. 25, 2022, issued in corresponding International Application No. PCT/US2020/043203, filed Jul. 23, 2020, 6 pages.
Armstrong, Andrew J., et al. "A pharmacodynamic study of rapamycin in men with intermediate-to high-risk localized prostate cancer." Clinical cancer research 16.11 (2010). 17 pages.
Beltran, Himisha, et al. "Divergent clonal evolution of castration-resistant neuroendocrine prostate cancer." Nature medicine 22.3 (2016). 24 pages.
Bianchini, Andrea, et al. "Phosphorylation of eIF4E by MNKs supports protein synthesis, cell cycle progression and proliferation in prostate cancer cells." Carcinogenesis 29.12 (2008): 2279-2288.
Bluemn, Eric G., et al. "Androgen receptor pathway-independent prostate cancer is sustained through FGF signaling." Cancer cell 32.4 (2017): 474-489, e1-e6.
Cencic, Regina, et al. "Blocking eIF4E-eIF4G interaction as a strategy to impair coronavirus replication." Journal of virology 85.13 (2011): 6381-6389.
Cencic, Regina, et al. "Reversing chemoresistance by small molecule inhibition of the translation initiation complex eIF4F." Proceedings of the National Academy of Sciences 108.3 (2011): 1046-1051.
De Bono, Johann S., et al. "Abiraterone and increased survival in metastatic prostate cancer." New England Journal of Medicine 364.21 (2011): 1995-2005.
Dehm, Scott M., and Donald J. Tindall. "Androgen receptor structural and functional elements: role and regulation in prostate cancer." Molecular endocrinology 21.12 (2007): 2855-2863.
Dowling, Ryan Jo, et al. "mTORC1-mediated cell proliferation, but not cell growth, controlled by the 4E-BPs." Science 328.5982 (2010). 9 pages.
Dubois, Vanessa, et al. "Androgen deficiency exacerbates high-fat diet-induced metabolic alterations in male mice." Endocrinology 157.2 (2016): 648-665.

(Continued)

*Primary Examiner* — Jeanette M Lieb
(74) *Attorney, Agent, or Firm* — Christensen O'Connor Johnson Kindness PLLC

(57) ABSTRACT

Methods and compositions for treatment of prostate cancers, such as androgen receptor (AR) deficient and androgen receptor (AR) low cancers, are disclosed. The methods include administration of an agent that inhibits activity of eIF4F or an agent that disrupts the eIF4F translation-initiation complex (composed of eIF4E, eIF4A, and eIF4G).

5 Claims, 57 Drawing Sheets

Specification includes a Sequence Listing.

(56) References Cited

OTHER PUBLICATIONS

Furic, Luc, et al. "eIF4E phosphorylation promotes tumorigenesis and is associated with prostate cancer progression." Proceedings of the National Academy of Sciences 107.32 (2010): 14134-14139.
Graham, Laura, et al. "A phase II study of the dual mTOR inhibitor MLN0128 in patients with metastatic castration resistant prostate cancer." Investigational new drugs 36.3 (2018). 18 pages.
Hsieh, Andrew C., Eric J. Small, and Charles J. Ryan. "Androgen-response elements in hormone-refractory prostate cancer: implications for treatment development." The lancet oncology 8.10 (2007): 933-939.
Hisieh, Andrew C., et al. "Cell type-specific abundance of 4EBP1 primes prostate cancer sensitivity or resistance to PI3K pathway inhibitors." Science signaling 8.403 (2015). 20 pages.
Hsieh, Andrew C., et al. "Genetic dissection of the oncogenic mTOR pathway reveals druggable addiction to translational control via 4EBP-eIF4E." Cancer cell 17.3 (2010): 249-261.
Hsieh, Andrew C., and Davide Ruggero. "Targeting eukaryotic translation initiation factor 4E (eIF4E) in cancer." Clinical cancer research 16.20 (2010): 4914-4920.
Hsieh, Andrew C., et al. "The translational landscape of mTOR signalling steers cancer initiation and metastasis." Nature 485.7396 (2012). 24 pages.
Lawrence Jr, John C., and Robert T. Abraham. "PHAS/4E-BPs as regulators of mRNA translation and cell proliferation." Trends in biochemical sciences 22.9 (1997): 345-349.
Le Bacquer, Olivier, et al. "Elevated sensitivity to diet-induced obesity and insulin resistance in mice lacking 4E-BP1 and 4E-BP2." The Journal of clinical investigation 117.2 (2007): 387-396.
Moerke, Nathan J., et al. "Small-molecule inhibition of the interaction between the translation initiation factors eIF4E and eIF4G." Cell 128.2 (2007): 257-267.
Thoreen, Carson C., et al. "A unifying model for mTORC1-mediated regulation of mRNA translation." Nature 485.7396 (2012). 17 pages.
Tran, Chris, et al. "Development of a second-generation antiandrogen for treatment of advanced prostate cancer." Science 324.5928 (2009). 11 pages.
Tsai, Shih-Yin, et al. "Increased 4E-BP1 expression protects against diet-induced obesity and insulin resistance in male mice." Cell reports 16.7 (2016). 13 pages.
Watson, Philip A., Vivek K. Arora, and Charles L. Sawyers. "Emerging mechanisms of resistance to androgen receptor inhibitors in prostate cancer." Nature Reviews Cancer 15.12 (2015). 27 pages.
Wei, Xiao X., et al. "A phase I study of abiraterone acetate combined with BEZ235, a dual PI3K/mTOR inhibitor, in metastatic castration resistant prostate cancer." The oncologist 22.5 (2017): 503-e43.
Wu, Chun-Te, et al. "Increased prostate cell proliferation and loss of cell differentiation in mice lacking prostate epithelial androgen receptor." Proceedings of the National Academy of Sciences 104.31 (2007): 12679-12684.
Yanagiya, Akiko, et al. "Translational homeostasis via the mRNA cap-binding protein, eIF4E." Molecular cell 46.6 (2012): 847-858.
Ramamurthy et al., "Simultaneous Targeting of Androgen Receptor (AR) and MAPK-interacting Kinases (MNKS) by Novel Retinamides Inhibits Growth of Human Prostate Cancer Cell Lines," Oncotarget, (6)5: 3195-3210, Dec. 2014.
International Search Report and Written Opinion mailed Oct. 28, 2020, issued in corresponding International Application No. PCT/US2020/43203, filed Jul. 23, 2020, 8 pages.

* cited by examiner

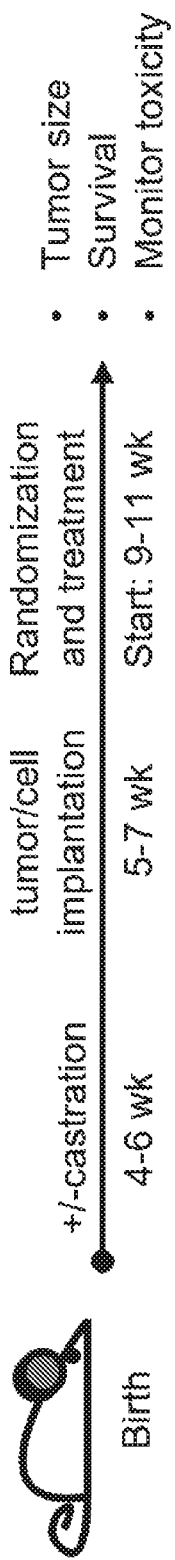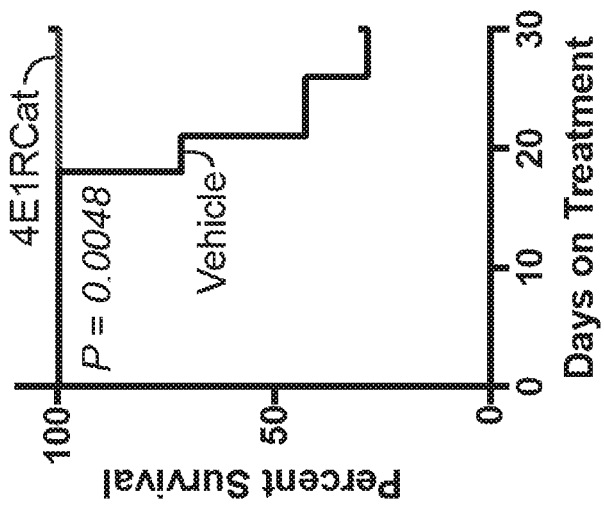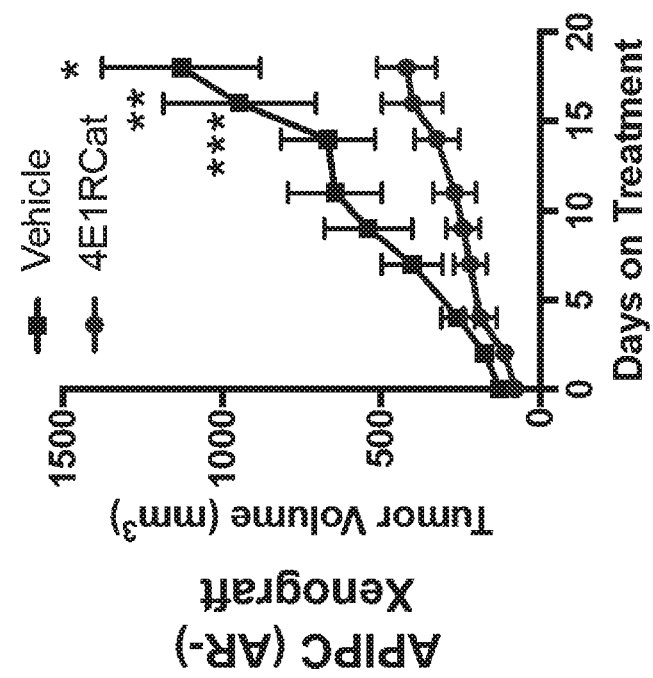
*FIG. 6A*
*FIG. 6B*
*FIG. 6C*

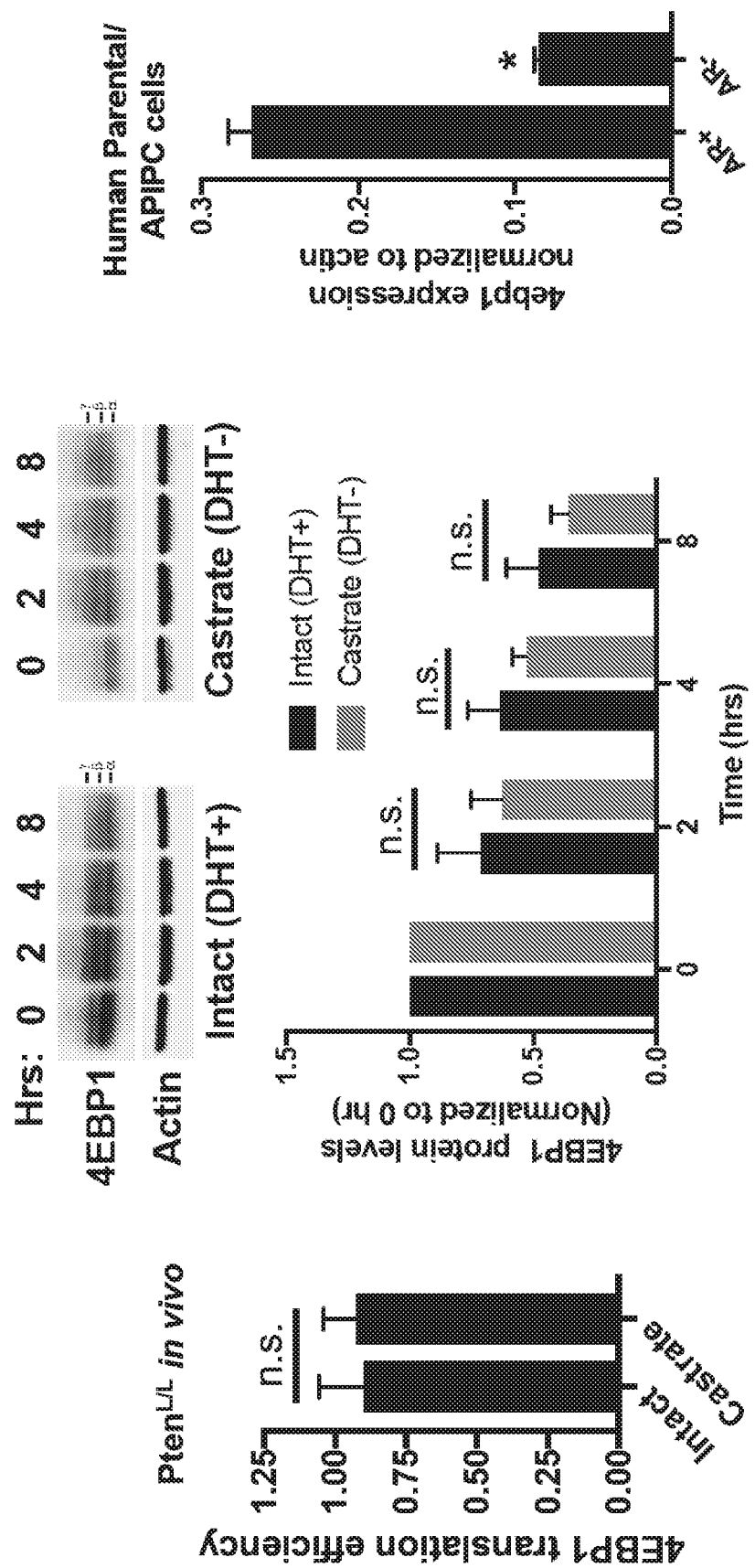

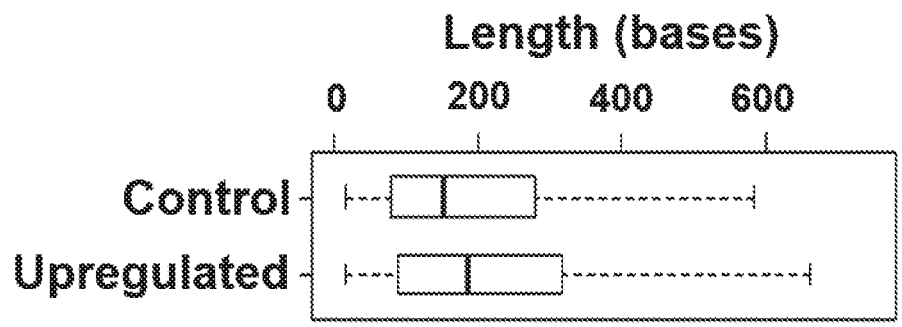
*FIG. 12A*
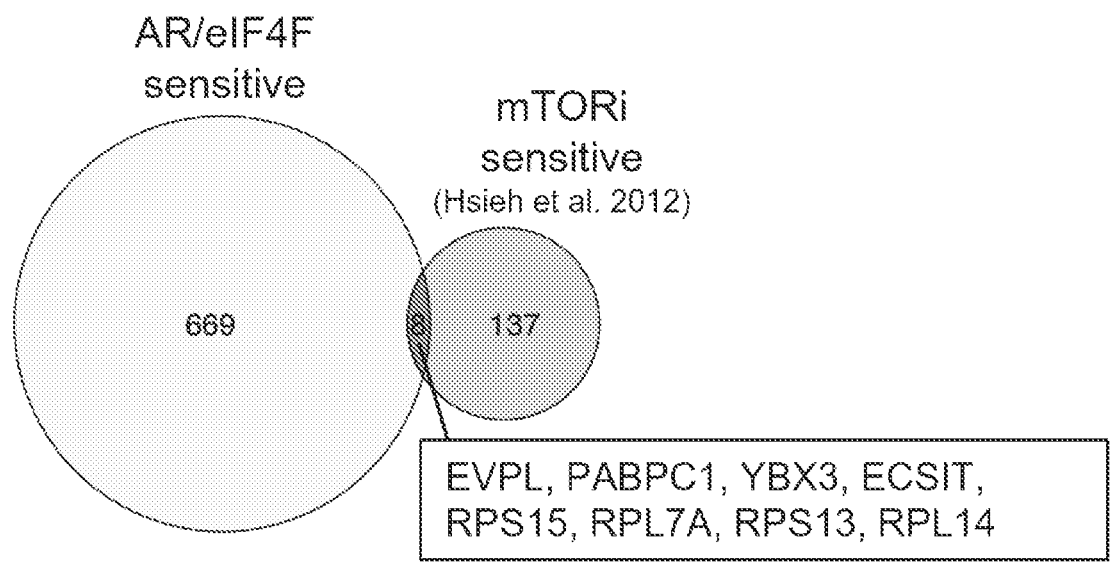
*FIG. 12B*
| Motif | Control 5' UTR | AR/eIF4F sensitive | mTORi sensitive (Hsieh et al. 2012) |
|---|---|---|---|
| GRTE | 39.6% | 66.8% $p = 6.32 \times 10^{-14}$ | 30.0% $p = 0.1278$ |
| PRTE/TOP-like element | 13.7% | 12.3% $p = 0.6955$ | 36.8% $p < 2.2 \times 10^{-16}$ |
*FIG. 12C*

| | − 4EBP1$^M$ | + 4EBP1$^M$ |
|---|---|---|
| Microinvasion (>1) | 7/9 | 2/8 |
| Carcinoma | 4/9 | 0/8 |

SEQUENCE LISTING

<160> NUMBER OF SEQ ID NOS: 30

<210> SEQ ID NO 1
<211> LENGTH: 33
<212> TYPE: DNA
<213> ORGANISM: Artificial sequence
<220> FEATURE:
<223> OTHER INFORMATION: Synthetic

<400> SEQUENCE: 1
ccgctcgagc ggcccttgga ataagtgacg cct        33

<210> SEQ ID NO 2
<211> LENGTH: 30
<212> TYPE: DNA
<213> ORGANISM: Artificial sequence
<220> FEATURE:
<223> OTHER INFORMATION: Synthetic

<400> SEQUENCE: 2
gaagatcttc cgggtaggtt tcatcagcgt        30

<210> SEQ ID NO 3
<211> LENGTH: 28
<212> TYPE: DNA
<213> ORGANISM: Artificial sequence
<220> FEATURE:
<223> OTHER INFORMATION: Synthetic

<400> SEQUENCE: 3
ccgctcgagc aggagaggcc tggcctgg        28

<210> SEQ ID NO 4
<211> LENGTH: 30

<212> TYPE: DNA
<213> ORGANISM: Artificial sequence
<220> FEATURE:
<223> OTHER INFORMATION: Synthetic

<400> SEQUENCE: 4
gaagatctag gagcaaaaag gggtgggggc                                        30

<210> SEQ ID NO 5
<211> LENGTH: 18
<212> TYPE: DNA
<213> ORGANISM: Artificial sequence
<220> FEATURE:
<223> OTHER INFORMATION: Synthetic

<400> SEQUENCE: 5
gggcctgggg ggcagggc                                                     18

<210> SEQ ID NO 6
<211> LENGTH: 22
<212> TYPE: DNA
<213> ORGANISM: Artificial sequence
<220> FEATURE:
<223> OTHER INFORMATION: Synthetic

<400> SEQUENCE: 6
tgcactacac cagacgccgc cc                                                22

<210> SEQ ID NO 7
<211> LENGTH: 18
<212> TYPE: DNA
<213> ORGANISM: Artificial sequence
<220> FEATURE:
<223> OTHER INFORMATION: Synthetic

<400> SEQUENCE: 7
gatgagcctc ccatgcaa                                                     18

<210> SEQ ID NO 8
<211> LENGTH: 24
<212> TYPE: DNA
<213> ORGANISM: Artificial sequence
<220> FEATURE:
<223> OTHER INFORMATION: Synthetic

<400> SEQUENCE: 8
aatgtccatc tcaaattgtg actc                                              24

<210> SEQ ID NO 9
<211> LENGTH: 20
<212> TYPE: DNA
<213> ORGANISM: Artificial sequence
<220> FEATURE:
<223> OTHER INFORMATION: Synthetic

<400> SEQUENCE: 9
ctagccctac cagcgatgag                                                   20

<210> SEQ ID NO 10
<211> LENGTH: 20
<212> TYPE: DNA
<213> ORGANISM: Artificial sequence
<220> FEATURE:
<223> OTHER INFORMATION: Synthetic

<400> SEQUENCE: 10
aattgtgact cttcaccgcc                                               20

<210> SEQ ID NO 11
<211> LENGTH: 20
<212> TYPE: DNA
<213> ORGANISM: Artificial sequence
<220> FEATURE:
<223> OTHER INFORMATION: Synthetic

<400> SEQUENCE: 11
ggggtcacta gccctaccag                                               20

<210> SEQ ID NO 12
<211> LENGTH: 22
<212> TYPE: DNA
<213> ORGANISM: Artificial sequence
<220> FEATURE:
<223> OTHER INFORMATION: Synthetic

<400> SEQUENCE: 12
caaattgtga ctcttcaccg cc                                            22

<210> SEQ ID NO 13
<211> LENGTH: 20
<212> TYPE: DNA
<213> ORGANISM: Artificial sequence
<220> FEATURE:
<223> OTHER INFORMATION: Synthetic

<400> SEQUENCE: 13
tcaccagccc ttccagtgat                                               20

<210> SEQ ID NO 14
<211> LENGTH: 20
<212> TYPE: DNA
<213> ORGANISM: Artificial sequence
<220> FEATURE:
<223> OTHER INFORMATION: Synthetic

<400> SEQUENCE: 14
actgtgactc ttcaccgccc                                               20

<210> SEQ ID NO 15
<211> LENGTH: 18
<212> TYPE: DNA
<213> ORGANISM: Artificial sequence
<220> FEATURE:
<223> OTHER INFORMATION: Synthetic

<400> SEQUENCE: 15
gcgggcggtg aagagtca                                                 18

<210> SEQ ID NO 16
<211> LENGTH: 21
<212> TYPE: DNA
<213> ORGANISM: Artificial sequence
<220> FEATURE:
<223> OTHER INFORMATION: Synthetic

<400> SEQUENCE: 16
cttggtagtg ctccacacga t                                             21

<210> SEQ ID NO 17
<211> LENGTH: 23
<212> TYPE: DNA
<213> ORGANISM: Artificial sequence

```
<220> FEATURE:
<223> OTHER INFORMATION: Synthetic

<400> SEQUENCE: 17
ccgggaggta ccaggatcat cta                                             23

<210> SEQ ID NO 18
<211> LENGTH: 20
<212> TYPE: DNA
<213> ORGANISM: Artificial sequence
<220> FEATURE:
<223> OTHER INFORMATION: Synthetic

<400> SEQUENCE: 18
cagatccctt gggggtgttt                                                 20

<210> SEQ ID NO 19
<211> LENGTH: 23
<212> TYPE: DNA
<213> ORGANISM: Artificial sequence
<220> FEATURE:
<223> OTHER INFORMATION: Synthetic

<400> SEQUENCE: 19
cattggtgaa tttgagatca ttg                                             23

<210> SEQ ID NO 20
<211> LENGTH: 20
<212> TYPE: DNA
<213> ORGANISM: Artificial sequence
<220> FEATURE:
<223> OTHER INFORMATION: Synthetic

<400> SEQUENCE: 20
gggcttataa cgccacactt                                                 20

<210> SEQ ID NO 21
<211> LENGTH: 20
<212> TYPE: DNA
<213> ORGANISM: Artificial sequence
<220> FEATURE:
<223> OTHER INFORMATION: Synthetic

<400> SEQUENCE: 21
ctgcctctca gaaccagacc                                                 20

<210> SEQ ID NO 22
<211> LENGTH: 24
<212> TYPE: DNA
<213> ORGANISM: Artificial sequence
<220> FEATURE:
<223> OTHER INFORMATION: Synthetic

<400> SEQUENCE: 22
ttcattagga acttggaggt ggag                                            24

<210> SEQ ID NO 23
<211> LENGTH: 20
<212> TYPE: DNA
<213> ORGANISM: Artificial sequence
<220> FEATURE:
<223> OTHER INFORMATION: Synthetic

<400> SEQUENCE: 23
gtggccagag gtggatgacg                                                 20
```

```
<210> SEQ ID NO 24
<211> LENGTH: 22
<212> TYPE: DNA
<213> ORGANISM: Artificial sequence
<220> FEATURE:
<223> OTHER INFORMATION: Synthetic

<400> SEQUENCE: 24
aagtttgctc agctctctac cc                                              22

<210> SEQ ID NO 25
<211> LENGTH: 20
<212> TYPE: DNA
<213> ORGANISM: Artificial sequence
<220> FEATURE:
<223> OTHER INFORMATION: Synthetic

<400> SEQUENCE: 25
cgacgtatcc acttctgcga                                                 20

<210> SEQ ID NO 26
<211> LENGTH: 20
<212> TYPE: DNA
<213> ORGANISM: Artificial sequence
<220> FEATURE:
<223> OTHER INFORMATION: Synthetic

<400> SEQUENCE: 26
gtagggcttc tcgcccgtat                                                 20

<210> SEQ ID NO 27
<211> LENGTH: 22
<212> TYPE: DNA
<213> ORGANISM: Artificial sequence
<220> FEATURE:
<223> OTHER INFORMATION: Synthetic

<400> SEQUENCE: 27
caatgaatac ggctacagca ac                                              22

<210> SEQ ID NO 28
<211> LENGTH: 20
<212> TYPE: DNA
<213> ORGANISM: Artificial sequence
<220> FEATURE:
<223> OTHER INFORMATION: Synthetic

<400> SEQUENCE: 28
agggagatgc tcagtgttgg                                                 20

<210> SEQ ID NO 29
<211> LENGTH: 15
<212> TYPE: DNA
<213> ORGANISM: Artificial sequence
<220> FEATURE:
<223> OTHER INFORMATION: Synthetic

<400> SEQUENCE: 29
agaccgcgtc cgccc                                                      15
```

```
<210> SEQ ID NO 30
<211> LENGTH: 21
<212> TYPE: DNA
<213> ORGANISM: Artificial sequence
<220> FEATURE:
<223> OTHER INFORMATION: Synthetic

<400> SEQUENCE: 30
atcatccatg gtgagctggc g                                              21
```

METHODS AND COMPOSITIONS FOR TREATING ANDROGEN RECEPTOR DEFICIENT, ANDROGEN RECEPTOR LOW, AND CASTRATION-RESISTANT PROSTATE CANCERS

CROSS-REFERENCE TO RELATED APPLICATION

This application is a National Stage of International Application No. PCT/US2020/43203 filed Jul. 23, 2020, which claims the benefit of U.S. Provisional Application No. 62/877,732, filed Jul. 23, 2019, which are incorporated herein by reference in their entirety.

STATEMENT OF GOVERNMENT LICENSE RIGHTS

This invention was made with government support under CA230617 awarded by the National Institutes of Health. The government has certain rights in the invention.

STATEMENT REGARDING SEQUENCE LISTING

The sequence listing associated with this application is provided in text format in lieu of a paper copy and is hereby incorporated by reference into the specification. The name of the text file containing the sequence listing is 72390_Sequence_final_2020-07-21.txt. The text file is 5.66 KB; was created on Jul. 21, 2020; and is being submitted via EFS-Web with the filing of the specification.

FIELD OF INVENTION

Methods and compositions for treatment of prostate cancers, such as androgen receptor (AR) deficient and androgen receptor (AR) low cancers, are disclosed. The methods include administration of an agent that inhibits activity of eIF4F or an agent that disrupts the eIF4F translation-initiation complex (composed of eIF4E, eIF4A, and eIF4G).

BACKGROUND

The androgen receptor (AR) is a nuclear hormone receptor that is activated by androgens to promote its function as a transcription factor. Specificity is mediated in part through receptor recognition of a palindromic di-hexameric DNA motif called the androgen response element (ARE), which controls gene expression through recruitment of co-activators or co-repressors. Although the role of AR in regulating transcription is well established, it is unknown if AR uses additional processes such as translation control to direct protein abundance and cellular phenotypes. This is a particularly timely question, because translation regulation is emerging as a critical determinant of proteome diversity, tissue homeostasis, and disease.

One disease that has demonstrated sensitivity to inhibition of AR and mRNA translation is prostate cancer. Ninety percent of early-stage human prostate cancers are dependent on androgens for growth. However, prolonged use of androgen deprivation therapy (ADT) renders the majority of hormone-sensitive prostate cancers into lethal castration-resistant prostate cancer (CRPC). The defining characteristic of CRPC is the ability to grow in the androgen-poor environment created by ADT. A large subset of CRPC is characterized by restored AR signaling. Subsequent improved AR targeting with therapeutics such as abiraterone and enzalutamide has led to life-extending advances for the treatment of CRPC. Nevertheless, the disease remains uniformly fatal. Moreover, these potent inhibitors of AR and androgen metabolism have remodeled the phenotypic landscape of CRPC, resulting in a rise in lethal AR-deficient prostate cancers.

Thus, a need still exists for new therapies for lethal AR-deficient or low prostate cancers such as castration-resistant prostate cancer (CRPC).

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, provided herein is a method for treatment of prostate cancer, comprising administering to a subject in need thereof a therapeutically effective amount of an agent that disrupts the eIF4F translation-initiation complex.

In another aspect, provided herein is a method for treatment of prostate cancer, comprising administering to a subject in need thereof a therapeutically effective amount of agent that inhibits activity of the eIF4E translation initiation factor.

In some embodiments, the agent is an agent that disrupts eIF4E-eIF4G complexes or an agent that prevents formation of eIF4E-eIF4G complexes.

In certain embodiments, the prostate cancers are androgen-receptor deficient prostate cancers, androgen receptor-low cancer prostate cancers, or castration-resistant prostate cancer (CRPC).

In some embodiments, the agent is a small molecule, for example, 4-[(3E)-3-[[5-(4-nitrophenyl)furan-2-yl]methylidene]-2-oxo-5-phenylpyrrol-1-yl]benzoic acid (4E1RCat), 5-[5-[(E)-(3-Benzyl-4-oxo-2-sulfanylidene-1,3-thiazolidin-5-ylidene)methyl]-furan-2-yl]-2-chlorobenzoic acid (4E2RCat), or α-[2-[4-(3,4-Dichlorophenyl)-2-thiazolyl]-hydrazinylidene]-2-nitro-benzenepropanoic acid (4EGI-1).

In certain embodiments, the agent is an agent that reduces or disrupts translation of eIF4E-dependent mRNAs, the agent that blocks binding of eIF4E to mRNA, a mimetic of 4EBP1, or a mimetic of non-phosphorylated 4EBP1.

In other embodiments, the agent is a peptide or a peptide mimetic. In some embodiments the agent is a stapled peptide, such as a hydrocarbon-stapled peptide.

In some embodiments, the method further comprises administering a therapeutically effective amount of an androgen lowering agent, an androgen receptor blocker, or a combination thereof, for example, enzalutamide, bicalutamide, apalutamide, flutamide, nilutamide, finasteride, dutasteride, abiraterone, TAK700, buserelin, goserelin, leuproelin, degarelix, or a combination thereof.

In certain embodiments, the agent is an eIF4E inhibitor. In other embodiments, the agent is an mTOR inhibitor.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1A shows representative puromycin immunofluorescence for de novo protein synthesis in vivo in intact and 8-week castrate Pten$^{L/L}$ ventral prostates (left panel). Violin plot of per cell quantitation of puromycin mean fluorescence intensity. The height of the plot represents the range of new protein synthesis observed, and the width represents the number of cells at each fluorescence intensity [right panel, intact n=3 (46,711 cells quantified), castrate n=4 (73,237 cells quantified), *P<2.2e−16, t-test].

FIG. 1B is a simplified schematic of the eIF4F translation initiation complex composed of eIF4E, eIF4G, and eIF4A with the inhibitor of the complex, 4EBP1 (P=phosphorylation, AUG=start codon).

FIG. 1C shows representative immunofluorescence for eIF4E, eIF4G, eIF4A, and 4EBP1 in intact and 8-week castrate Pten$^{L/L}$ ventral prostates (left panel). Violin plot of per cell quantitation of 4EBP1 mean fluorescence intensity [right panel, intact n=6 (148,974 cells quantified), castrate n=5 (111,046 cells quantified), *P<2.2e−16, t-test].

FIG. 1D is a representative western blot for AR, 4EBP1, and actin in human AR+ parental and AR− APIPC (AR Program Independent Prostate Cancer) cells.

FIG. 1E is a correlation plot of 29 human non-neuroendocrine CRPC LuCaP prostate cancer PDX models comparing AR protein content (y-axis, AR H Score) and 4EBP1 protein expression [x-axis, 4EBP1 mean fluorescence intensity (MFI)] (R=0.376, P=0.02, Spearman's correlation).

FIG. 1F shows that 4ebp1 mRNA expression by RNASeq in intact and 8-week castrate Pten$^{L/L}$ ventral prostates (intact n=2, castrate n=3, *P=0.002, t-test).

FIG. 1G shows that 4ebp1 mRNA expression by qPCR in primary intact (DHT+) and castrate (DHT−) Pten$^{L/L}$ prostate cancer cells. 1 nM DHT was added back to castrate cells over the indicated time points (3 biological replicates, *P<0.05, t-test).

FIG. 1H is a schematic of the wild-type (WT) and mutant 4ebp1 intron reporter constructs cloned into the pGL4.28 vector (red triangle=minimal promoter region, luc=firefly luciferase). Representative western blot of AR upon addition of testosterone analog DMNT in LNCaP cells (left panel). Luciferase assay of the putative wild-type (WT) and mutated (MUT) mouse 4ebp1 androgen response element (mARE) (right panel, 6 biological replicates, *P<0.0001, ANOVA).

FIG. 2A is a schematic of the eIF4E-eIF4G and eIF4E-4EBP1 proximity ligation assays, which allow for the quantification of eIF4F translation initiation complexes and 4EBP1 inhibitory complexes in vivo.

FIG. 2B shows representative images of the eIF4E-eIF4G and eIF4E-4EBP1 proximity ligation assays in intact and 8-week castrate Pten$^{L/L}$ ventral prostates (left panel). Quantification of the proximity ligation assay (right panel, intact n=6, castrate n=7, *P=0.03, **P=0.009, t-test).

FIG. 2C shows representative hematoxylin and eosin staining of intact and 8-week castrate Pten$^{L/L}$ ventral prostates (left panel), with quantification (right panel, intact n=8, castrate n=10, *P=0.04, t-test).

FIG. 2D shows representative Ki67 staining of intact and 8-week castrate Pten$^{L/L}$ ventral prostates (left panel), with quantification [right panel, intact n=7 (151 glands quantified), castrate n=9 (206 glands quantified), *P<0.0001, t-test].

FIG. 2E is a representative western blot for PTEN and actin in wild-type (WT), intact Pten$^{L/L}$, and 8-week castrate Pten$^{L/L}$ primary organoids (top panel). Representative western blot for AR, 4EBP1, and actin in intact Pten$^{L/L}$ and 8-week castrate Pten$^{L/L}$ primary organoids (bottom panel).

FIG. 2F shows growth curves of intact and castrate Pten$^{L/L}$ primary cells (3 biological replicate, P=0.03, t-test).

FIGS. 3A-3I show that AR and eIF4F-mediated mRNA-specific translation controls a regulon of functional cell proliferation regulators FIG. 3A is a probability density graph of 697 translationally upregulated mRNAs between intact (n=2) and castrate (n=3) Pten$^{L/L}$ ventral prostates. Translation efficiency=ribosome-bound mRNA/total mRNA (P<2.2e−16, Kolmogorov-Smirnov Test).

FIG. 3B shows folding energy (P=0.004339) and % GC content (P<2.2e−16) between 5' UTRs of control mRNA (n=19009) and upregulated mRNA (n=187, t-test). Whiskers represent 1.5 times the interquartile range.

FIG. 3C is the GRTE consensus sequence (e-value=1.2e−41).

FIG. 3D shows luciferase assay of the control vector, wild-type Klf5 5' UTR luciferase construct, and its GRTE deletion mutant with or without 4EBP1$^M$ induction. Luciferase assay was normalized to luc and RPS19 mRNA (n.s.=not statistically significant, n>3 biological replicates/condition, t-test). Data presented as mean+/−SEM.

FIG. 3E shows gene set enrichment analysis of the translationally up-regulated mRNA (log 2 fold change ≥0.75, FDR <0.1) in castrate Pten$^{L/L}$ mice.

FIG. 3F is a heatmap of translationally upregulated proliferation regulators in AR-low prostate cancer ($\log_2$ fold change ≥0.75, FDR <0.1).

FIG. 3G is a representative western blot analysis of KLF5, DENR, CACUL1, rpS15, AR, and actin in primary intact (In=intact, DHT+) and castrate (Cx=castrate, DHT−) Pten$^{L/L}$ organoids.

FIG. 3H is a representative western blot analysis of KLF5, DENR, CACUL1, rpS15, AR, and actin in primary Pten$^{L/L}$;4ebp1M organoids with or without 4EBP1$^M$ induction.

FIG. 3I shows cell proliferation EdU incorporation assay in scramble, shKLF5, shDENR, or shCACUL castrate (DHT−) Pten$^{L/L}$ primary cells (replicate of 4-6 per condition, *P=0.02, P<0.0001, *P=0.0003, t-test). Data presented as mean+/−SEM.

FIG. 4A is a schematic diagram of testing the impact of inhibiting eIF4F complex formation on AR-low prostate cancer initiation. Pten$^{L/L}$;4ebp1$^M$ mice were castrated and immediately put on vehicle or doxycycline (dox) for 8 weeks.

FIG. 4B is a representative hematoxylin and eosin staining of vehicle-treated (−4EBP1$^M$) and doxycycline-treated (+4EBP1$^M$) Pten$^{L/L}$;4ebp1$^M$ ventral prostates (left panel). Quantification of tumor volumes after 8 weeks of inhibition of eIF4F complex formation started immediately after castration (right panel, vehicle—n=9, doxycycline—n=9, *P=0.04).

FIG. 4C is a representative Ki67 staining of vehicle-treated (−4EBP1$^M$) and doxycycline-treated (+4EBP1$^M$) Pten$^{L/L}$;4ebp1$^M$ ventral prostates (left panel). Ki67 quantification after 8-week castration and immediate vehicle or doxycycline treatment [right panel, vehicle—n=9 (205 glands quantified), doxycycline—n=8 (169 glands quantified), *P<0.0001, t-test].

FIG. 4D is a schematic diagram of testing the impact of inhibiting eIF4F assembly on AR-low prostate cancer progression. $Pten^{L/L}$;4ebp1M mice were castrated and allowed to form AR-low tumors for 12 weeks followed by an additional 12-week vehicle or doxycycline (dox) treatment.

FIG. 4E shows $Pten^{L/L}$;4ebp1M ventral prostate weights after 12-week castration followed by an additional 12-week vehicle or doxycycline treatment (vehicle—n=10, doxycycline—n=9, *P=0.0018, t-test).

FIG. 4F shows representative images of $Pten^{L/L}$;4ebp1M ventral prostates with or without $4ebp1^M$ induction in the progression experiment.

FIG. 4G is $Pten^{L/L}$;4ebp1$^M$ ventral prostate Ki67 quantification after 12-week castration followed by an additional 12-week vehicle or doxycycline treatment [vehicle—n=9 (197 glands quantified), doxycycline—n=7 (139 glands quantified), *P<0.0001, t-test].

FIG. 5A shows intact and castrate $Pten^{L/L}$;4ebp1$^M$ primary prostate cancer cells treated with doxycycline for 48 hours. Proliferation was measured using the IncuCyte platform (In=intact, Cx=castrate, assay completed in triplicate, *P=0.0026, **P=0.03, t-test).

FIG. 5B shows 4EBP1 protein immunofluorescence quantification of a tissue microarray composed of end-stage metastatic CRPC patient specimens classified by AR protein expression (2-4 tumors sampled per patient, AR low—n=10, AR high—n=17, *P=0.0089, t-test).

FIG. 5C is a simplified schematic of the mechanism of action of 4E1RCat, 4E2RCat, and 4EGI-1, which disrupt the eIF4E-eIF4G interaction.

FIG. 5D shows intact and castrate $Pten^{L/L}$ cells treated with 4E2RCat for 48 hours. Proliferation was measured using the IncuCyte platform (In=intact, Cx=castrate, assay completed in triplicate, *P<0.0001, t-test).

FIG. 5E shows intact and castrate $Pten^{L/L}$ cells treated with 4EGI-1 for 48 hours. Proliferation was measured using the IncuCyte platform (In=intact, Cx=castrate, assay completed in triplicate, *P=0.002, t-test).

FIG. 5F shows AR+ parental and AR− APIPC prostate cancer cells treated with 4E2RCat for 48 hours. Proliferation was measured using the IncuCyte platform (assay completed in triplicate, *P<0.0001, **P=0.0003, t-test).

FIG. 5G shows AR+ parental and AR− APIPC prostate cancer cells treated with 4EGI-1 for 48 hours. Proliferation was measured using the IncuCyte platform (assay completed in triplicate, *P=0.0003, t-test).

FIGS. 6A-6F demonstrates that argeting the eIF4E-eIF4G interaction in AR− deficient prostate cancer decreases tumor growth and improves survival.

FIG. 6A is a schematic of the eIF4E-eIF4G interaction inhibitor preclinical trials.

FIG. 6B shows AR− APIPC xenograft preclinical trial testing the efficacy of 4E1RCat on AR-low prostate cancer tumor growth. Castrated mice were treated with 15 mg/kg 4E1RCat or vehicle (n=8-4E1RCat-treated, n=7—vehicle-treated mice, *P=0.0124, P=0.045, *P=0.05, t-test).

FIG. 6C is LuCaP 173.2 PDX preclinical trial testing the efficacy of 4E1RCat on AR-low prostate tumor growth. Castrated mice were treated with 15 mg/kg 4E1RCat or vehicle (n=9—4E1RCat-treated, n=8—vehicle-treated mice, *P=0.02, **P=0.01, t-test).

FIG. 6D is AR- APIPC xenograft preclinical trial testing the impact of 4E1RCat on AR-low prostate cancer survival. Castrated mice were treated with 15 mg/kg 4E1RCat or vehicle (n=8—4E1RCat-treated, n=7—vehicle-treated mice, P=0.0048, log-rank test).

FIG. 6E is LuCaP 173.2 PDX preclinical trial testing the impact of 4E1RCat in AR-low prostate cancer survival. Castrated mice were treated with 15 mg/kg 4E1RCat or vehicle (n=9-4E1RCat-treated, n=8—vehicle-treated mice, P=0.0057, log-rank test).

FIG. 6F is AR+ parental APIPC xenograft preclinical trial testing the efficacy of 4E1RCat on AR+ prostate cancer tumor growth. Uncastrated mice were treated with 15 mg/kg 4E1RCat or vehicle (n=8-4E1RCat-treated, n=7—vehicle-treated mice).

FIG. 7A is a representative immunofluorescence and immunohistochemistry for the C- or N-terminus of AR in intact and 8-week castrate $Pten^{L/L}$ ventral prostates.

FIG. 7B is a representative western blot for the C- and N-terminus of AR and actin of intact and 8-week castrate $Pten^{L/L}$ ventral prostates.

FIG. 7C is a representative immunofluorescence of AR and 4EBP1 in 8-week castrate $Pten^{L/L}$ anterior prostate (AP), dorsal prostate (DP), and lateral prostate (LP).

FIG. 7D shows RNASeq analysis of AR-responsive genes in intact and 8-week castrate $Pten^{L/L}$ ventral prostates (intact n=2, castrate n=4, $\log_2$ fold change <1.25, FDR <0.01).

FIG. 7E shows representative western blots for eIF4E, eIF4G, eIF4A, 4EBP1, phospho-4EBP1 (T37/46), and actin of intact and 8-week castrate $Pten^{L/L}$ ventral prostates ($\alpha$-$\gamma$ denote the various phosphorylation bands of 4EBP1, with $\alpha$ representing the non-/hypophosphorylated band, $\beta$ representing an intermediate phosphorylated band, and $\gamma$ representing a hyperphosphorylated band).

FIG. 7F is a fluorescence quantification for eIF4A, eIF4E, and eIF4G in intact and 8-week castrate $Pten^{L/L}$ ventral prostates (n=3 mice per condition, n.s.=not statistically significant, t-test).

FIG. 7G shows PTEN copy number status of each LuCaP PDX analyzed for AR and 4EBP1 in FIG. 1E.

FIG. 7H is a representative immunofluorescence of low versus high 4EBP1 protein expression from the 29 non-neuroendocrine CRPC LuCaP PDX models quantified in FIG. 1E.

FIGS. 8A-8G demonstrate that AR regulates 4ebp1 transcription but does not impact translation efficiency or degradation rates. Data presented as mean+/−SEM.

FIG. 8A shows that $Pten^{L/L}$ tissue ribosome profiling enables a snapshot of all translating mRNAs in vivo. In short, ribosome protected mRNAs are isolated after RNase digest along with alkaline fragmented total RNA. These are synthesized into RNASeq libraries and sequenced. Translation efficiency is calculated by the normalized footprint read counts for a specific gene over the normalized total RNA count for the same gene.

FIG. 8B shows periodicity plots of ribosome-bound mRNA and total RNA isolated from the $Pten^{L/L}$ mouse. To ensure that isolated ribosome-bound mRNAs were isolated, the sequencing libraries were analyzed for triplet periodicity.

In short, ribosome-bound fragments should be enriched in one of the three possible codon frames, whereas non-protected mRNA should not.

FIG. 8C shows translation efficiency of 4ebp1 in intact and 8-week castrate Pten$^{L/L}$ ventral prostates measured by ribosome profiling (intact=2, castrate=3, n.s.=not statistically significant, t-test).

FIG. 8D shows a representative cycloheximide chase assay of 4EBP1 protein degradation in intact (DHT+) and castrate (DHT−) Pten$^{L/L}$ organoids. α-γ denote the various phosphorylation bands of 4EBP1 in primary prostate cancer cells, with α representing the non-/hypophosphorylated band, β representing an intermediate phosphorylated band, and γ representing a hyperphosphorylated band (top panel). 4EBP1 protein quantification (bottom panel, 3 biological replicates, n.s.=not statistically significant, t-test).

FIG. 8E shows 4EBP1 mRNA expression by qPCR in AR+ parental and AR− APIPC cells (3 biological replicates, * P<0.0001, t-test).

Figure 8A:
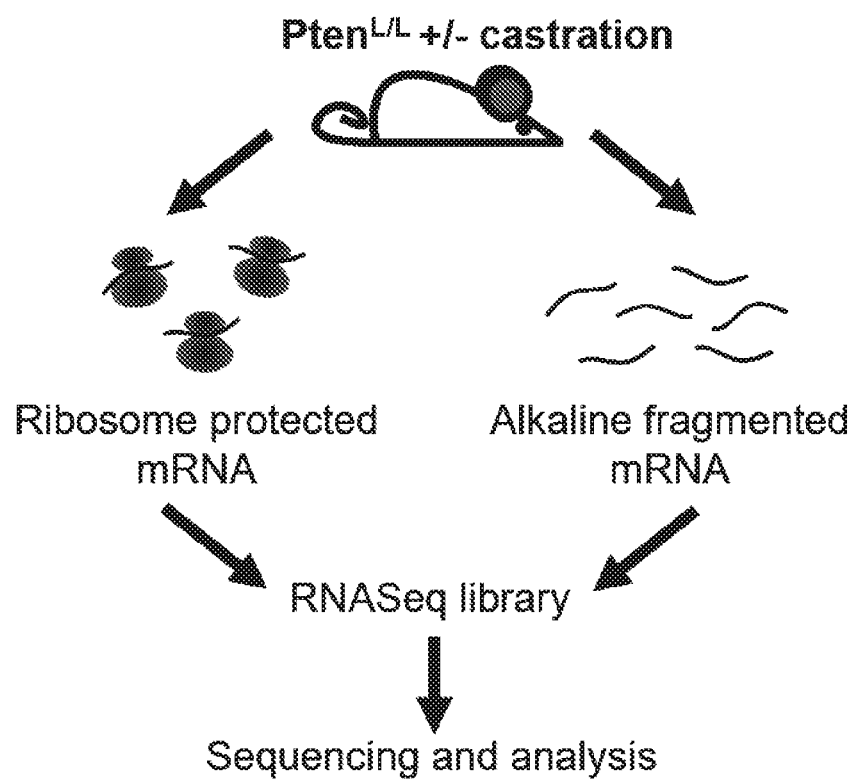
Figure 8B:
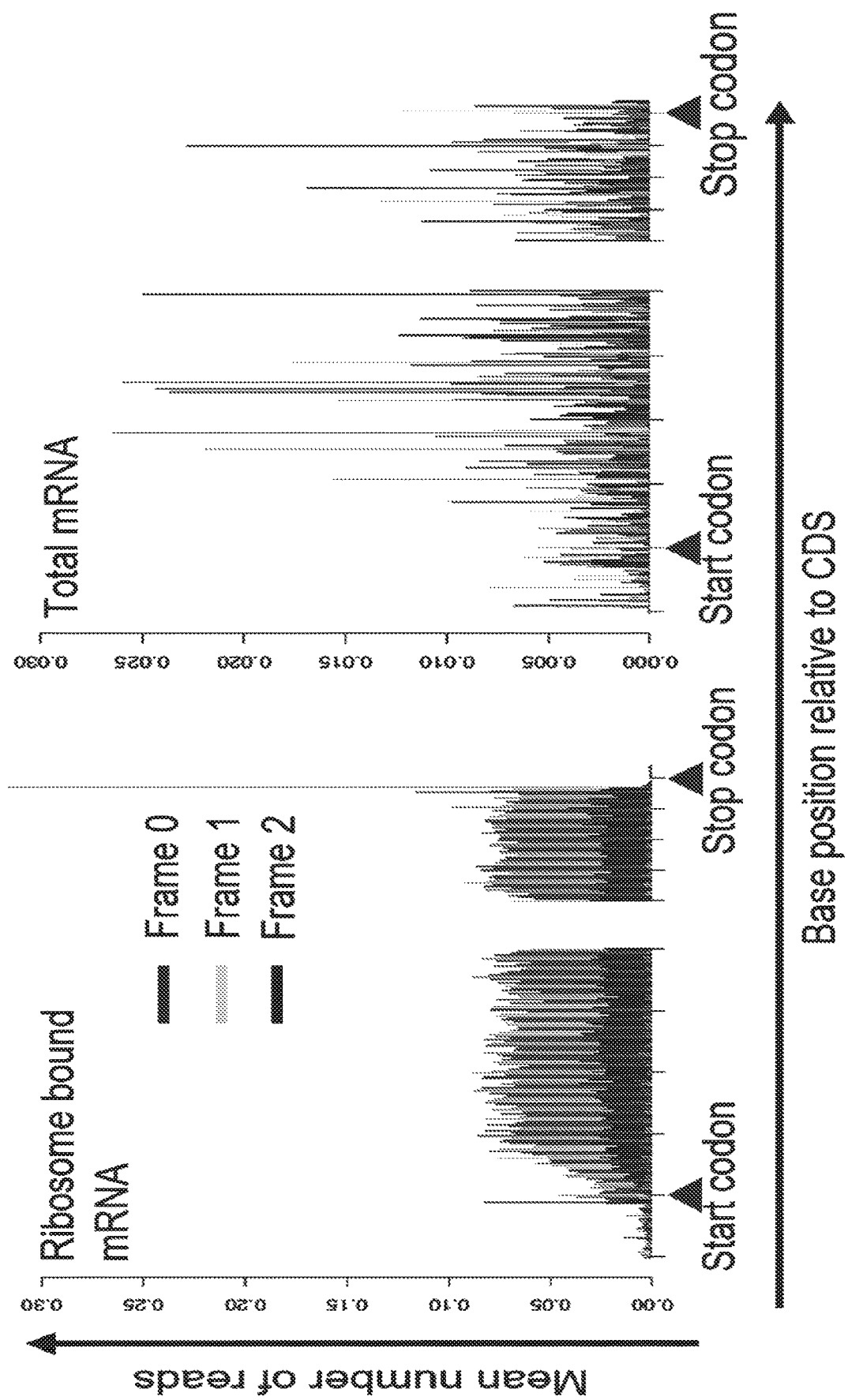
Figures 8F, 8G:
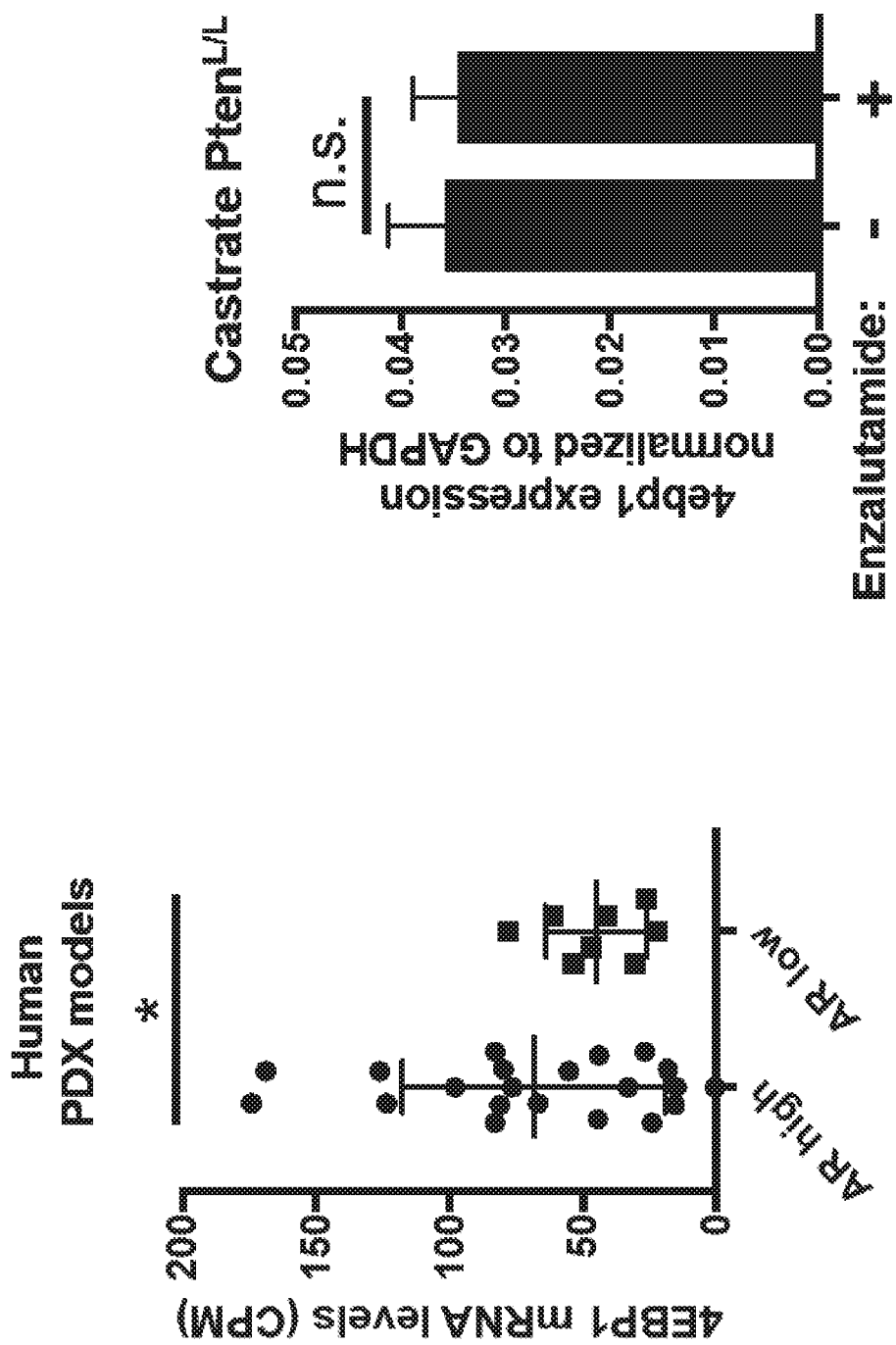

FIG. 8F shows 4EBP1 mRNA expression by RNASeq in 29 human non-neuroendocrine CRPC LuCaP prostate cancer PDX models (CPM=counts per million, *P=0.03, t-test).

FIG. 8G demonstrates that further inhibition of AR with enzalutamide in castrate Pten$^{L/L}$ cells does not impact 4ebp1 transcript expression (6 biological replicates, n.s.=not statistically significant, t-test). Data presented as mean+/−SEM.

FIGS. 9A-9D show that androgen deprivation is associated with decreased 4EBP1 expression; DHT add back decreases de novo protein synthesis. Data presented as mean+/−SEM.

Figure 9B:
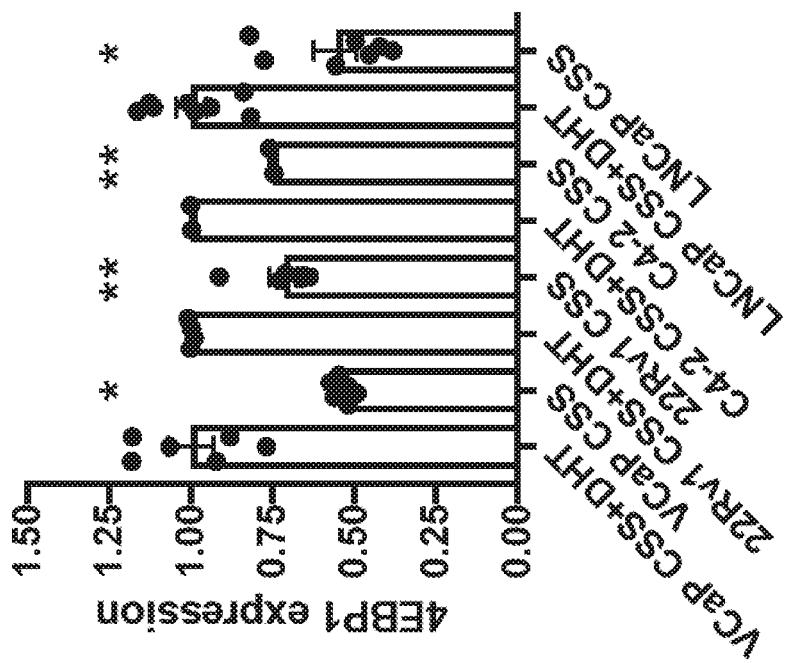
Figure 9A:
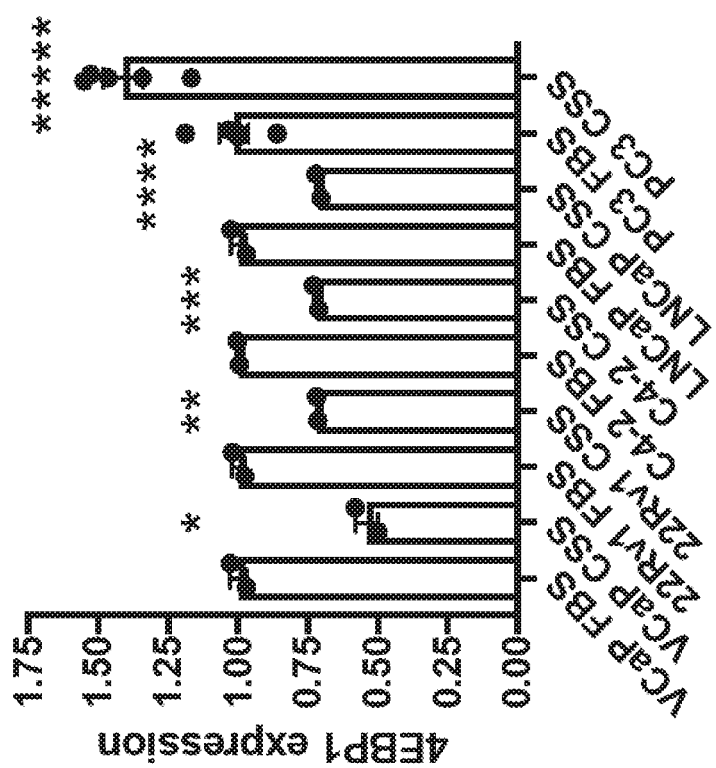

FIG. 9A is 4EBP1 mRNA expression by RNASeq in VCaP, 22Rv1, C4-2, and LNCaP prostate cancer cell lines grown in fetal bovine serum (FBS) or charcoal stripped serum (CSS). AR− control PC3 prostate cancer cell 4EBP1 expression was measured by qPCR (n≥2 biological replicates per condition, *P=0.0116, P=0.0068, *P=0.0014, **P=0.01, ***P=0.0021, t-test).

FIG. 9B is 4EBP1 mRNA expression by qPCR in VCaP, 22Rv1, C4-2, and LNCaP prostate cancer cell lines grown in charcoal stripped serum (CSS)+DHT or CSS alone (4EBP1 CT values were normalized to ACTB, n≥2 biological replicates per condition, *P<0.0001, **P=0.0007, t-test).

Figure 9C:
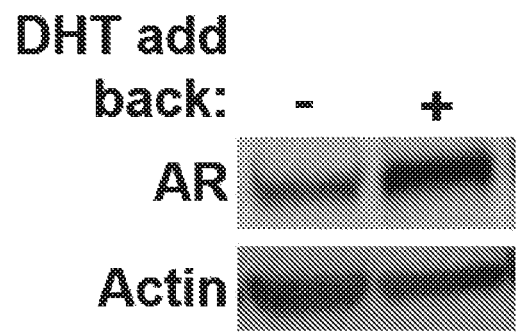

FIG. 9C is a representative western blot of castrate Pten$^{L/L}$ primary prostate cancer cells with or without 4-hour 1 nM DHT add back.

Figure 9D:
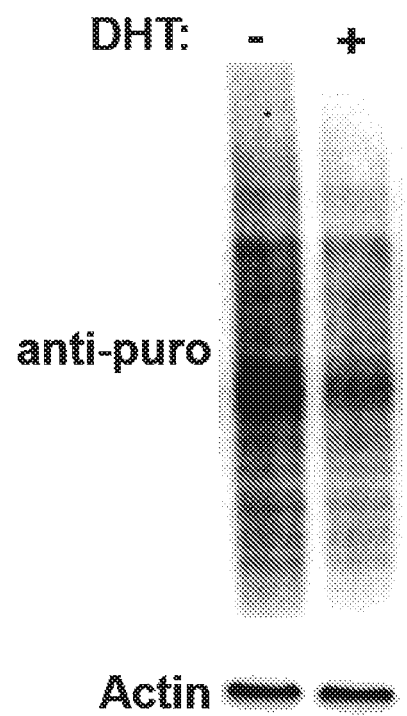

FIG. 9D is a representative western blot of puromycin incorporation with or without addition of 1 nM DHT for 48 hours, which increases AR signaling, in castrate Pten$^{L/L}$ primary prostate cancer cells (representative of 4 biological replicates).

FIGS. 10A-10F demonstrate that AR binds to an ARE in 4ebp1 in both normal and cancerous prostates, rendering 4EBP1 AR-responsive. Data presented as mean+/−SEM.

Figure 10A:
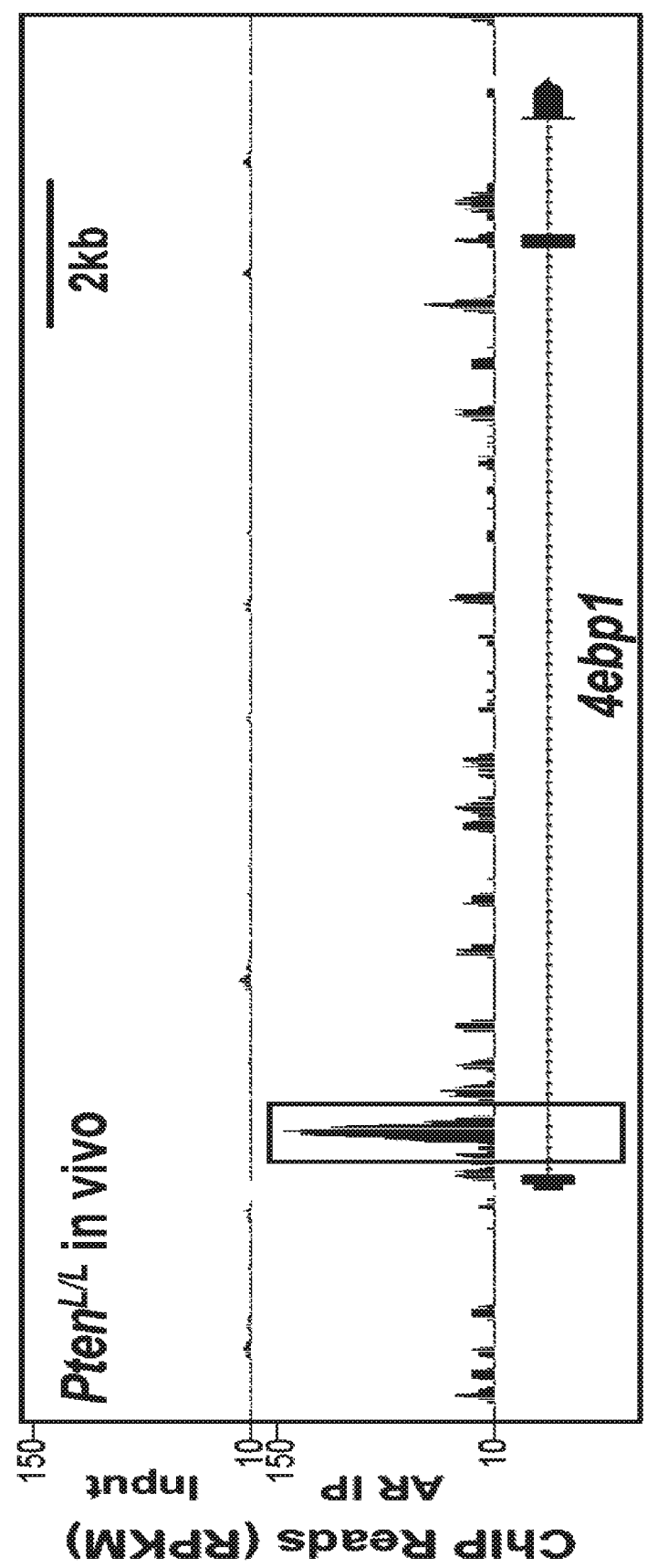

FIG. 10A shows an AR ChIPSeq of the Pten$^{L/L}$ mouse model that reveals an AR binding site within the first intron of 4ebp1 (red box).

Figure 10B:
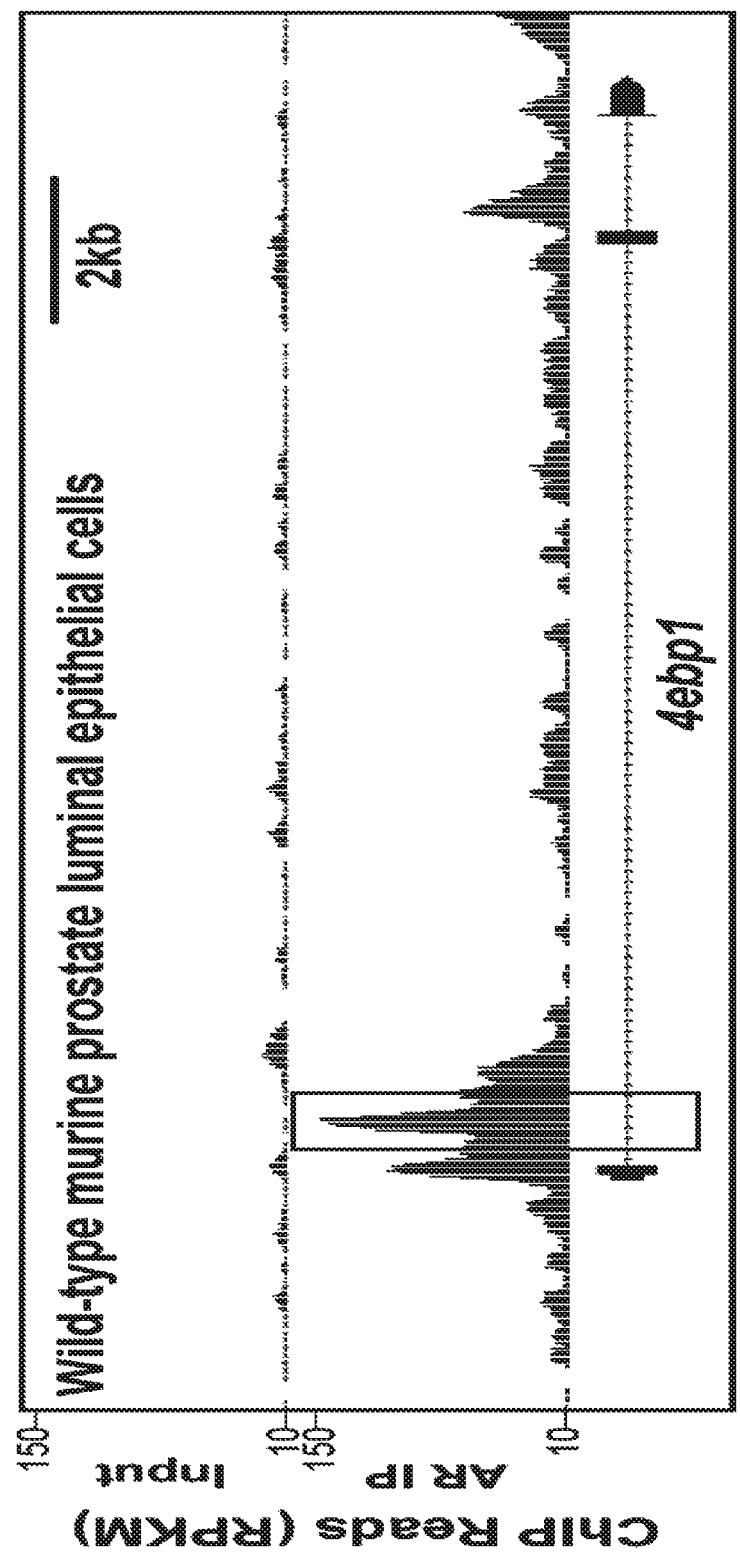

FIG. 10B is an AR ChIPSeq of wild-type murine prostate luminal epithelial cells that demonstrates an AR binding site within the first intron of 4ebp1 (red box).

Figure 10C:
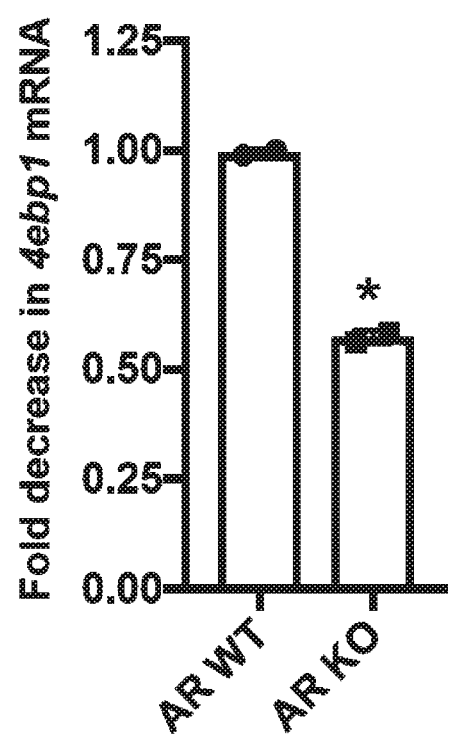

FIG. 10C shows 4ebp1 mRNA expression by RNASeq in wild-type (WT) prostate luminal epithelial cells and AR knockout (KO) prostate luminal epithelial cells (WT—n=2, AR KO—n=2, *P=0.002, t-test).

Figure 10D:
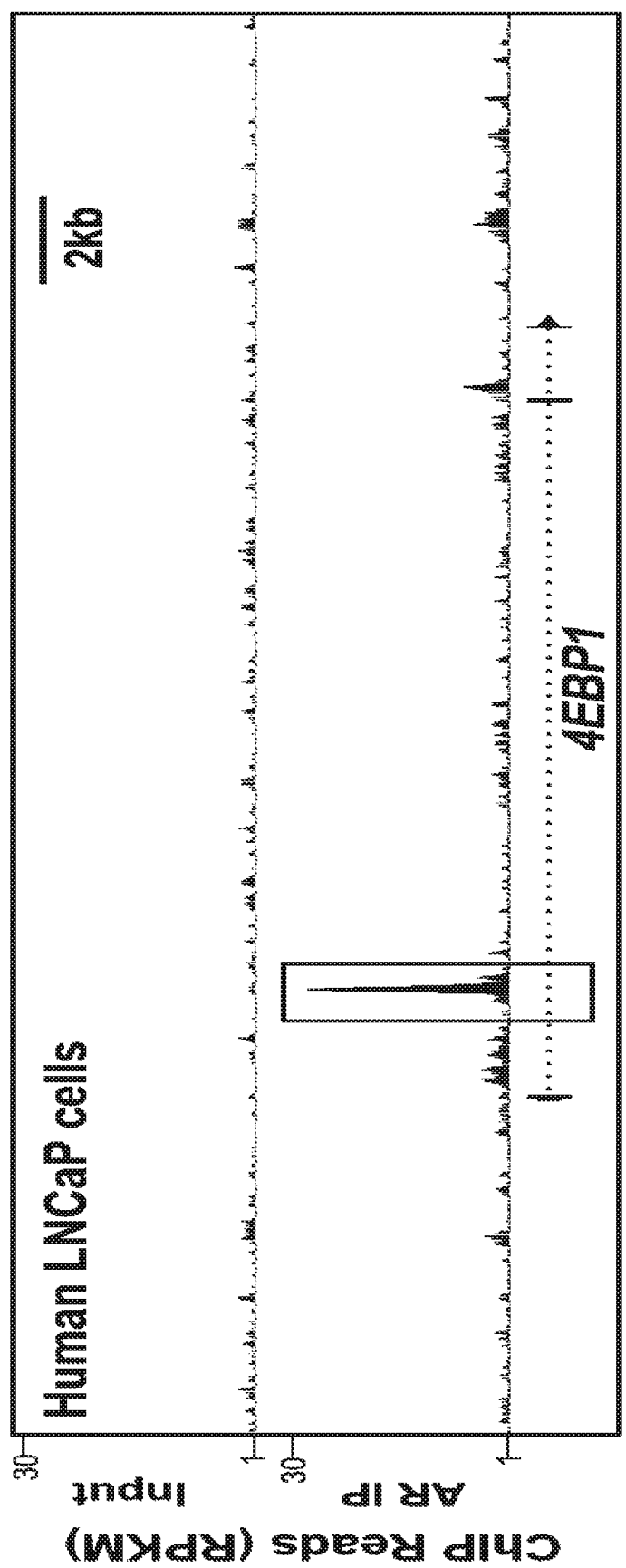

FIG. 10D AR ChIPSeq of human LNCaP prostate cancer cells demonstrates an AR binding site within the first intron of 4EBP1 (red box).

Figure 10E:
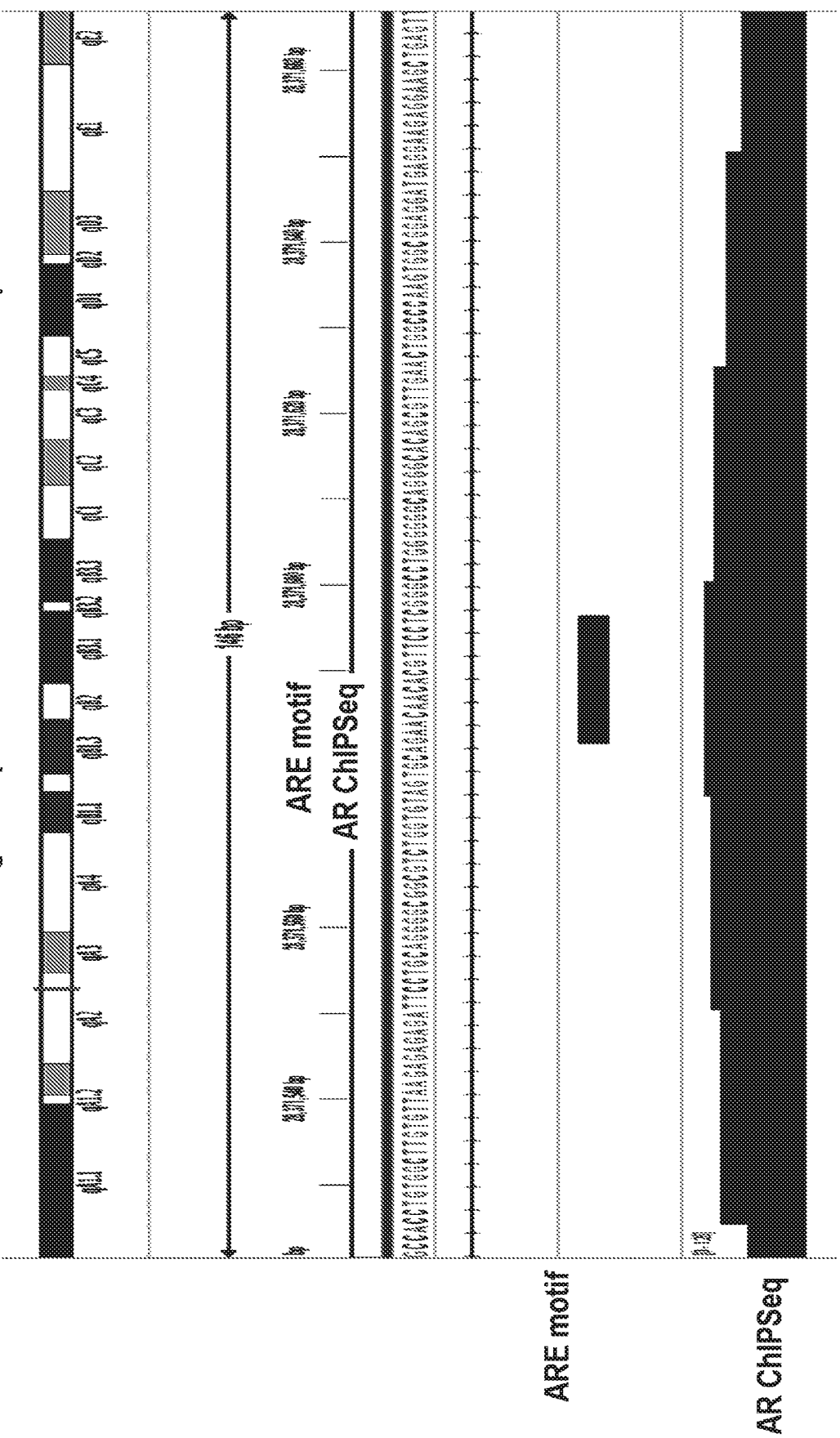

FIG. 10E shows genomic location of the 4ebp1 androgen response element (ARE) within the AR ChIPSeq peak.

Figure 10F:
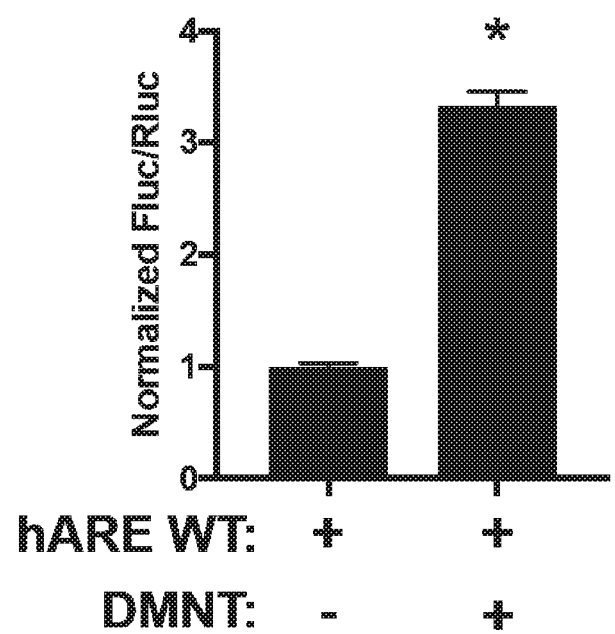

FIG. 10F depicts a luciferase reporter assay of the putative 4EBP1 androgen response element (hARE). Wild-type (WT) plasmids were transfected into LNCaP cells in androgen-depleted medium. Dimethylnortestosterone (DMNT) was used to stimulate AR (6 biological replicates, *P<0.0001, t-test).

FIGS. 11A-11H show that castrate Pten$^{L/L}$ mice develop highly aggressive, non-neuroendocrine tumors independent of PI3K or MNK1/2 activity. All scale bars=100 m. Data presented as mean+/−SEM.

Figure 11A:
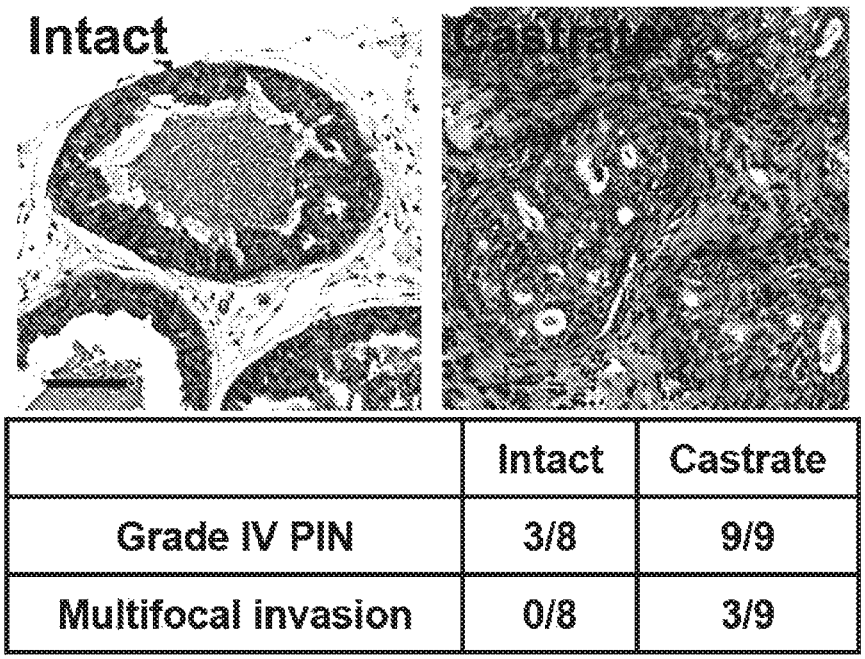

FIG. 11A is a representative cap-binding assay of Pten$^{L/L}$ intact and castrate ventral prostates and AR+ parental and AR− APIPC tumors.

Figure 11B:
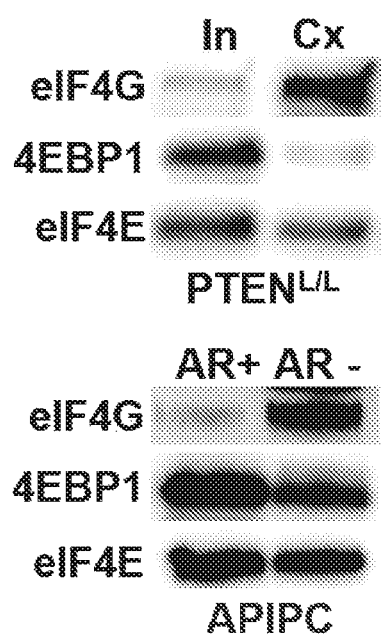

FIG. 11B is an additional representative hematoxylin and eosin staining of intact (non-castrated) and 8-week castrate Pten$^{L/L}$ ventral prostates (upper panel). Blinded mouse pathologist review of intact and castrate Pten$^{L/L}$ ventral prostates; PIN=prostatic intraepithelial neoplasia (lower panel).

Figure 11C:
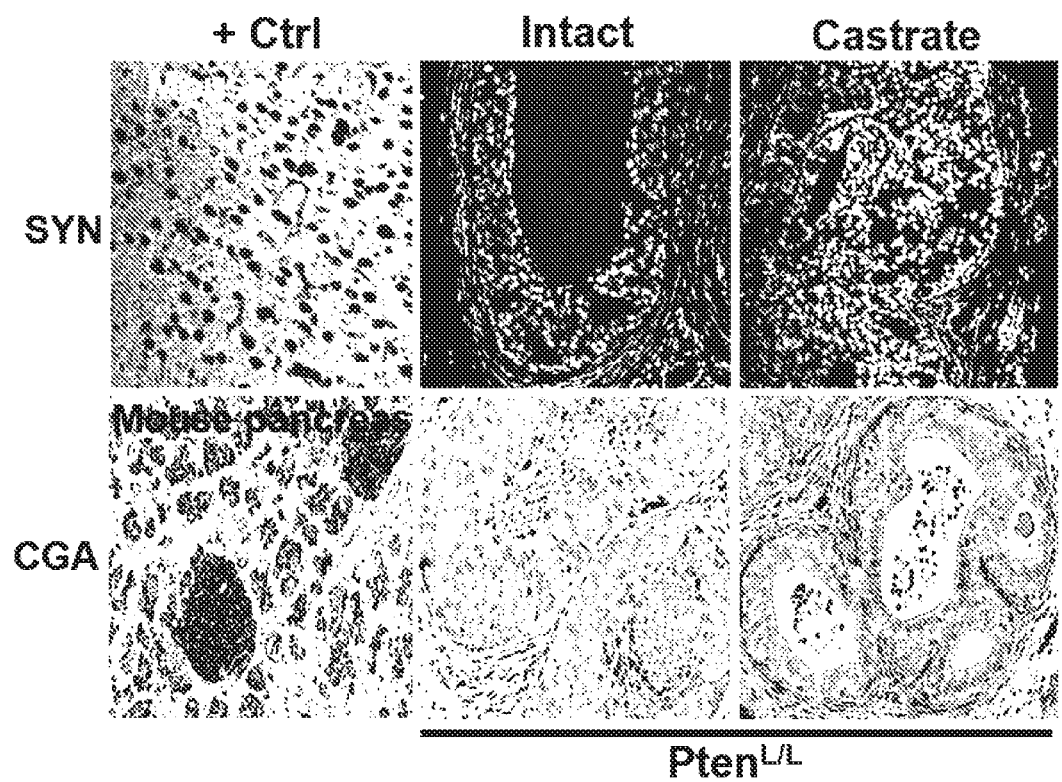

FIG. 11C shows representative immunofluorescence and immunohistochemistry staining for neuroendocrine markers synaptophysin (SYN) and chromogranin A (CGA). Positive control for SYN=mouse brain and positive control for CGA=mouse pancreas.

Figure 11D:
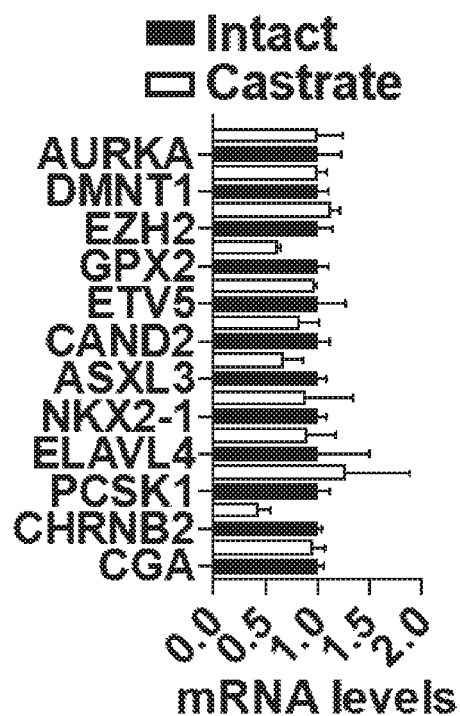

FIG. 11D shows mRNA expression of 12 transcripts associated with neuroendocrine prostate cancer in both intact and 8-week castrate Pten$^{L/L}$ ventral prostates.

Figure 11E:
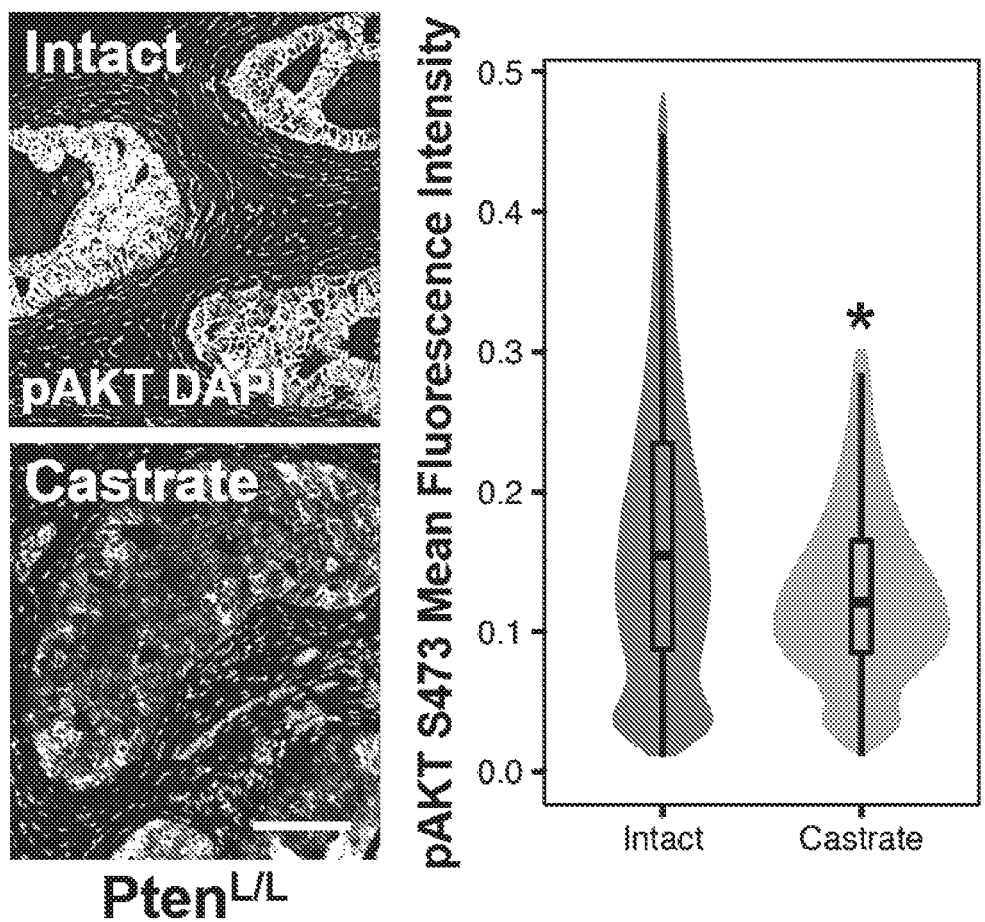

FIG. 11E shows representative phospho-AKT S473 immunofluorescence in intact and 8-week castrate Pten$^{L/L}$ ventral prostates (left panel). Violin plot of per cell quantitation of phospho-AKT S473 fluorescence intensity [right panel, intact n=4 (81,743 cells quantified), castrate n=5 (77,389 cells quantified), *P<2.2e−16, t-test].

Figure 11F:
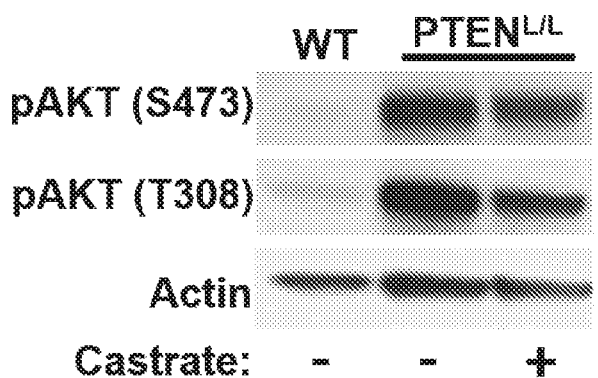

FIG. 11F is a representative western blot for phospho-AKT (S473), phospho-AKT (T308), and actin of wild-type (WT), intact Pten$^{L/L}$, and 8-week castrate Pten$^{L/L}$ ventral prostates.

Figure 11G:
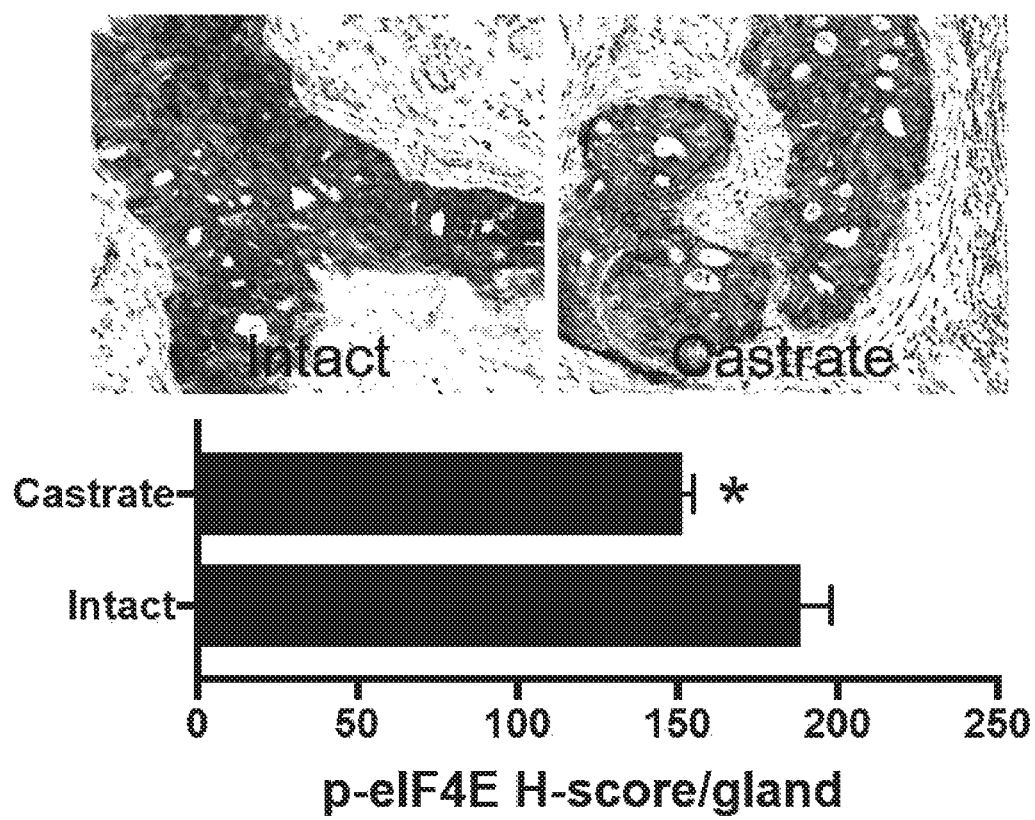

FIG. 11G shows representative images with quantification of the MNK1/2 target phosphorylated eIF4E (S209) IHC in intact and castrate Pten$^{L/L}$ ventral prostates (intact n=3, castrate n=6, *P=0.002).

Figure 11H:
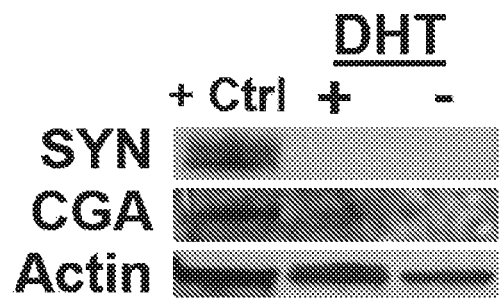

FIG. 11H shows representative western blots of synaptophysin (SYN), chromogranin A (CGA), and actin in primary intact Pten$^{L/L}$, and 8-week castrate Pten$^{L/L}$ derived primary cells. Positive control=cell lysates from the RIP-Tag2 neuroendocrine mouse model.

FIGS. 12A-12H demonstrate that AR/eIF4F sensitive mRNAs are distinct from mTOR inhibition-sensitive mRNAs. Data presented as mean+/−SEM.

FIG. 12A is 5' UTR length of control mRNA (n=19009) and upregulated mRNA (n=187) (P=0.262, t-test).

FIG. 12B is a Venn diagram with the red circle representing AR/eIF4F translationally upregulated mRNAs and blue circle representing mTOR inhibition-sensitive translationally downregulated mRNAs.

FIG. 12C shows percentages of control 5' UTR, AR/eIF4F sensitive mRNAs, and mTOR inhibition-sensitive mRNAs containing GRTEs or PRTEs ($\chi^2$-test).

Figure 12D:
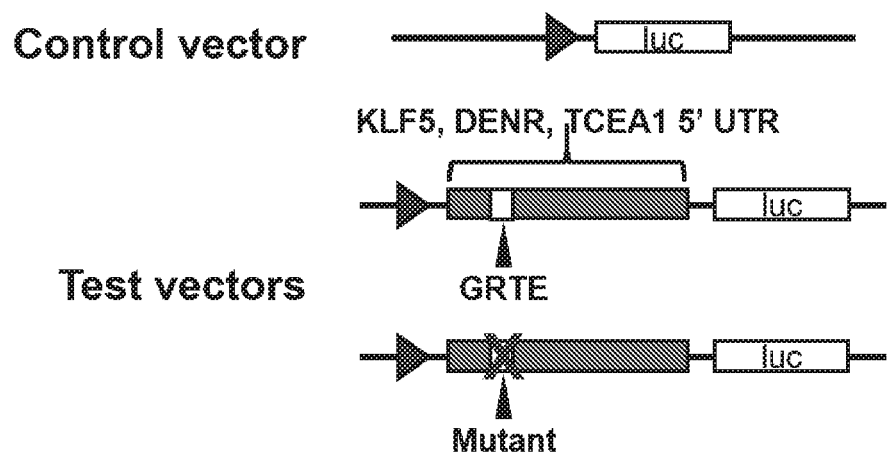

FIG. 12D shows layouts of the control vector, wild-type Denr, Klf5, and Tcea1 5' UTR luciferase constructs, and their GRTE or G-rich element deletion mutants. Red arrow represents the SV40 promoter.

Figure 12E:
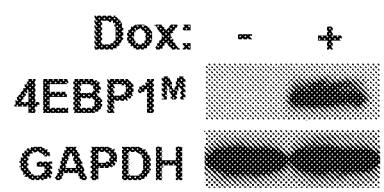

FIG. 12E is a Western blot showing 4EBP1$^M$ protein expression in PC3 cells with or without doxycycline induction. Loading control=GAPDH.

Figure 12F:
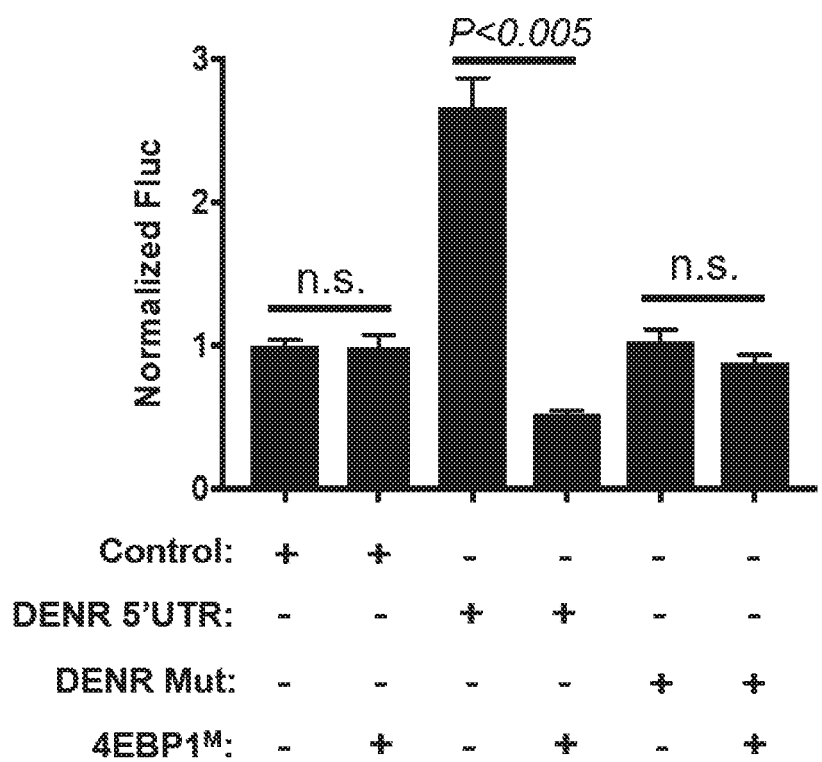

FIG. 12F depicts a luciferase assay of the control vector, wild-type Denr 5' UTR luciferase construct, and its GRTE deletion mutant with or without 4EBP1$^M$ induction. Luciferase activity was normalized to luc and RPS19 mRNA (n.s.=not statistically significant, n>3 biological replicates/ condition, t-test).

Figure 12G:
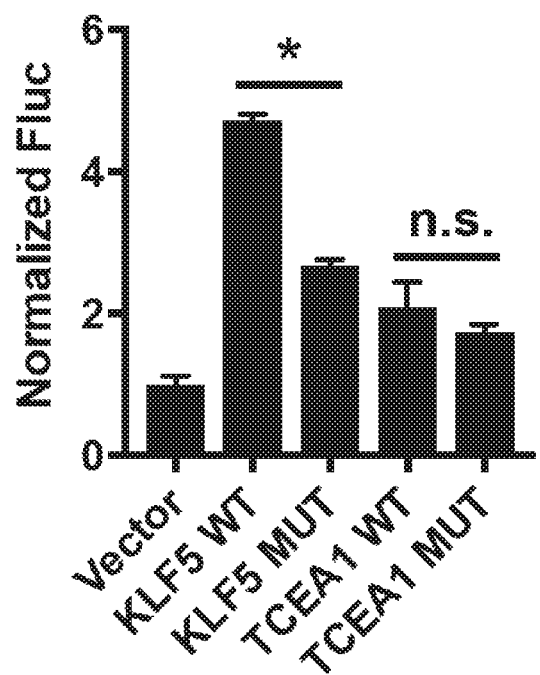

FIG. 12G depicts a luciferase assay of the control vector, wild-type Klf5 5' UTR luciferase construct and its GRTE deletion mutant, as well as wild-type Tcea1 5' UTR luciferase construct and its G-rich element deletion mutant. Luciferase activity was normalized to luc and RPS19 mRNA (n.s.=not statistically significant, n>3 biological replicates/ condition, *P<0.0001, t-test).

Figure 12H:
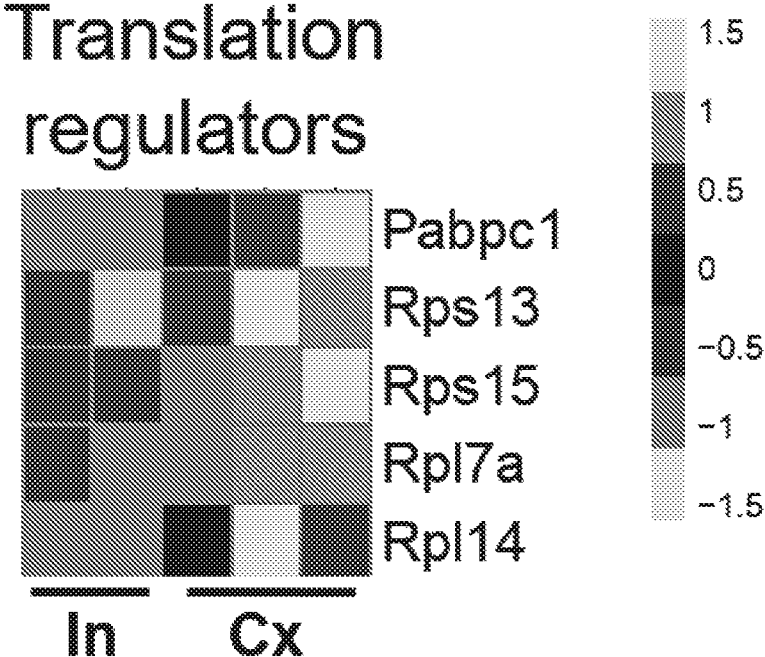

FIG. 12H depicts heatmap of translationally upregulated protein synthesis genes in AR-low prostate cancer ($\log_2$ fold change ≥0.75 FDR <0.1).

FIGS. 13A-13F show that protein but not mRNA expression of GRTE-containing proliferation regulators are responsive to changes in eIF4F activity. Data presented as mean+/−SEM.

Figure 13B:
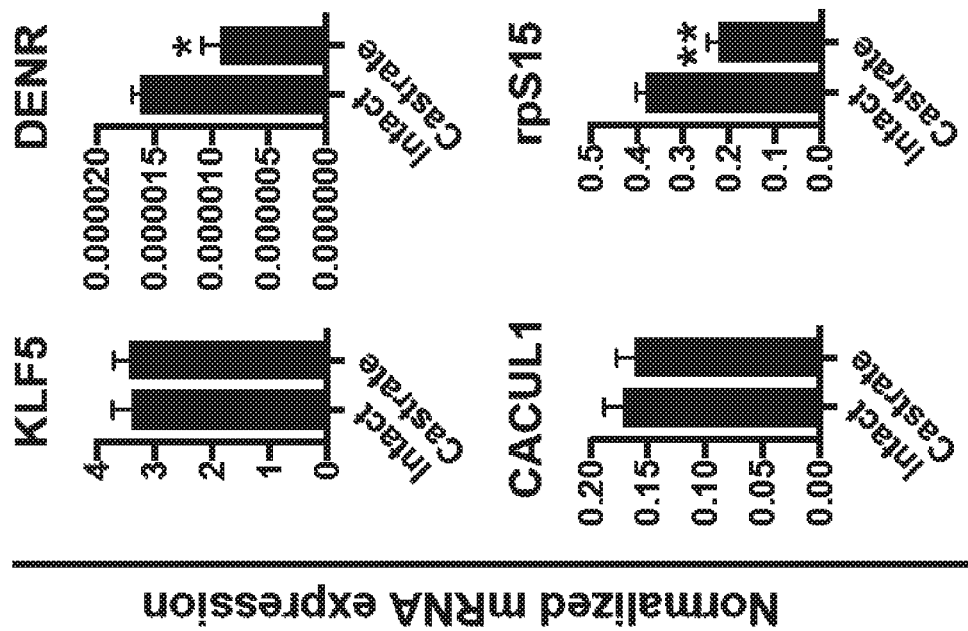
Figure 13A:
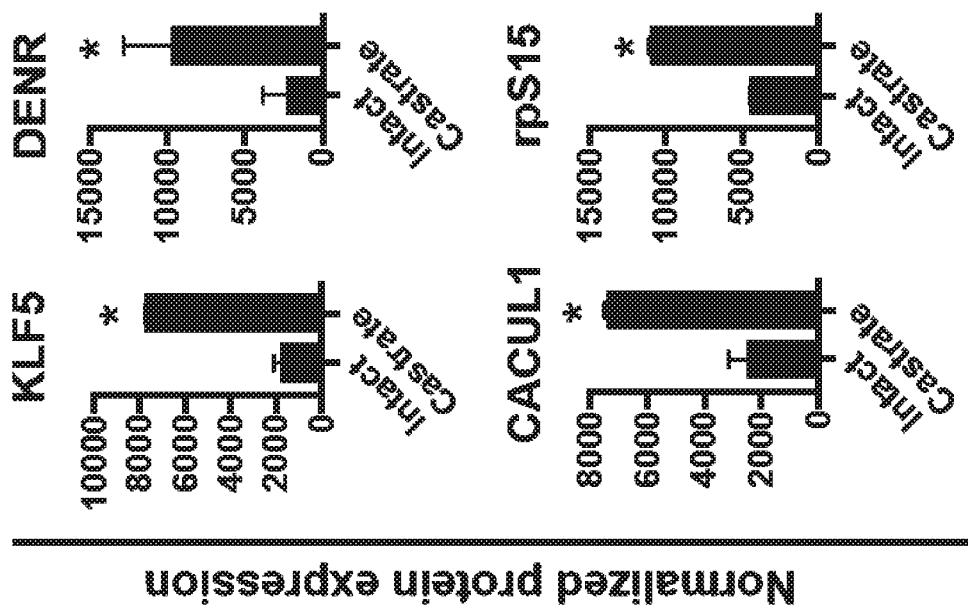

FIG. 13A demonstrates quantification of KLF5, DENR, CACUL1, and rpS15 protein abundance by densitometry in intact (DHT+) and castrate (DHT−) Pten$^{L/L}$ organoids (2-3 biological replicates per condition, * P<0.05, t-test).

FIG. 13B is a qPCR analysis of Klf5, Denr, Cacul1, and Rps15 in intact (DHT+) and castrate (DHT−) Pten$^{L/L}$ organoids (actin=normalization, 3 biological replicates per condition, * P=0.002, **P=0.0004, t-test).

Figure 13D:
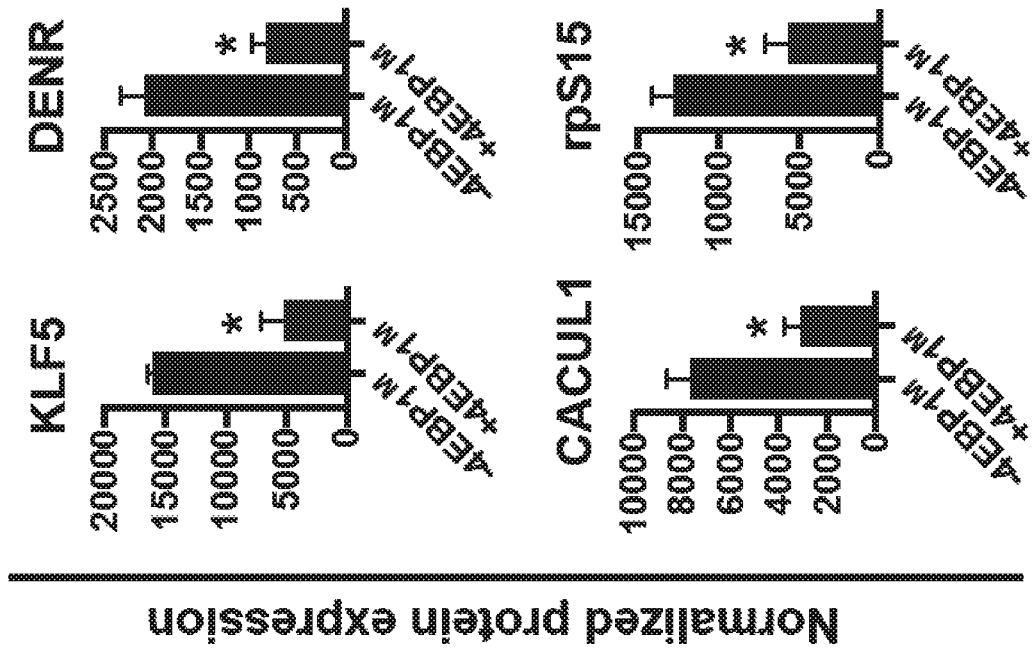
Figure 13C:
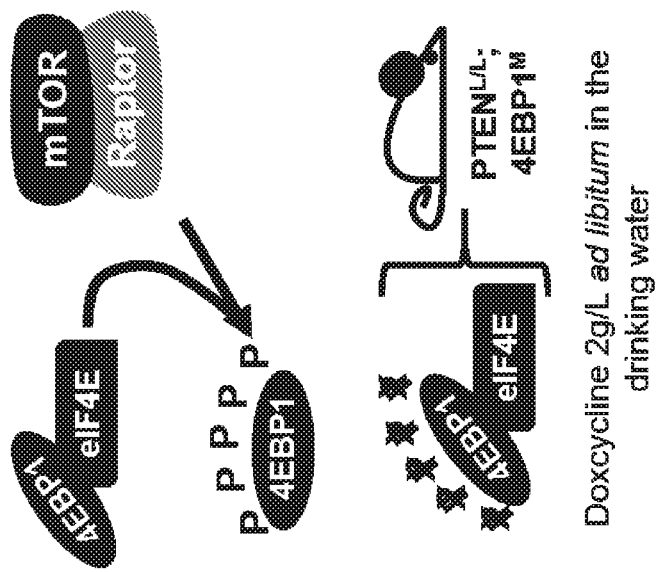

FIG. 13C is a schematic figure of the Pten$^{L/L}$;4ebp1$^M$ mouse model. In this model, the mTOR phosphorylation sites of 4EBP1 have been mutated to alanine and therefore cannot be inactivated by mTOR. The addition of doxycycline to the drinking water induces the expression of the 4ebp1$^M$ transgene, which competes with endogenous 4EBP1 for binding of eIF4E. This leads to a reduction in eIF4F complex formation.

FIG. 13D shows quantification of KLF5, DENR, CACUL1, and rpS15 protein abundance by densitometry in Pten$^{L/L}$;4ebp1$^M$ organoids with or without induction of the 4EBP1$^M$ (2-4 biological replicates per condition, * P<0.05, t-test).

Figures 13E, 13F:
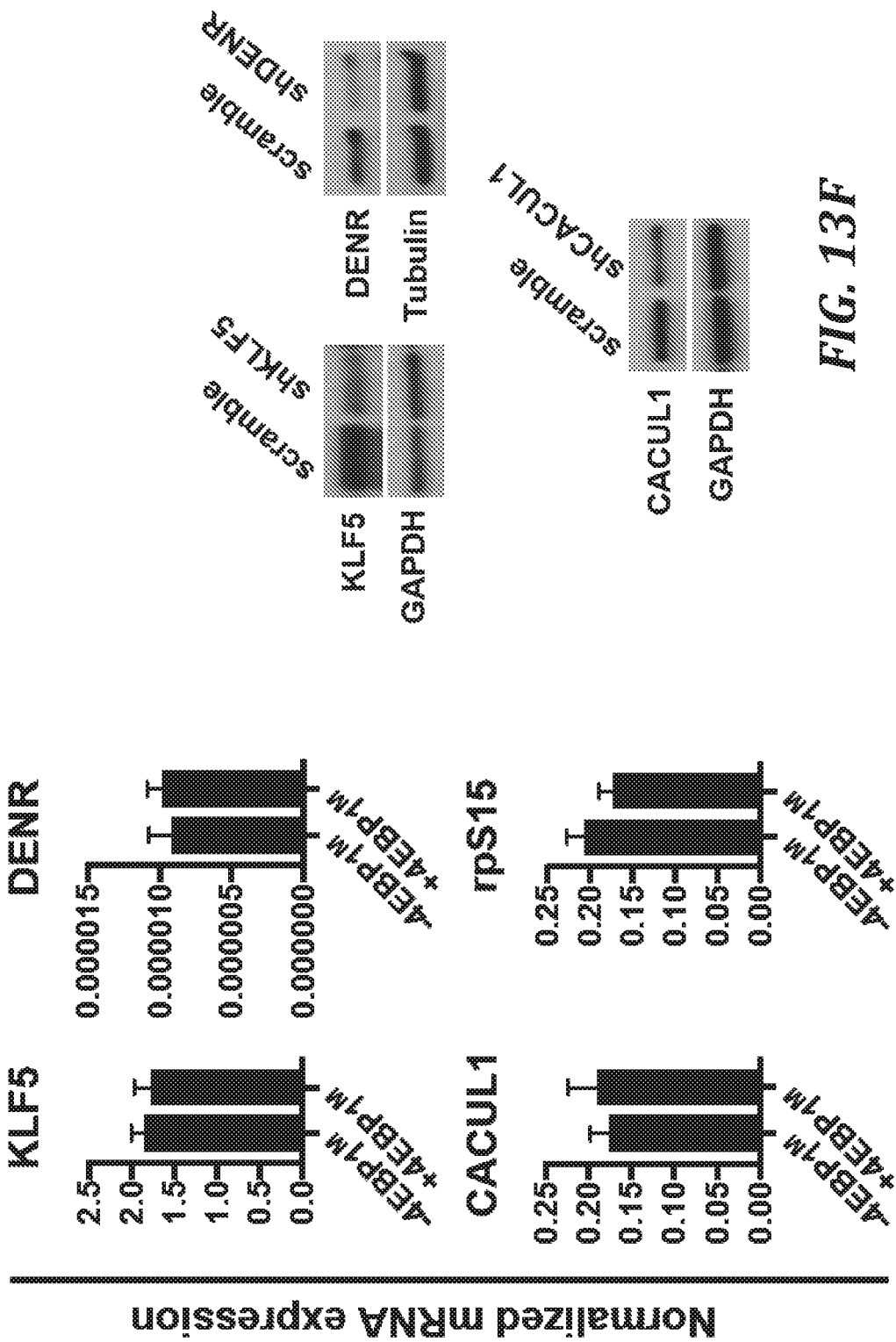

FIG. 13E shows qPCR analysis of Klf5, Denr, Cacul1, and Rps15 in Pten$^{L/L}$;4ebp1$^M$ organoids with or without induction of the 4EBP1$^M$ (actin=normalization, 3 biological replicates per condition).

FIG. 13F shows representative western blots of castrate Pten$^{L/L}$ organoids upon knockdown with shRNAs targeting Klf5, Denr, and Cacul1.

Figure 14A:
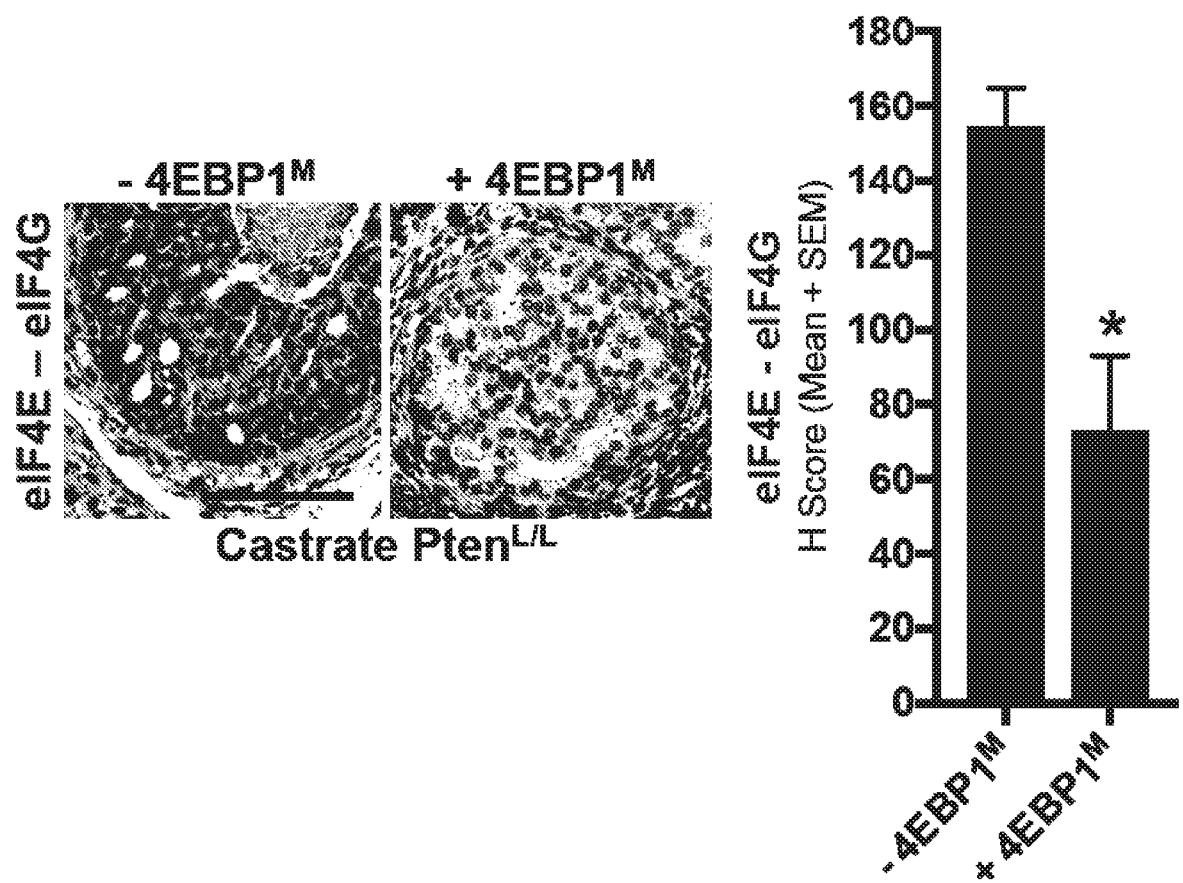
Figures 14B, 14C:
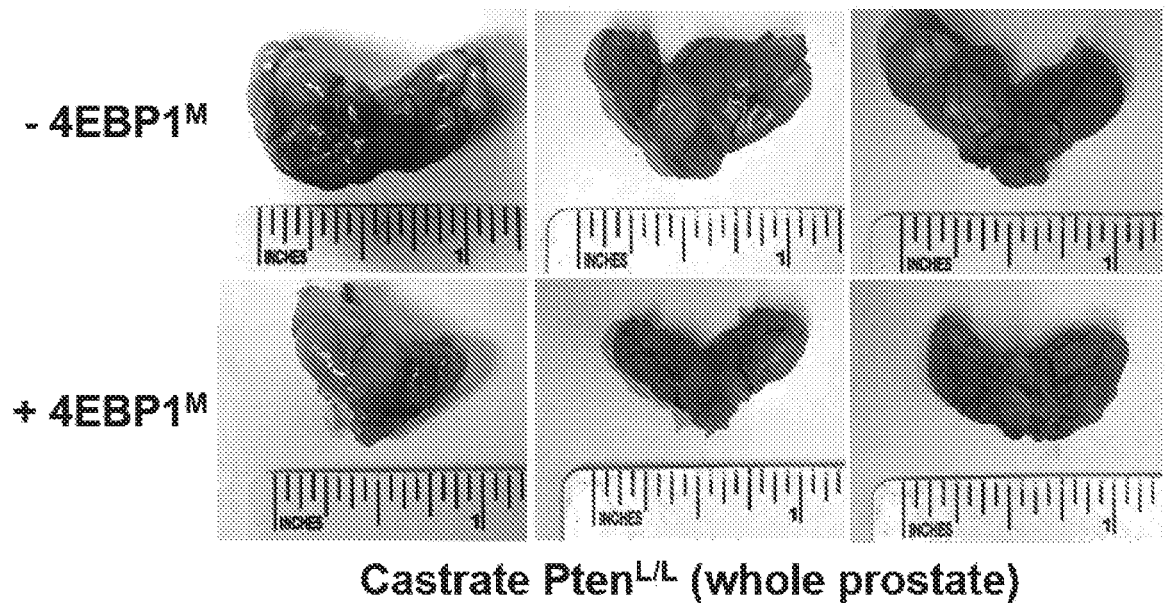

FIGS. 14A-14C show that decreased eIF4F complex formation by 4EBP1$^M$ results in smaller and less aggressive tumors in castrate Pten$^{L/L}$;4ebp1$^M$ mice. Data presented as mean+/−SEM.

FIG. 14A shows an in vivo validation of the eIF4E-eIF4G proximity ligation assays in castrate Pten$^{L/L}$;4ebp1$^M$ mice treated with vehicle (−4EBP1$^M$) or doxycycline (+4EBP1$^M$) (left panel, scale bar=100 m). Quantification of the proximity ligation assay (right panel, vehicle—n=6, doxycycline—n=9, *P=0.004, t-test).

FIG. 14B shows representative images of Pten$^{L/L}$;4ebp1$^M$ whole prostates with or without induction of the 4EBP1$^M$ transgene in the progression experiment (FIGS. 4D-4G).

FIG. 14C shows blinded mouse pathologist review of Pten$^{L/L}$;4ebp1$^M$ ventral prostates after 12 weeks of castration followed by an additional 12 weeks of treatment with vehicle or doxycycline.

Figure 15A:
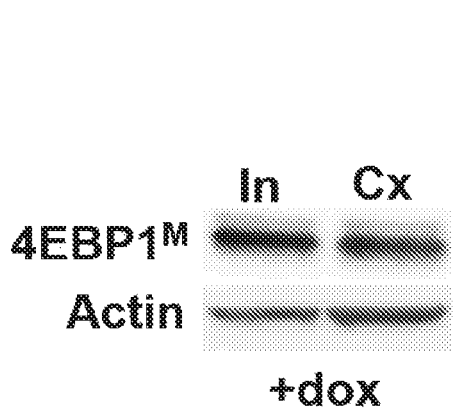
Figure 15B:
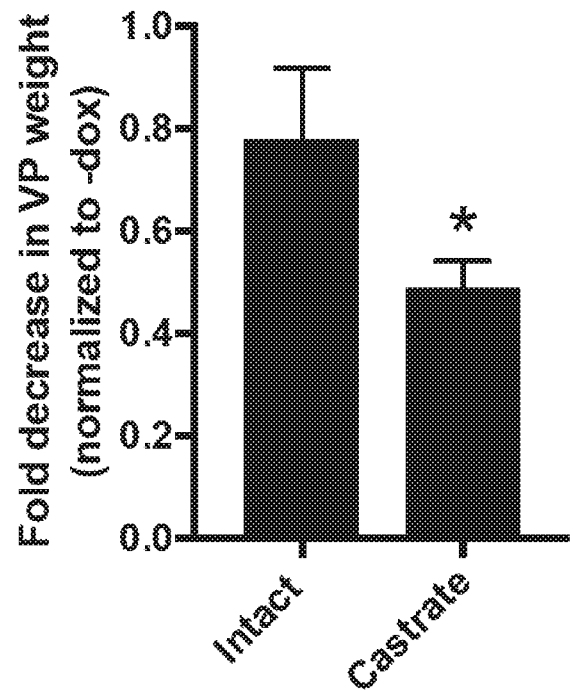
Figure 15C:
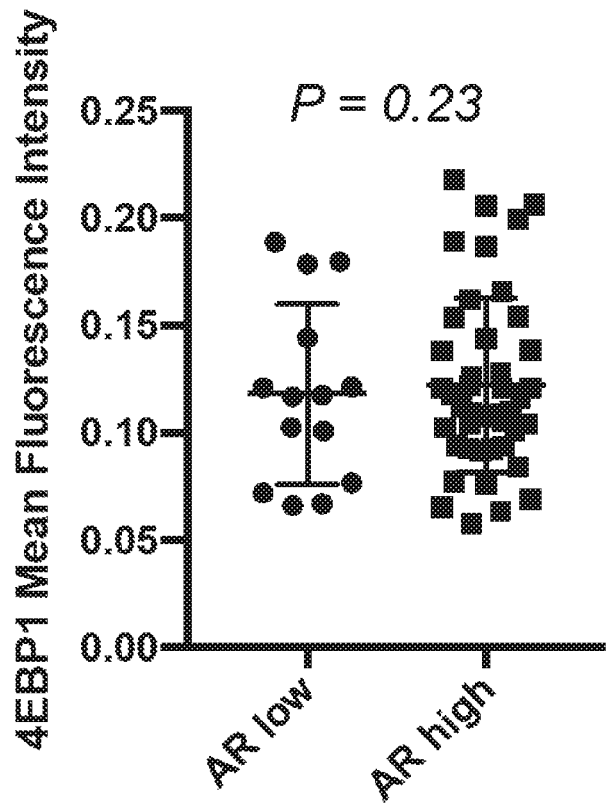

FIGS. 15A-15C demonstrate that astrate Pten$^{L/L}$ mice exhibit increased sensitivity to eIF4F disruption; 4EBP1 abundance is independent of AR in hormone-sensitive prostate cancer. Data presented as mean+/−SEM.

FIG. 15A is a representative 4EBP1$^M$ western blot of intact (In) and castrate (Cx) Pten$^{L/L}$;4ebp1$^M$ primary cells cultured in 0.25 µM doxycycline.

FIG. 15B shows relative decrease in ventral prostate weights of intact and castrate Pten$^{L/L}$;4ebp1$^M$ mice with doxycycline normalized to control-treated intact and castrate Pten$^{L/L}$;4ebp1$^M$ mice respectively (n=15 intact, n=5 intact+ dox, n=8 castrate, and n=8 castrate+dox, P=0.047, t-test).

FIG. 15C shows mean fluorescence intensity of 4EBP1 in AR-low and AR− high treatment-naïve hormone-sensitive prostate cancer patient specimens. AR abundance was determined by IHC (n=14 AR low, n=44 AR high, P=0.23, t-test).

Figure 16A:
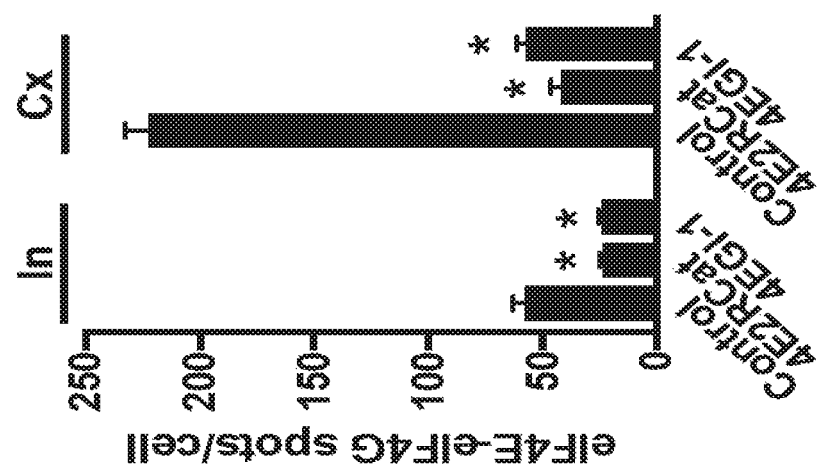
Figure 16A:
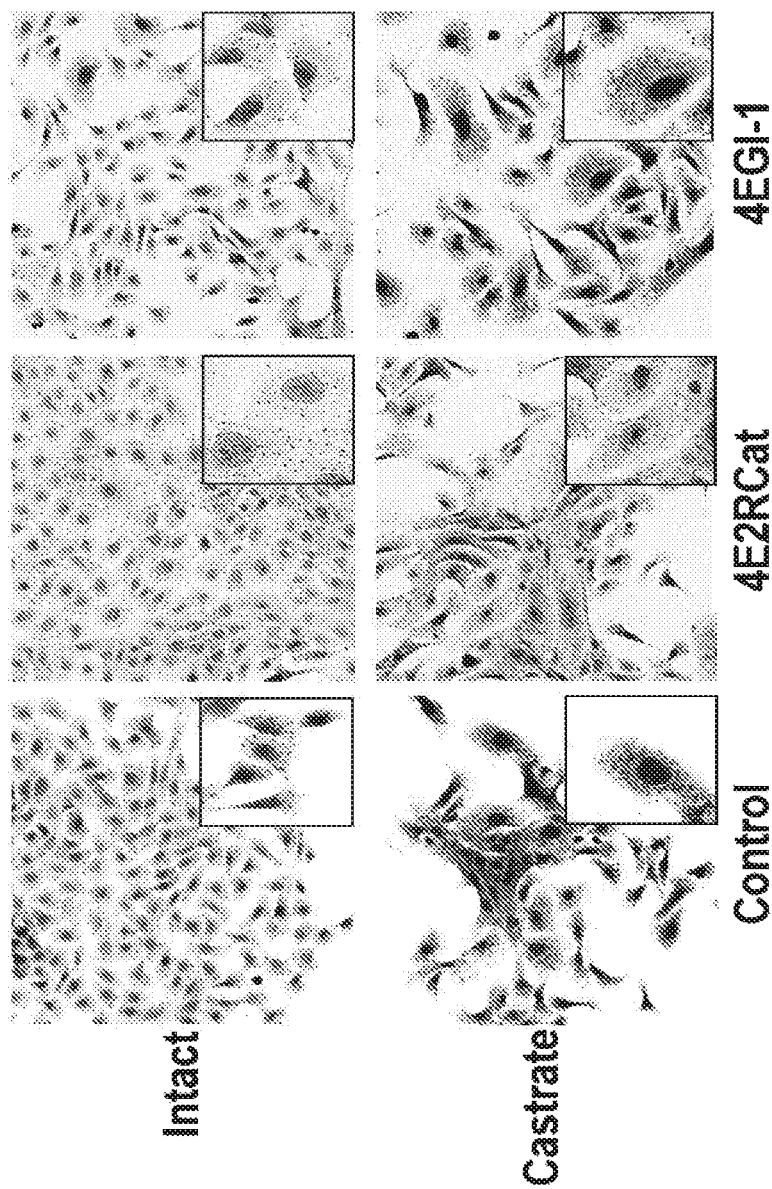
Figure 16B:
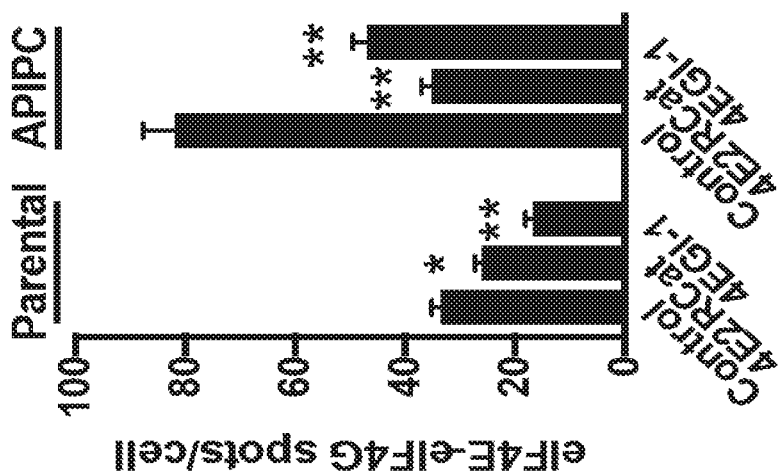
Figure 16B:
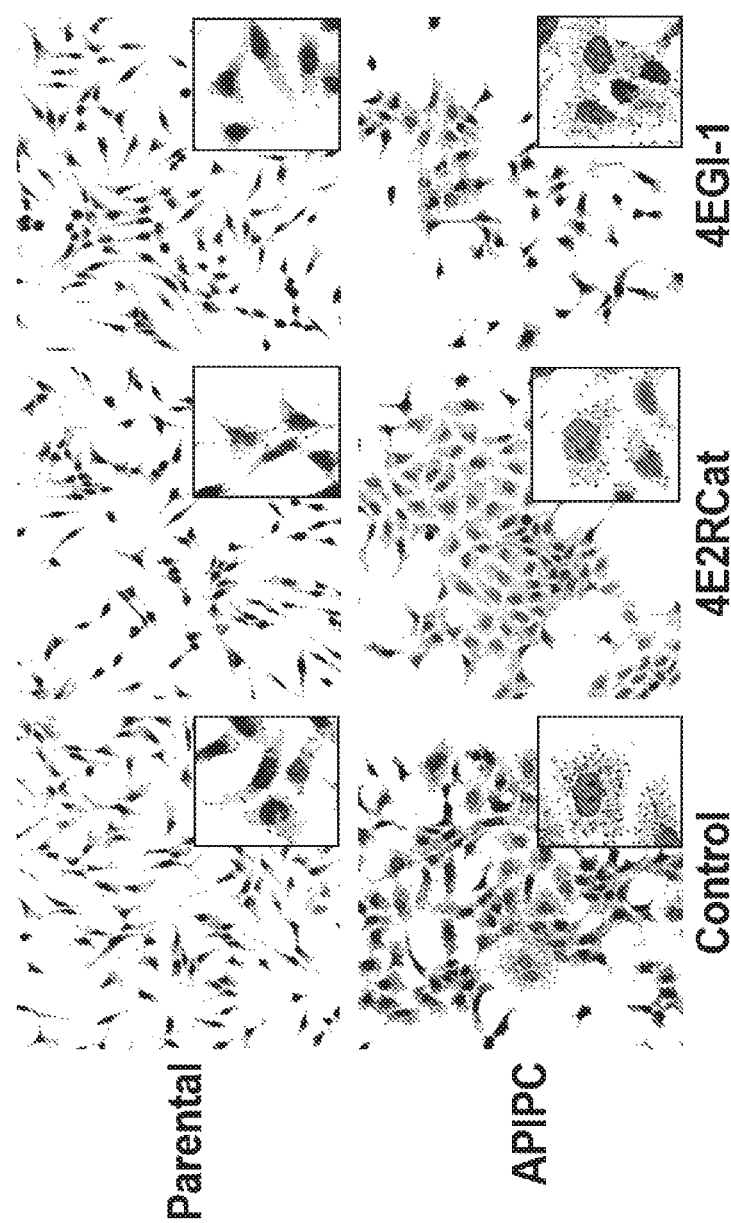

FIGS. 16A-16B demonstrate that 4E2RCat and 4EGI-1 disrupt eIF4F complex formation in Pten$^{L/L}$ cells, AR+ parental, and AR− APIPC cells. All scale bars=100 µm. Data presented as mean+/−SEM.

FIG. 16A is representative images with quantification of the proximity ligation assay in intact and castrate Pten$^{L/L}$ cells treated with eIF4E-eIF4G inhibitors 4E2RCat (50 µM) or 4EGI-1 (20 µM) for 24 hours (In=intact, Cx=castrate, assay completed in duplicate, *P<0.0001, t-test,).

FIG. 16B is representative images with quantification of the proximity ligation assay in AR+ parental and AR− APIPC prostate cancer cells treated with eIF4E-eIF4G inhibitors 4E2RCat (10 µM) or 4EGI-1 (10 µM) for 24 hours (assay completed in duplicate, *P=0.0004, **P<0.0001, t-test).

FIGS. 17A-17F demonstrate that AR and eIF4F-targeted combinatorial treatments in LNCaP prostate cancer cells demonstrate anti-tumor activity. Data presented as mean+/−SEM.

Figure 17A:
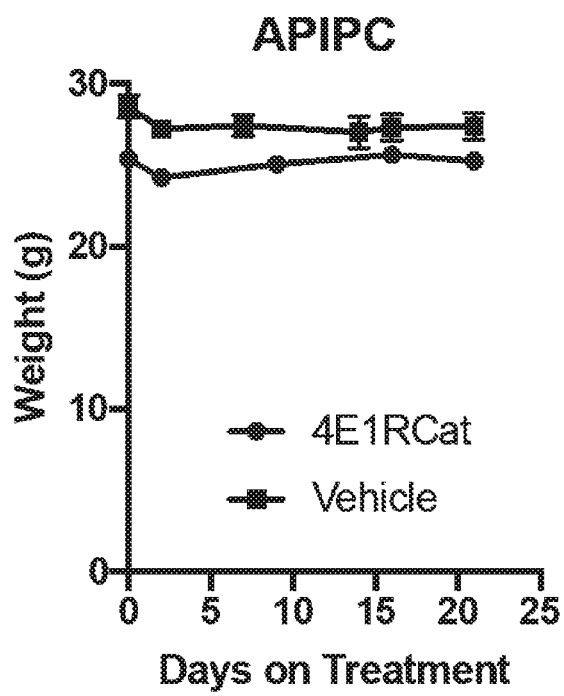

FIG. 17A shows weight in grams (g) of castrated NSG mice with subcutaneous injections of AR-null APIPC cells subjected to treatment with 4E1RCat or vehicle control solution (n≥7 per treatment arm).

Figure 17B:
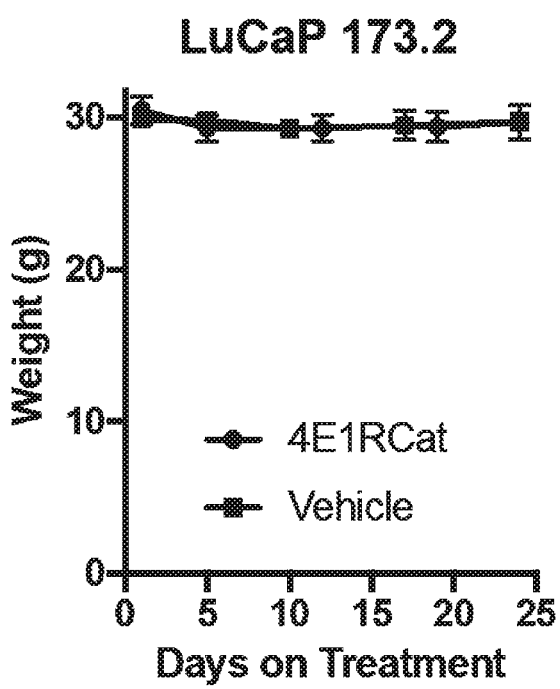

FIG. 17B shows weight in grams of castrated NSG mice implanted in the flanks with the AR-null LuCaP 173.2 PDX model subjected to treatment with 4E1RCat or vehicle control solution (n≥8 per treatment arm).

Figure 17C:
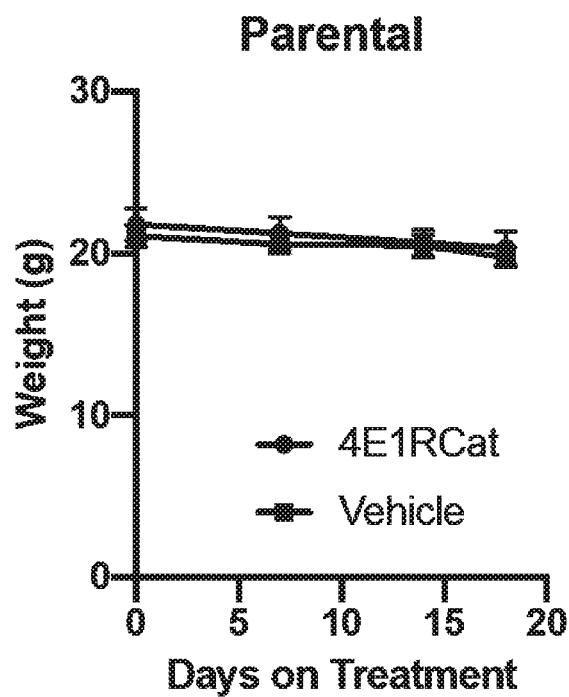

FIG. 17C shows weight in grams of non-castrated NSG mice with subcutaneous injections of AR+ parental APIPC cells subjected to treatment with 4E1RCat or vehicle control solution (n≥7 per treatment arm).

Figure 17D:
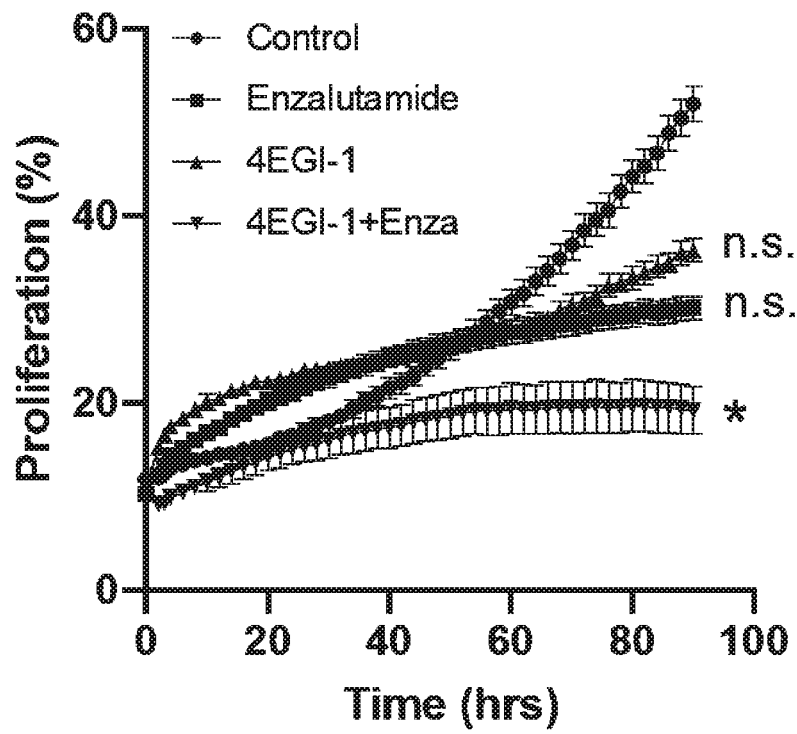

FIG. 17D demonstrates proliferation of AR+ LNCaP prostate cancer cells with control (DMSO), enzalutamide (50 µM), 4EGI-1 (10 µM), or both compounds (50 µM and M, respectively) (≥3 replicates per condition, *P<0.0001, ANOVA).

Figure 17E:
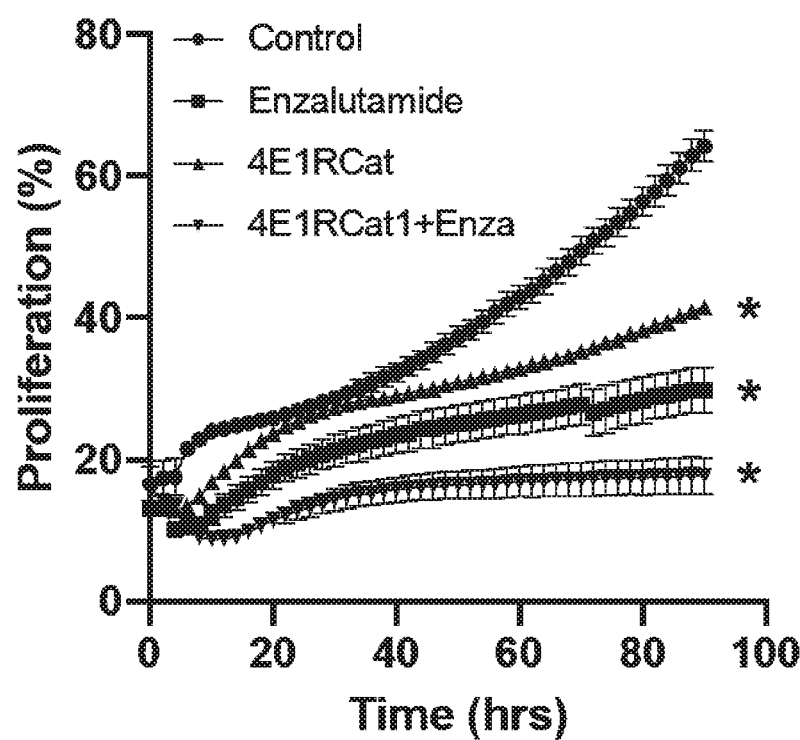

FIG. 17E demonstrates proliferation of AR+ LNCaP prostate cancer cells with control (DMSO), enzalutamide (50 µM), 4E1RCat (3 µM), or both compounds (50 µM and 3 µM, respectively) (≥3 replicates per condition, *P<0.0001, ANOVA).

Figure 17F:
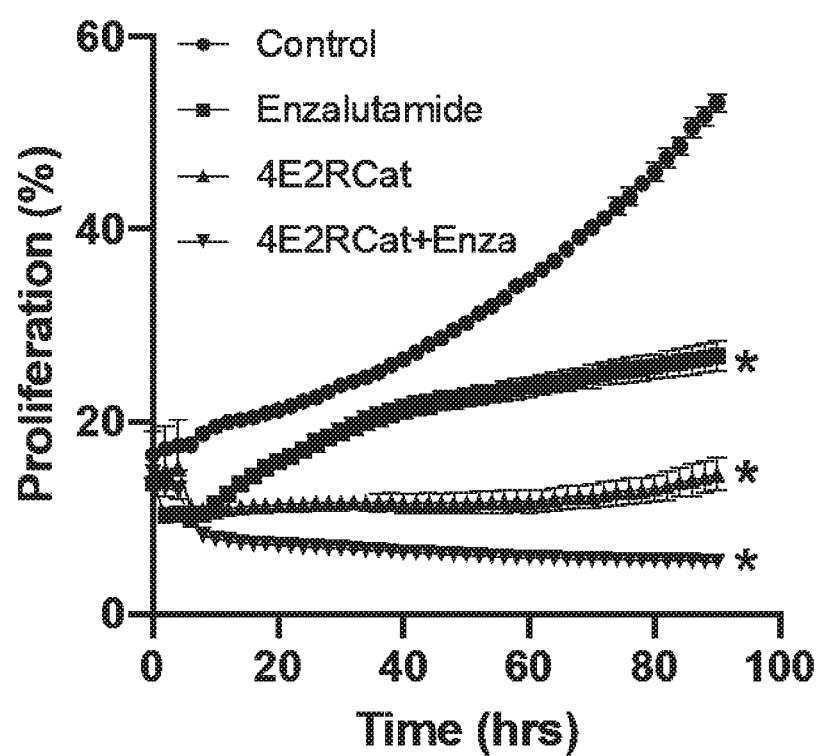

FIG. 17F demonstrates proliferation of AR+ LNCaP prostate cancer cells with control (DMSO), enzalutamide (50 µM), 4E2RCat (2 µM), or both compounds (50 µM and 2 µM, respectively) ((≥3 replicates per condition, *P<0.0001, ANOVA).

Figure 18:
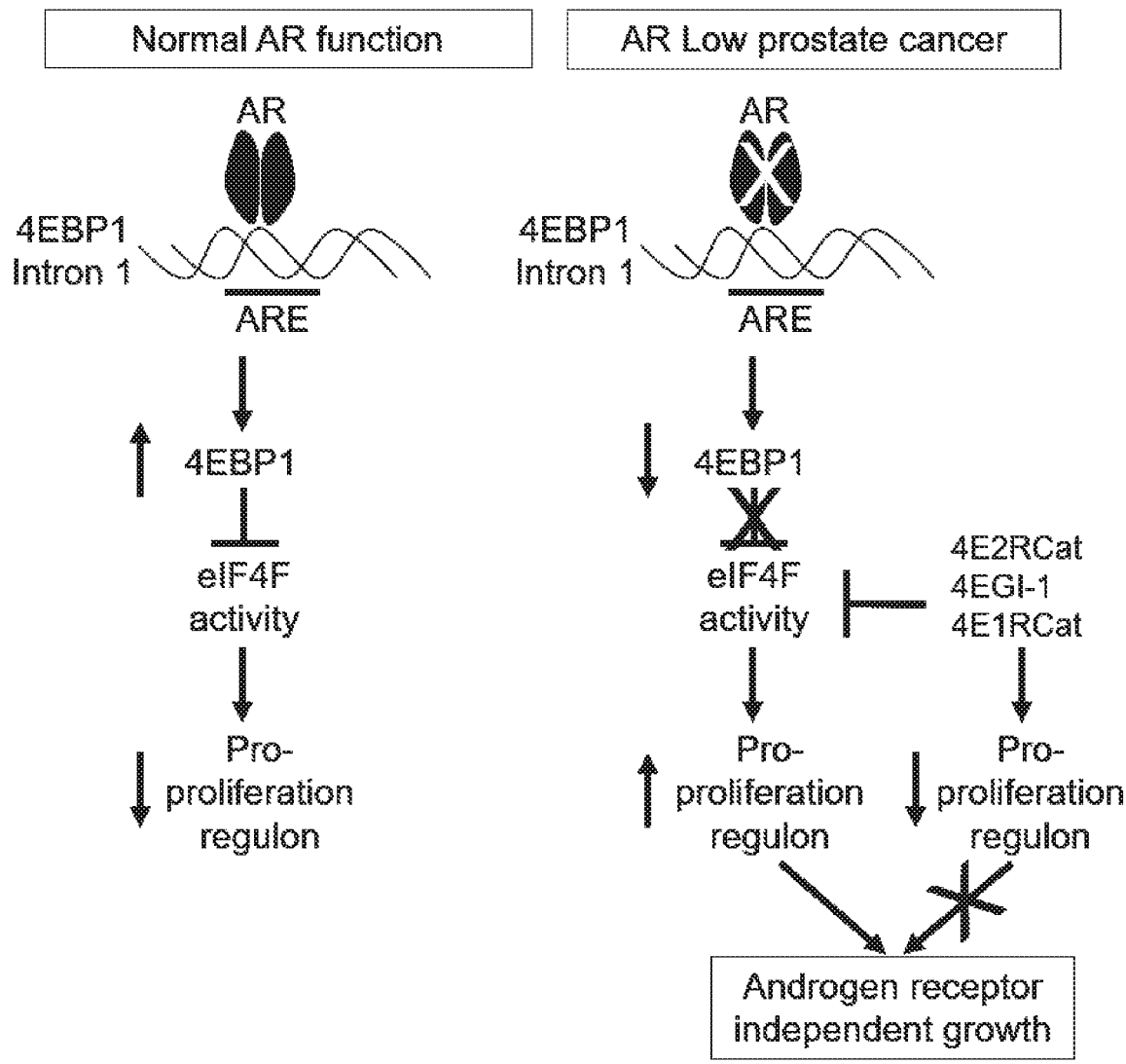

FIG. 18 demonstrates that AR shapes the prostate cancer proteome through 4EBP1 and a druggable pro-proliferation translational regulon.

DETAILED DESCRIPTION

The inventor discovered a cell-autonomous mechanism by which androgen receptor (AR) inhibits translation initiation through the eIF4E binding protein 1 (4EBP1), which limits eIF4F translation initiation complex formation and the proliferative capacity of cells in vivo. The present disclosure also demonstrates that that loss of AR increases eIF4F assembly to drive the translation of a network of pro-proliferation mRNAs that share a conserved and functional guanine-rich motif. Importantly, this network is required for enhanced tumor growth in the setting of low AR. Moreover, it was discovered that in comparison to AR-intact prostate cancer, AR-low prostate cancer has a greater physiologic dependence on eIF4F hyperactivity, which represents a druggable vulnerability. Thus, pharmacologic and/or genetic disruption of the eIF4F complex can decrease tumor growth and improve survival in vivo.

Accordingly, in one aspect, provided herein is a method for treatment of prostate cancer, comprising administering to a subject in need thereof a therapeutically effective amount of an agent that disrupts eIF4F translation-initiation complexes.

In certain embodiments, the prostate cancer treatable by the methods disclosed herein is an androgen-receptor deficient prostate cancer or androgen-receptor low prostate cancer. In some embodiments, the prostate cancer treatable by the methods disclosed herein is an androgen receptor-low cancer prostate cancer. In other embodiments, the prostate cancer is castration-resistant prostate cancer (CRPC).

Any agent that disrupts the eIF4F translation-initiation complexes can be used in the methods disclosed herein. Suitable agents include agents that disrupt eIF4E-eIF4G complexes and agents that prevent formation of eIF4E-eIF4G complexes. In some embodiments, the agent is a small molecule. Exemplary agents suitable for use in the methods disclosed herein include but are not limited to 4-[(3E)-3-[[5-(4-nitrophenyl)furan-2-yl]methylidene]-2-oxo-5-phenylpyrrol-1-yl]benzoic acid (4E1RCat), 5-[5-[(E)-(3-Benzyl-4-oxo-2-sulfanylidene-1,3-thiazolidin-5-ylidene)methyl]furan-2-yl]-2-chlorobenzoic acid (4E2RCat), α-[2-[4-(3,4-Dichlorophenyl)-2-thiazolyl]-hydrazinylidene]-2-nitrobenzene-propanoic acid (4EGI-1), their analogs, and combinations thereof.

In some embodiments, the agent that disrupts eIF4F translation-initiation complexes is a peptide or a peptide mimetic. Particularly suitable peptide mimetics include peptide mimetics of eIF4E-binding proteins such as mimetics of the eukaryotic translation initiation factor 4E (eIF4E)-binding protein 1 (4EBP1 or 4E-BP1). 4E-BP1 is a member of a family of translation repressor proteins, and a well-known substrate of mechanistic target of rapamycin (mTOR) signaling pathway. Phosphorylation of 4E-BP1 causes its release from eIF4E to allow cap-dependent translation to proceed. Accordingly, in some embodiments, the agents useful in the methods disclosed herein are peptide mimetics of non-phosphorylated 4EBP1.

In some embodiments, peptide mimetics of 4EBP1 suitable for use in the methods disclosed herein include stapled peptides. In some embodiments, the stapled peptide is a hydrocarbon-stapled peptide. As used herein, a "stapled peptide" is a peptide that comprises a synthetic brace ("staple") moiety. Peptide stapling is used to enhance pharmacologic performance of peptides by locking the peptide in a specific conformation. Stapled peptides can be prepared according to the methods known in the art, for example, by incorporating olefin terminated, non-natural amino acids as building blocks into a peptide precursor and forming a stapled peptide by reacting one olefin groups with an adjacent olefin group, e.g., as described in Walensky L D, Bird G H. Hydrocarbon-stapled peptides: principles, practice, and progress. *J Med Chem.* 2014; 57(15):6275-6288, the disclosure of which is incorporated herein by reference.

In certain embodiments, the methods disclosed herein further comprise lowering the activity of the androgen receptor in the subject. Thus, in some embodiments, the methods of the disclosure further comprise administering a therapeutically effective amount of an androgen lowering agent, an androgen receptor blocker, or a combination thereof to a subject in need of treatment of prostate cancer. Non-limiting examples of suitable androgen blockers include enzalutamide, bicalutamide, apalutamide, flutamide, nilutamide, finasteride, dutasteride, and combinations thereof. Non-limiting examples of suitable androgen lowering agents include abiraterone, TAK700, buserelin, goserelin, leuproelin, degarelix, and combinations thereof. In some embodiments, the androgen lowering agent enzalutamide or abiraterone. In some embodiments, the androgen receptor blocker or androgen lowering agent is administered with or prior to administration of an agent that disrupt eIF4F translation-initiation complex formation or activity. In some embodiments, the androgen receptor blocker or any other agent that lowers AR activity is used to prime the prostate cancer for sensitivity to agents that decrease eIF4F complex formation or activity. Thus, such agent is administered first to lower the AR activity in a patient prior to beginning the treatment with an agent that decreases eIF4F complex formation or activity.

In some embodiments of the methods disclosed herein, the agents that disrupt eIF4F translation-initiation complexes include agents that reduce the translation of eIF4E-dependent mRNAs. In certain embodiments, the agent blocks binding of eIF4E to mRNA. In some embodiments, the agent is an eIF4A inhibitor. Any suitable eIF4A inhibitor can be used in the methods of the disclosure, for example, silvesterol, hippuristanol, rocaglates, pateamine A, elatol, sanguinarine, elisabatin A, 15d-PGJ2, eFT226, or a combination thereof.

In a second aspect, provided herein are methods for treatment of prostate cancer, comprising administering to a subject in need thereof a therapeutically effective amount of agent that inhibits activity of the eIF4E translation initiation factor.

Prostate cancers treatable by administering to a subject in need thereof a therapeutically effective amount of agent that inhibits activity of the eIF4E translation initiation factor include androgen receptor-deficient cancer or androgen receptor-low cancer. In certain embodiments, the prostate cancer is castration-resistant prostate cancer (CRPC).

The methods can further comprise administering a therapeutically effective amount of an androgen lowering agent, an androgen receptor blocker, or a combination thereof. Suitable agents include enzalutamide, bicalutamide, apalutamide, flutamide, nilutamide, finasteride, dutasteride, abiraterone, TAK700, buserelin, goserelin, leuproelin, degarelix, relugolix, and combinations thereof. In some embodiments, the androgen receptor blocker or androgen lowering agent is administered with or prior to administration of an agent that disrupt eIF4F translation-initiation complexes and/or lowers eIF4E activity.

The agent that inhibits the activity of eIF4E can work by any known mechanism. Agents that inhibit eIF4F complex formation, eIF4E activity, or eIF4E-dependent mRNA translation can be used in the methods disclosed herein. In certain embodiments of the methods disclosed herein, the agent that inhibits the activity of the eIF4E translation initiation factor is an agent that blocks binding of eIF4E to mRNA. In some embodiments, suitable agents include peptide mimetics of 4EBP1, such as stapled peptide mimetics of 4EBP1 which can be prepared as described above. In other embodiments, the agents include eIF4E inhibitors and mTOR inhibitors. In some embodiments, two or more agents that inhibit the activity of eIF4E can be used in the methods disclosed herein. In some embodiments, the agent is a 5'-cap mimetic.

Agents used in the methods disclosed herein can be administered in any suitable manner known in the art. The agents used in the methods disclosed herein can be administered orally or parenterally and can be in the form of a solid preparation (tablets, capsules, granules, fine granules, powders, etc.) or a liquid preparation (syrups, injections, etc.) supplemented with pharmaceutically acceptable carriers. Various organic or inorganic carrier substances routinely used as pharmaceutical materials are used as the pharmaceutically acceptable carriers. Solid formulations typically comprise an excipient, a lubricant, a binder, a disintegrant, or mixtures thereof. Liquid formulations typically comprise a solvent, a solubilizer, a suspending agent, a tonicity agent, a pH adjuster, a buffering agent, a soothing agent, or combinations thereof. Pharmaceutical additives such as antiseptics, antioxidants, colorants, and/or sweeteners can be further included in the formulations. Examples of the excipients include lactose, saccharose, D-mannitol, starch, crystalline cellulose, and light anhydrous silicic acid. Examples of the lubricant include magnesium stearate, calcium stearate, talc, and colloidal silica. Examples of suitable binders include crystalline cellulose, saccharose, D-mannitol, dextrin, hydroxypropylcellulose, hydroxypropylmethylcellulose, and polyvinylpyrrolidone. Examples of suitable disintegrants include starch, carboxymethylcellulose, calcium carboxymethylcellulose, sodium croscarmellose, and sodium carboxymethyl starch. Examples of suitable solvents include injectable water, alcohols, propylene glycol, Macrogol, sesame oil, and corn oil. Examples of suitable solubilizers include polyethylene glycol, propylene glycol, D-mannitol, benzyl benzoate, ethanol, trisaminomethane, cholesterol, triethanolamine, sodium carbonate, and sodium citrate. Suitable suspending agents include surfactants, such as stearyl triethanolamine, sodium lauryl sulfate, lauryl aminopropionic acid, lecithin, benzalkonium chloride, benzethonium chloride, and glycerin monostearate, and hydrophilic polymers such as polyvinyl alcohol, polyvinylpyrrolidone, sodium carboxymethylcellulose, methylcellulose, hydroxymethylcellulose, hydroxyethylcellulose, and hydroxypropylcellulose. Suitable tonicity agents include sodium chloride, glycerin, and D-mannitol, and suitable buffering agents include phosphate, acetate, carbonate, and citrate buffer solutions.

Examples of dosage forms suitable for parenteral administration can include injections, drops, suppositories, percutaneous absorption formulations, transmucosal absorption formulations, and inhalants for intravenous administration, intracutaneous administration, subcutaneous administration, or intramuscular administration. Examples of dosage forms suitable for oral administration can include capsules, tablets, and syrups. When the therapeutic agent of the present methods is a peptide compound, its dosage form is preferably a dosage form suitable for parenteral administration, for example, an injection, drops, or an inhalant. Various such dosage forms are known to those skilled in the art. Those skilled in the art can appropriately select a dosage form suitable for the desired administration route and can produce a preparation in the form of a pharmaceutical composition using, if necessary, one or two or more pharmaceutical additives that may be used in the art. Alternatively, a peptide compound can be orally administered in the form of a preparation unsusceptible to digestion in the gastrointestinal tract, for example, in the form of a microcapsule comprising the active ingredient peptide enclosed in a liposome. Another possible administration method involves absorption through a mucosal membrane other than the gastrointestinal mucosa, such as rectal mucosa, nasal mucosa, or hypoglossal mucosa. In this case, the agent can be administered in the form of a suppository, a nasal spray, an inhalant, or a sublingual tablet to the individual. Alternatively, a preparation improved in terms of the retention of the peptide in blood by the adoption of, for example, a controlled-release preparation or a sustained release preparation containing a polysaccharide such as dextran or a biodegradable polymer typified by polyamine or PEG as a carrier can also be used in the methods disclosed herein.

When the methods include administration of more than one therapeutic agent or drug, the agents can be administered simultaneously or almost simultaneously (e.g., within 1 hour) or can be administered in a staggered manner at an interval of several hours. For example, a first drug is administered every day, immediately followed by the administration of a second drug. Typically, the first and second drugs are administered at times suitable for these drugs to exert their effects. In this way, these drugs can be used in combination.

As used herein, the term "about" indicates that the subject value can be modified by plus or minus 5% and still fall within the disclosed embodiment.

While each of the elements of the present disclosure is described herein as containing multiple embodiments, it should be understood that, unless indicated otherwise, each of the embodiments of a given element of the present invention is capable of being used with each of the embodiments of the other elements of the present invention and each such use is intended to form a distinct embodiment of the present invention.

The referenced patents, patent applications, and scientific literature referred to herein are hereby incorporated by reference in their entirety as if each individual publication, patent or patent application were specifically and individually indicated to be incorporated by reference.

While illustrative embodiments have been illustrated and described, it will be appreciated that various changes can be made therein without departing from the spirit and scope of the invention.

As can be appreciated from the disclosure above, the present invention has a wide variety of applications. The invention is further illustrated by the following examples, which are only illustrative and are not intended to limit the definition and scope of the invention in any way.

EXAMPLES

It has been shown that the process of translation initiation is a critical driver of prostate cancer pathogenesis. In particular, the cap-dependent translation initiation factor and oncogene eIF4E is necessary for the genesis and progression of prostate cancer mediated by loss of the tumor suppressor PTEN and may be a driver of drug resistance. However, the fundamental question remains: how do AR and the translation initiation complex interplay? This is a critical issue because to date, no inhibitors targeting translation regulators have shown broad efficacy in prostate cancer patients.

The inventor discovered a cell-autonomous mechanism by which AR inhibits translation initiation through the eIF4E binding protein 1 (4EBP1), which limits eIF4F translation initiation complex formation and the proliferative capacity of cells in vivo. It was also shown that loss of AR increases eIF4F assembly to drive the translation of a network of pro-proliferation mRNAs that share a conserved and functional guanine-rich motif. Importantly, this network is required for enhanced tumor growth in the setting of low AR. Moreover, it was demonstrated that in comparison to AR-intact prostate cancer, AR-low prostate cancer has a greater physiologic dependence on eIF4F hyperactivity, which represents a druggable vulnerability. Pharmacologic and genetic disruption of the eIF4F complex decreases tumor growth and improves survival in vivo. As such, a link between mRNA transcription and translation has been identified that defines a specific treatment-resistant form of prostate cancer and is particularly vulnerable to translation inhibition.

Materials and Methods

Study Design

The goal of this study was to delineate the functional relationship between AR signaling and the process of mRNA translation and to define the preclinical relevance of targeting protein synthesis based on AR status. This objective was accomplished by (i) mechanistically dissecting the functional relationship between AR and 4EBP1, (ii) using tissue-based ribosome profiling to identify and validate AR-controlled translationally regulated mRNAs, (iii) validating the relationship between AR and 4EBP1 in prostate cancer across multiple model systems, and (iv) conducting a series of in vitro and in vivo preclinical trials delineating the therapeutic efficacy of targeting eIF4E-eIF4G interactions in AR-low prostate cancer. For all experiments, the sample sizes were determined on the basis of experience and published literature, which historically showed that these in vivo models are highly penetrant and universally develop tumors. The maximum number of mice available for a given experiment was used based on the following criteria: the number of GEMMs available for each age group and post-castration cohort, and tumor availability after implantation of human tissue specimens and cell lines. For all studies, mice were randomly assigned to each treatment group. All pathology analyses were conducted by a blinded veterinarian pathologist. The numbers of replicates are specified within each figure legend.

Mice

PB-cre mice were obtained from the Mouse Models of Human Cancer Consortium. $Pten^{L/L}$ and Rosa-LSL-rtTA mice were obtained from the Jackson Laboratory. TetO-4ebp1$^M$ mice were generated as previously described. All mice were maintained in the C57BL/6 background under specific-pathogen-free conditions, and experiments conformed to the guidelines as approved by the Institutional Animal Care and Use Committee of Fred Hutchinson Cancer Research Center (FHCRC).

Surgical Castration

Surgical castrations were performed with 4- to 6-month-old mice under isoflurane anesthesia. Postoperatively, mice were monitored daily for 5 days. To test CRPC initiation, doxycycline (Sigma) was administered in the drinking water at 2 g/liter immediately after castration, and euthanasia was performed 8 weeks after castration. To test CRPC progression, 12 weeks after castration, doxycycline was administered for 12 weeks, and euthanasia was performed 24 weeks after castration.

LuCaP, Localized Treatment-Naïve HSPC, and Metastatic CRPC Tissue Microarrays

The tissue microarrays were obtained from the University of Washington (UW) Genitourinary Cancer Research Laboratory. All patients were consented and samples were obtained under the UW Institutional Review Board approved protocol 2341.

In Vivo Puromycinylation Assay

Mice were injected intraperitoneally with 200 µl of 2.5 mM puromycin (Fisher Scientific) and euthanized after 1 hour. Ventral prostates were formalin-fixed, paraffin-embedded. Conventional immunofluorescence against puromycin (Millipore) was performed as described in Supplementary Materials with antigen retrieval at 95° C. for 30 min and additional incubation with M.O.M. Blocking Reagent (Vector) for 1 hour at room temperature.

AR+ Parental, AR− APIPC, and LuCaP 173.2 PDX 4E1RCat Preclinical Trials $1×10^6$ AR+ parental and AR− APIPC cells were resuspended 1:1 in Matrigel (Corning): RPMI-1640 (Gibco) and subcutaneously injected into the flanks of intact or castrate NOD-scid IL2Rgamma$^{null}$ mice respectively. $1×1×1$ mm$^3$ of LuCaP 173.2 tumor chunks were implanted into the flank of castrate mice. Tumor volume was calculated using the formula $(L(W^2))/2$, where L is the length of the tumor and W the width. When tumors reached 100 mm$^3$, animals were randomized to receive intraperitoneal injections of 15 mg/kg 4E1RCat (Selleckchem) or vehicle (5.2% PEG400 and 5.2% TWEEN80 in ddH$_2$O), Monday-Friday.

Statistical Analyses

Statistical analyses were performed using GraphPad Prism and the R Stats package, and additional descriptions are provided in the figure legends. For the RNAseq and ribosome profiling analysis, R/Bioconductor packages DESeq2, edgeR, and Xtail were used for statistical analysis. An FDR of <0.1 was considered significant. Experimental raw values were depicted when possible or normalized to internal controls from at least two independent biological replicates, with all data represented as mean+/−SEM unless otherwise specified. When comparing data from two different groups, for example, comparisons between intact and castrate settings or a drug treatment with only two arms, the Student's two-tailed t-test was used to determine significance which was set at a P value <0.05. When more than two groups were compared, such as in the multi-drug treatment study, ANOVA with a Tukey's range test for multiple comparisons was used. The Spearman's correlation coefficient and corresponding P value were used to measure the extent of correlation between AR and 4EBP1 in 29 LuCaP PDX models. The Pearson's $\chi^2$-test was used for the correlation analysis of the GRTE. The Kaplan-Meier method with the log-rank test was used for the xenograft and PDX survival analysis.

Cell Lines

Human APIPC cell lines were provided by P.S.N., and grown as previously described (11). PC3-4EBP1$^M$, VCaP, 22Rv1, C4-2, and LNCaP cells were cultured in RPMI-1640 with 10% FBS or phenol-red free RPMI with 10% charcoal stripped FBS (Gemini). Intact/castrate Pten$^{L/L}$;4ebp1$^M$ mouse prostates were harvested at 16 weeks of age, microdissected, and minced using a scalpel. Tissue chunks were incubated in 5 mg/ml collagenase II (Gibco) in Dulbecco's modified Eagle's medium for 1 hour at 37° C., followed by 5 min further digestion with TrypLE (Thermo Fisher). The dissociated cells were passed through a 40 m nylon mesh (Falcon) to obtain single cells. Twenty thousand cells were embedded in 50 µl of Matrigel (Corning) and plated on 24-well ultra-low attachment plates (Corning). Medium components include the following: Advanced Dulbecco's Modified Eagle Medium containing B-27 supplement (Gibco), 1.25 mM N-Acetyl-L-cysteine (Sigma), 50 ng/ml EGF (Peprotech), 200 nM A83-01 (Tocris Bioscience), 500 ng/ml R-spondin1 (conditioned medium and R-spondin1 expressing plasmid provided by Y.C.), 10 µM Y-27632 (Sigma), and 100 ng/ml Noggin (Peprotech). Cells from intact prostates were cultured in 1 nM dihydrotestosterone (Sigma). Established organoids were passaged as 3D organoids or cultured as 2D cells.

Immunohistochemistry (IHC) and Immunofluorescence (IF)

Whole mouse prostates were micro-dissected into individual lobes, formalin-fixed, paraffin-embedded, and cut into 5-micron-thick sections. Human PDX tissue sections were provided by the University of Washington Genitourinary Cancer Research Laboratory. An automated staining processor (Ventana Discovery Ultra Platform) was used for the IHC detection of the following antibodies: AR (GeneTex) and Ki67 (Abcam). Conventional IHC was performed on tissues with the following antibodies: AR (Millipore), chromogranin A (Abcam). Conventional IF was performed for 4EBP1 (CST). Sections were deparaffinized and rehydrated. Heat-induced antigen retrieval was performed using citrate-based antigen unmasking solution (Vector) at 125° C. for 15 min. Sections were incubated in TBS containing 5% goat serum and 1% BSA for 2 hours at room temperature, followed by incubation with primary antibodies overnight at 4° C. IHC detection was performed with the Dako EnVision+ System-HRP (Agilent) kit. For IF detection, sections were incubated with secondary antibodies conjugated to Alexa-Fluor 594 (Invitrogen). For IF signal amplification of AR (SCBT), p-AKT S473 (CST), eIF4E (SCBT), eIF4A (CST), and eIF4G (CST), biotinylated immunoglobulins (Vector) were applied after incubation with primary antibody, followed by incubation with streptavidin Alexa Fluor 594 conjugate (Invitrogen). All IF slides were mounted using Vectashield Hardset with DAPI (Vector).

RNASeq

Ventral prostate tissue samples were cored out of frozen tissue blocks using a 2 mm diameter disposable biopsy punch with plunger (Integra) on dry ice or in a −20° C. cryostat. Total RNA was extracted using the RNeasy Mini Plus Kit, (Qiagen). On-column DNase digestion was performed. RNA concentration, purity, and integrity were assessed by NanoDrop (Thermo Fisher) and a 2100 Bioanalyzer (Agilent). RNASeq libraries were constructed from 1 µg total RNA using the Illumina TruSeq Stranded mRNA LT Sample Prep Kit (Illumina) according to the manufacturer's protocol. Barcoded libraries were pooled and sequenced on an Illumina HiSeq 2500, generating 50 bp paired-end reads.

Western Blot Analysis

Cells were lysed for 30 min on ice in lysis buffer containing 150 mM NaCl, 50 mM Tris, 4 mM KCl, 1 mM $MgCl_2$ 1 mM $Na_3VO_4$ 10% glycerol, 1% Nonidet P-40, supplemented with phosphatase and protease inhibitor cocktails (Roche). Lysates were cleared by centrifugation at 12000 rpm for 15 min at 4° C. Supernatants were removed and assayed for protein concentration using the Protein Assay Dye Reagent (Bio-Rad). Equal amounts of proteins were subjected to SDS-PAGE and transferred to PVDF membranes (Bio-Rad). Membranes were blocked with 5% non-fat milk in PBS-Tween and were subsequently incubated with the following antibodies at 4° C. overnight: AR (N-terminus, Abcam), AR (C-terminus, SCBT), AR (GeneTex), p-AKT (S473, CST), p-AKT (T308, CST), eIF4E (BD Biosciences), eIF4A (CST), eIF4G (CST), 4EBP1 (CST), p-4EBP1 (Thr37/46, CST), KLF5 (Abcam), DENR (GeneTex), CACUL1 (GeneTex) FLAG (Sigma), RPS15 (Abcam), PTEN (CST), synaptophysin (CST), chromogranin A (Abcam). Membranes were washed in PBS-Tween and then incubated with HRP-tagged anti-rabbit or anti-mouse secondary antibodies (Thermo Fisher) for 1 hour at room temperature and developed using Pierce blotting substrates. Signal detection was performed using the ChemiDoc Touch Imaging System (Bio-Rad) or standard film, and quantified using ImageJ.

Quantitative PCR

Total RNA was isolated using RNeasy Plus Mini Kit (Qiagen) and reverse-transcribed with iScript Reverse Transcription Supermix (Bio-Rad). cDNA was diluted 1:1 with water. Quantitative PCR was performed with 1 µl cDNA using SsoAdvanced SYBR Supermix (Bio-Rad) with primer sets specific for Ar, 4ebp1, Cacul1, Denr, Klf5, Rps15, Gapdh, luciferase, RPS19, and actin (Table 3). Normalized mRNA expression was calculated using the comparative Ct method.

Cloning of AREs into Luciferase Reporter Plasmid

Luciferase reporters containing mouse and human 4ebp1 intron 1 fragments were constructed by isolating the desired genomic sites by PCR with forward primers containing XhoI sites and reverse primers containing BglII sites. PCR fragments were digested with XhoI/BglII (NEB) and cloned into the pGL4.28 destination vector (Promega). The genomic coordinate for the mouse ARE and its flanking sequences in 4ebp1 is chr8: 28371406-28371752 (MM9). The genomic coordinate for the human ARE and its flanking sequences in 4ebp1 is chr8: 38031077-38031589 (Hg38). Mouse 4ebp1 ARE was mutated by deleting chr8: 28371582-28371596 from the WT mouse ARE insert using the Q5 Site-Directed Mutagenesis Kit (NEB). The cloning primers are described in table 3.

ARE Luciferase Reporter Assay

LNCaP cells were transfected in T-25 flasks with WT or mutated pGL4.28-ARE-Fluc constructs and Rluc control at a ratio of 100:1 with PolyFect transfection reagent (Qiagen). Transfected cells were re-seeded in phenol-red free RPMI with 10% charcoal stripped FBS with 10 nM mibolerone (Sigma) or EtOH control 24 hours after transfection. Cells were harvested after 48 hours of treatment and assayed using the Dual-Luciferase Reporter Assay (Promega). Expression was normalized by dividing Fluc activity by Rluc activity.

Cycloheximide Chase Assay for 4EBP1 Protein Degradation $Pten^{L/L}$ intact and castrate cells were plated at 30,000 cells/well in Matrigel bathed in medium, and cells were treated with 100 µg/ml cycloheximide (Sigma) 72 hours after seeding. Cells were collected after 0, 2, 4, and 8 hours of cycloheximide treatment, and whole cell lysates were prepared for 4EBP1 immunoblotting. Actin was used as a loading control.

Proximity Ligation Assay

The in-situ proximity ligation assay (PLA) was optimized to detect eIF4E-eIF4G or eIF4E-4EBP1 interactions in intact/castrate $Pten^{L/L}$ and castrate $Pten^L;4ebp1^M$ FFPE tissue sections and adherent cells. FFPE sections were deparaffinized, rehydrated, and subjected to antigen retrieval in a decloaking chamber at 95° C. for 30 min in Tris-based antigen unmasking solution, pH 9 (Vector). After 30 min blocking, primary antibody incubation was performed at 4° C. overnight: eIF4E (SCBT), eIF4G (CST), and 4EBP1 (CST).

Adherent cells were grown on coverslips placed in 6-well plates until 60-70% confluent. $Pten^{L/L}$ intact and castrate cells were treated with 50 µM 4E2RCat (MedChemExpress) and 20 µM 4EGI-1 (Selleckchem) for 24 hours; AR+ parental and AR− APIPC cells were treated with 10 µM 4E2RCat and 10 µM 4EGI-1 for 24 hours. Cells were washed in PBS followed by fixation with 10% formalin for 30 min at room temperature. After post-fixation PBS washes, cells were permeabilized with 0.25% Triton-X100 for 10 min at room temperature. Permeabilized cells were washed using 1× wash buffer followed by 1 hour blocking in a humidity chamber at 37° C. Next, cells were incubated with primary antibodies: eIF4G (CST) and eIF4E (BD Biosciences) for 2 hours at room temperature.

After incubation with primary antibody, both FFPE tissues and adherent cells were subjected to incubation with secondary antibodies conjugated to oligonucleotides (PLA plus/minus probes) for 1 hour at 37° C. The two hybridized oligonucleotides were joined in a closed circle using a ligase at 37° C. for 30 min. The DNA was then amplified with rolling circle amplification, and detection of the amplicons was carried out using the Brightfield detection kit (Sigma). To perform high throughput analysis, slides were scanned using an Aperio Scanscope AT turbo for IHC (Leica biosystems), and the number of PLA signals per cell was counted by semi-automated image analysis (HALO, Indica Labs).

Cap-Binding Assay

Flash frozen intact and castrate $Pten^{L/L}$ ventral prostates dissected from each animal or from AR+ parental and AR− APIPC tumors were pulverized with mortar and pestle in appropriate volumes of lysis buffer containing 10 mM Tris/HCL pH 7.6, 140 mM KCl, 4 mM $MgCl_2$, 1 mM DTT, 1 mM EDTA, 1% Nonidet P-40 supplemented with phosphatase and protease inhibitor cocktails (Roche) and lysed for 30 min on ice. Lysates were cleared by centrifugation at 12000 rpm for 25 min at 4° C. Supernatants were collected and assayed for protein concentration using the Protein Assay Dye Reagent (Bio-Rad). 250 µg of protein were incubated rotating with 50 µl of γ-aminophenyl-m7GTP (C10-spacer)-agarose beads (Jena Bioscience) in lysis buffer without Nonidet P-40 at 4° C. overnight. After two washes in lysis buffer containing 0.5% Nonidet P-40 and two washes in PBS, beads were re-suspended in 60 µl of 1×SDS loading buffer and boiled for 5 min. Thirty microliters of boiled lysates were western blotted for eIF4G, eIF4E, and 4EBP1.

Ribosome Profiling

Flash frozen intact and castrate $Pten^{L/L}$ ventral prostates dissected from each animal were manually pulverized using liquid nitrogen and a biopulverizer and lysed in 1 ml mammalian lysis buffer according to TruSeq Ribo Profile (Mammalian) protocol (Illumina). To impede post-lysis translation, the lysis buffer was supplemented with cycloheximide (Sigma) dissolved in EtOH, at a final concentration of 0.1 mg/ml. For complete tissue lysis, the samples were further mechanically dissociated using a gentleMACS Dissociator (Miltenyi Biotec). Lysates were centrifuged, and the supernatant was used to isolate both total RNA and ribosome-bound fractions using the TruSeq Ribo Profile (Mammalian) kit (Illumina) in accordance with the manufacturer's protocol. Ribosome footprints were generated by treating part of the lysate with the TruSeq Ribo Profile nuclease for 45 min at room temperature. Resulting monosomes were purified using S400 columns (GE Healthcare), from which ribosome-protected mRNA fragments were isolated and used to prepare ribosome footprint libraries per the manufacturer's protocol (Illumina). Barcodes were used to generate pooled libraries. The pools were sequenced on a HiSeq 2500 platform using the SR50 protocol.

Cloning of GRTE-Containing 5' UTRs into Luciferase Reporter Plasmid

The 5' UTRs of Klf5, Denr, and Tcea1 were obtained through PCR of C57BL/6 mouse cDNA using oligonucleotides which contain extensions complementary to the pGL3 reporter plasmid (see table 3). The 5' UTR PCR products were subsequently isolated by gel purification. The pGL3 vector was digested with NcoI, which cuts immediately upstream of the luciferase translation start site. The Klf5, Denr, and Tcea1 5' UTRs were cloned into the linearized pGL3 vector using the Gibson Assembly Master Mix (NEB). The GRTE motif(s) in each of the 5' UTRs were deleted using the Q5 Site-Directed Mutagenesis Kit (NEB).

GRTE Luciferase Reporter Assay 6-well plates were seeded with $PC3-4EBP1^M$ ($2\times10^5$ cells/well) in RPMI medium. After 24 hours, medium was replaced with either normal RPMI medium or RPMI with 0.5 µg/ml doxycycline. 6 hours later, each plate was transfected with either empty pGL3 vector or test vectors. Cells were collected 18 hours after transfection. Half of each well was used for RNA extraction, and half for protein extraction. RNA was extracted using the Qiagen RNEasy kit and used for normalization by qPCR. Protein lysates were used to delineate luciferase activity with the ONE-Glo EX reagent (Promega). Luminescence was detected on a Synergy 2 multi-detection Microplate Reader (Biotek) with an integration time of 2 s and sensitivity of 150.

In Vitro Proliferation Assay

To measure in vitro cell proliferation and the effects of eIF4F inhibition, the IncuCyte ZOOM proliferation assay was used. Primary $Pten^{L/L}$ intact/castrate cells, primary $Pten^{L/L};4ebp1^M$ cells, or parental LNCaP/APIPC cells were seeded at 5000 cells/well in 100 µl of medium each in a 96-well plate. After 24 hours, enzalutamide, 4E1RCat, 4E2RCat, 4EGI-1, or DMSO vehicle control were dispensed at various concentrations using the D300e Digital Dispenser (Tecan Trading AG). Plates were then placed in the IncuCyte ZOOM, and live cell time-lapse imaging without labels was performed. Cell proliferation was monitored by analyzing the occupied area (% confluence) of cell images over time. Cell confluence was normalized to vehicle controls. Graphs were generated using GraphPad Prism.

shRNA-Mediated Knockdown Proliferation Assay

Lentiviruses were packaged by co-transfection of a packaging plasmid and an envelope plasmid in 293TN cells with PolyFect transfection reagent (Qiagen). $Pten^{L/L}$ castrate cells were transduced with lentiviruses expressing scramble control or Cacul1/Denr/Klf5-targeting shRNA from the mouse TRC shRNA library (provided by S.B.). The following day, 100,000 cells were plated on a 10 cm dish to allow proliferation in the absence of EGF for 4 days. Cells were incubated with 10 µM EdU for 30 min 96 hours after seeding. Cells were fixed in 4% PFA for 15 min and permeabilized in saponin-based perm/wash buffer for 15 min (Thermo Fisher). EdU-positive cells were detected with an alkyne-azide reaction using the Click-iT Plus EdU assay (Thermo Fisher). Cells were washed and analyzed using an LSR Fortessa flow cytometer (BD Biosciences). Flow cytometry analysis was performed with FlowJo 8.7. A portion of the cells was pelleted for protein knockdown validation by western blot analysis.

Histopathological Analysis

To perform high-throughput analysis of the whole tissue, slides were scanned using the Aperio Scanscope AT turbo for IHC or an Aperio Scanscope FL for IF (Leica biosystems) (magnification 20-40×). Semi-automated image analysis of the entire neoplastic tissue was performed using HALO software platform (Indica Labs). Analysis modules used were: Area quantification bright field analysis, Cytonuclear bright field and fluorescent modules, ISH, and TMA analysis modules. Violin plots were made using R package ggplot2. Pathological review for grade of tumors and invasion was performed by a veterinary pathologist (S.P.S.P.) in a blinded manner.

RNASeq Analysis

RNASeq reads were aligned to the UCSC mm10 assembly using TopHat2 and counted for gene associations against the UCSC gene database with HTSeq. Differential expression analysis was performed using R/Bioconductor package edgeR. Differentially expressed genes at the transcript level were found using a statistical cutoff of FDR<0.1 and $\log_2$ fold change >1.25 and visualized using R/Bioconductor package pheatmap.

Androgen Receptor ChIPSeq

Raw ChIPSeq data from prostates of $Pten^{L/L}$ deleted mice were obtained from Gene Expression Omnibus (GSE47119) (29) and mapped to NCBI37/mm9 using Bowtie. bigWig format using deepTools with extension of reads by 150 bp was generated and normalized to RPKM. Peaks were displayed using the Integrated Genome Browser. Normal luminal epithelial ChIPSeq data were obtained from the laboratory of Dr. Li Xin (University of Washington).

5' UTR Analysis and Identification of the GRTE

The MEME suite was used for motif discovery and analysis in the 187 genes found to be upregulated in ribosome profiling (FDR<0.1, $\log_2$ fold change >0.75). 5' UTRs for each gene were obtained from the UCSC Genome Browser (mm10) and inputted into the MEME pipeline (default settings, output of 15 motifs) to discover the GRTE. The GRTE position weighted map was entered into FIMO to determine the prevalence of the GRTE in translationally upregulated mRNAs (46). A list of all 5' UTRs from the mouse genome (n=19009) was also obtained from UCSC and used as a control dataset. Enrichment was calculated using Pearson's $\chi^2$-test, counting genes with at least one occurrence of the GRTE as successes.

Ribosome Profiling Analysis

Raw sequence data were uncompressed, followed by clipping the 3' adaptor sequence (AGATCG-GAAGAGCACACGTCT). Next, the trimmed sequence reads were aligned to mouse rRNA reference using Bowtie. The unaligned reads were collected while the rRNA alignments were discarded to reduce rRNA contamination. TopHat2 was used to align the non-rRNA sequencing reads to hg19 and counted for gene associations against the UCSC gene database with HTSeq. R/Bioconductor package Xtail was used to find differentially expressed genes at the translational level using both ribosome-bound and mRNA samples (47). For each of the statistical analyses, a statistical cutoff of FDR<0.1 and $\log_2$ fold change ≤ or ≥0.75 was used (minimum read count of 5). Alkaline-digested total mRNA reads were aligned to the UCSC mm10 assembly using Tophat2 and counted for gene associations against the UCSC genes database with HTSeq. Differential expression analysis was performed using R/Bioconductor package DESeq2. R/Bioconductor package, riboseqR was used to calculate triplet periodicity in all samples. GSEA analysis was done using the Broad website for GSEA (http://software.broadinstitute.org/gsea/index.jsp).

Results

Androgen receptor (AR) regulates protein synthesis through 4EBP1

Figure 1A:
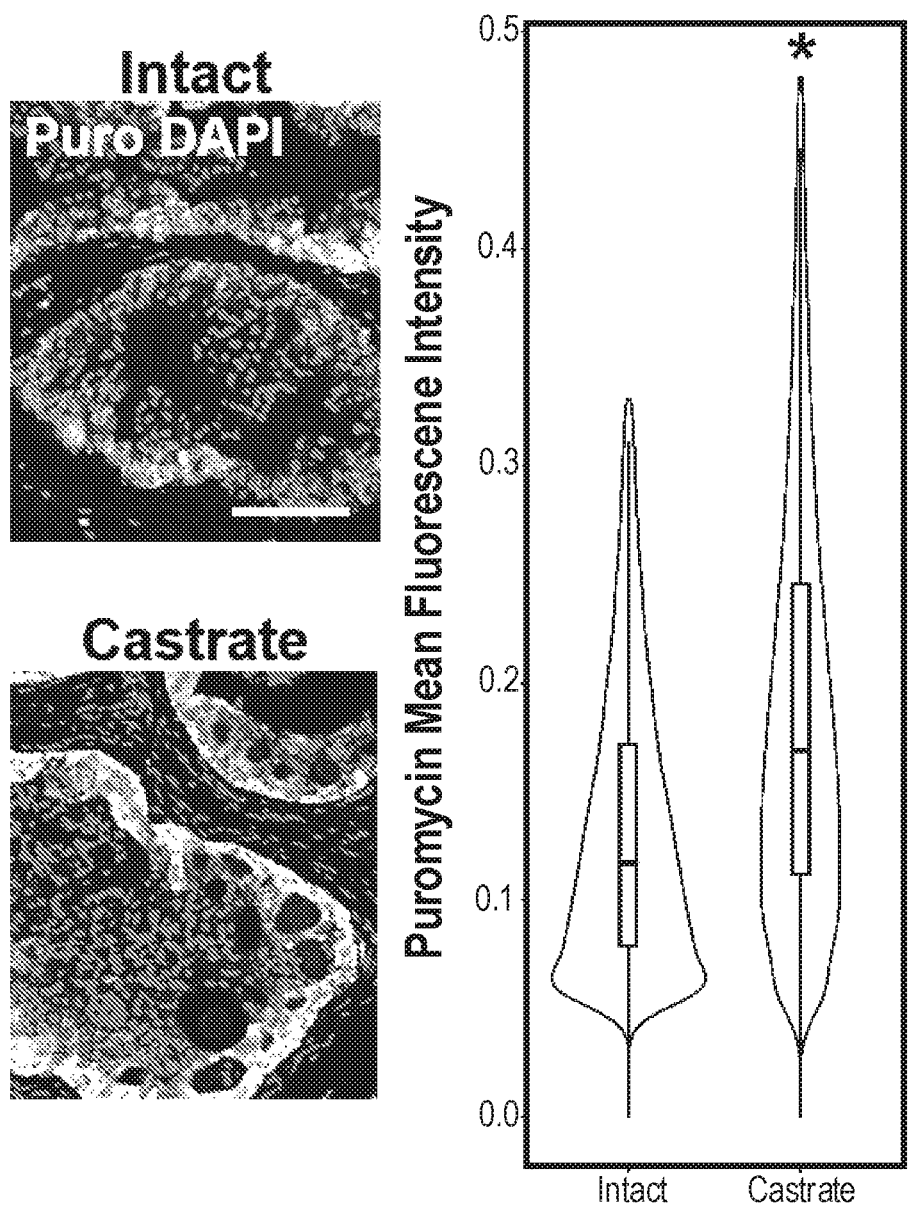
FIGS. 1A-1H shows that AR controls translation initiation via a cis-element encoded within the 4ebp1 locus. All scale bars=100 µm. Data presented as mean+/−SEM.
Figure 7A:
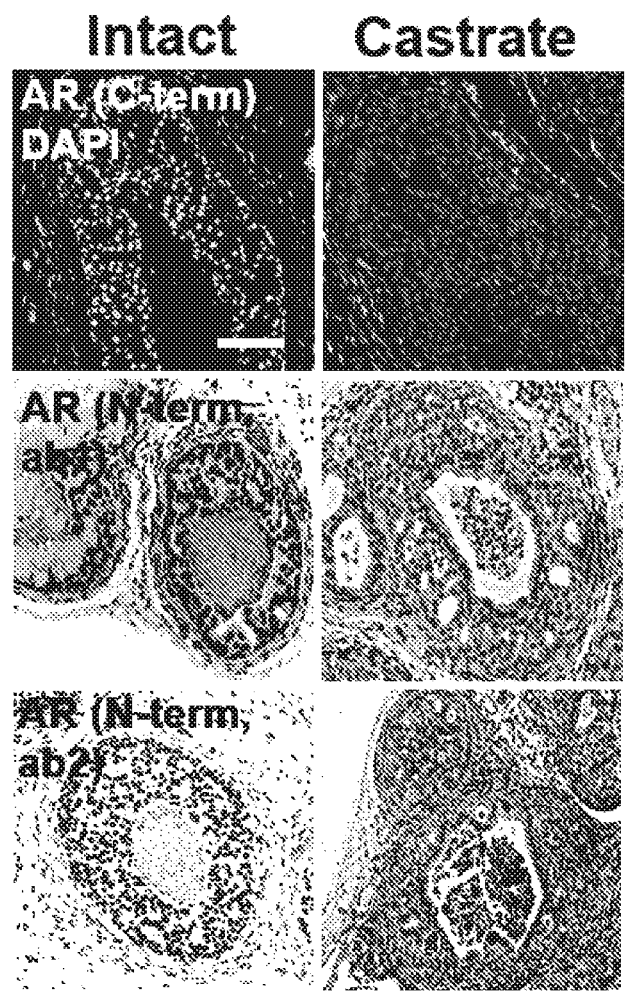
FIGS. 7A-7H demonstrate that castration of $Pten^{L/L}$ mice decreases AR, AR activity, and 4EBP1 without affecting eIF4F components. Data presented as mean+/−SEM. All scale bars=100 m.
Figure 7B:
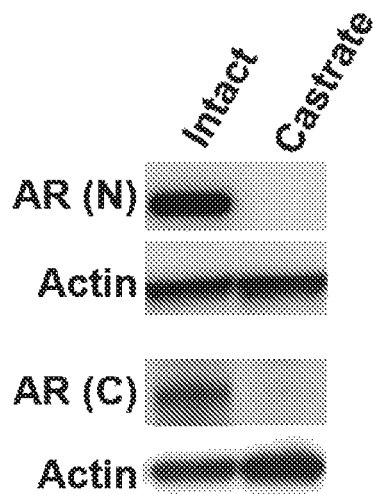
Figure 7D:
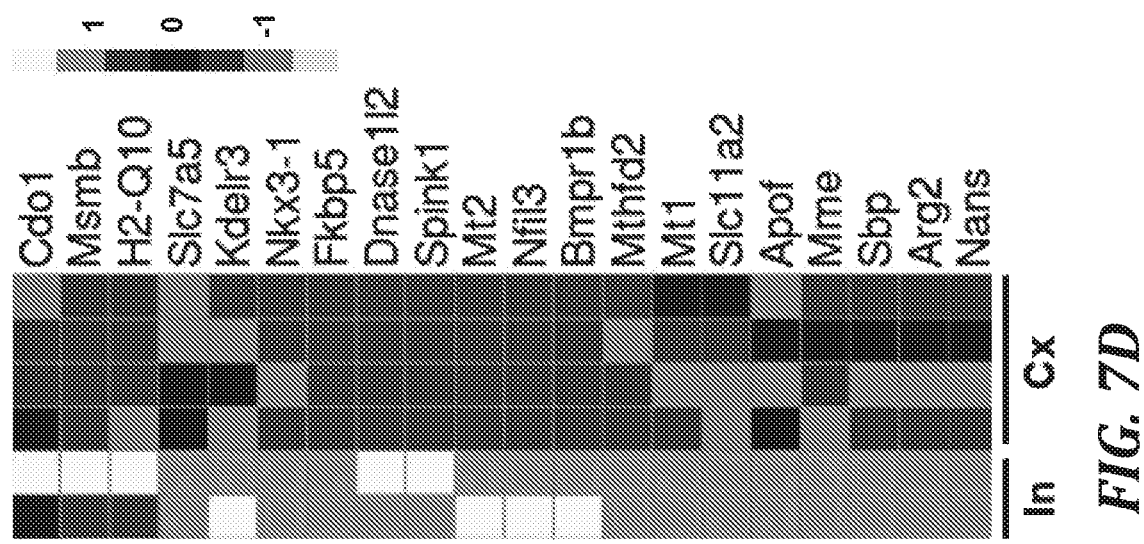
Figure 7C:
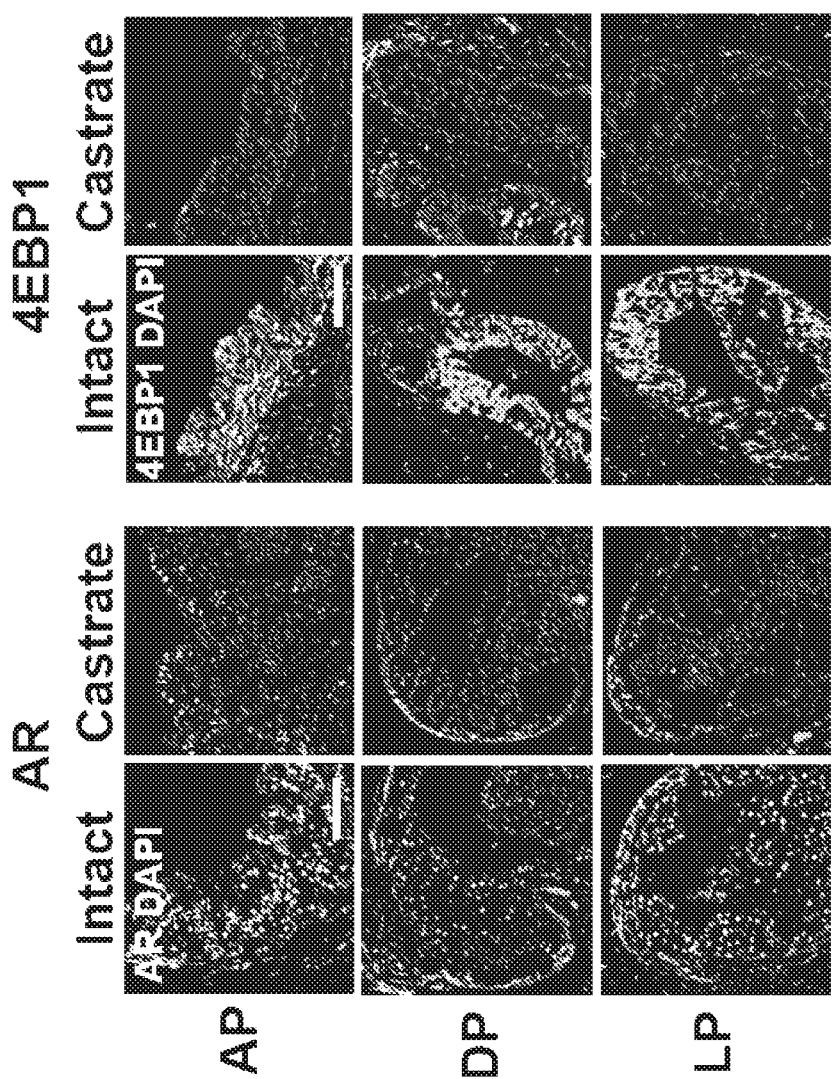

In order to determine the impact of AR on protein synthesis, the Probasin-cre;$Pten^{LoxP/LoxP}$ prostate cancer mouse model (herein referred to as $Pten^{L/L}$), was used, where tissue-specific loss of Pten causes PI3K pathway hyperactivation and prostate cancer formation. To modulate AR protein abundance, the mice were castrated, which led to a marked decrease in AR protein in each of the four lobes of the murine prostate (FIG. 7A-7C). Moreover, the functional impact of castration on AR activity was confirmed by RNAseq (FIG. 7D, and table 1). Using a puromycin incorporation assay, de novo protein synthesis in intact (non-castrate) and castrate $Pten^{L/L}$ mice was measured. It was observed that castrate $Pten^{L/L}$ mice exhibit a 30% increase in de novo protein synthesis on a per cell basis compared to intact $Pten^{L/L}$ tumors (FIG. 1A). These findings indicated that AR negatively regulates protein synthesis, which is de-repressed in the context of low AR protein abundance.

Figure 1B:
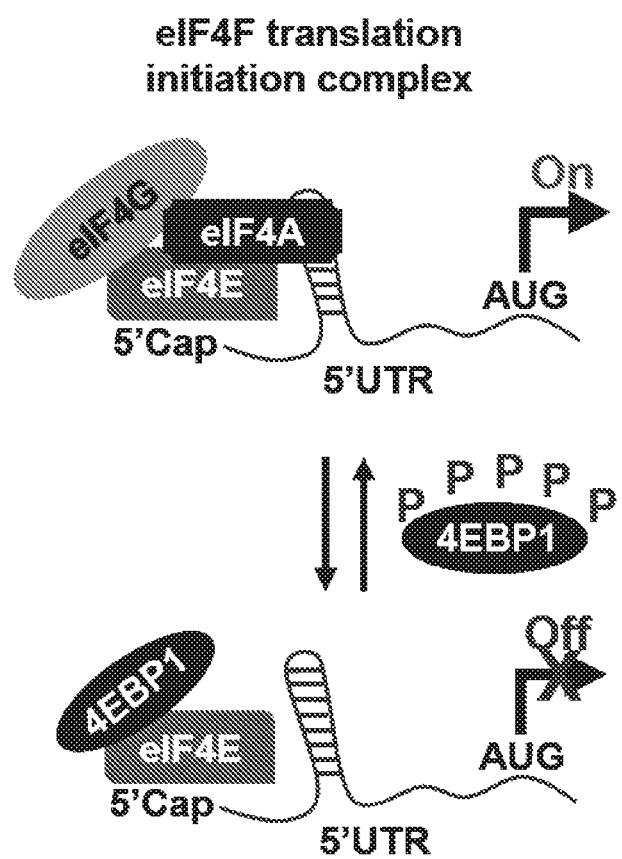
Figure 1C:
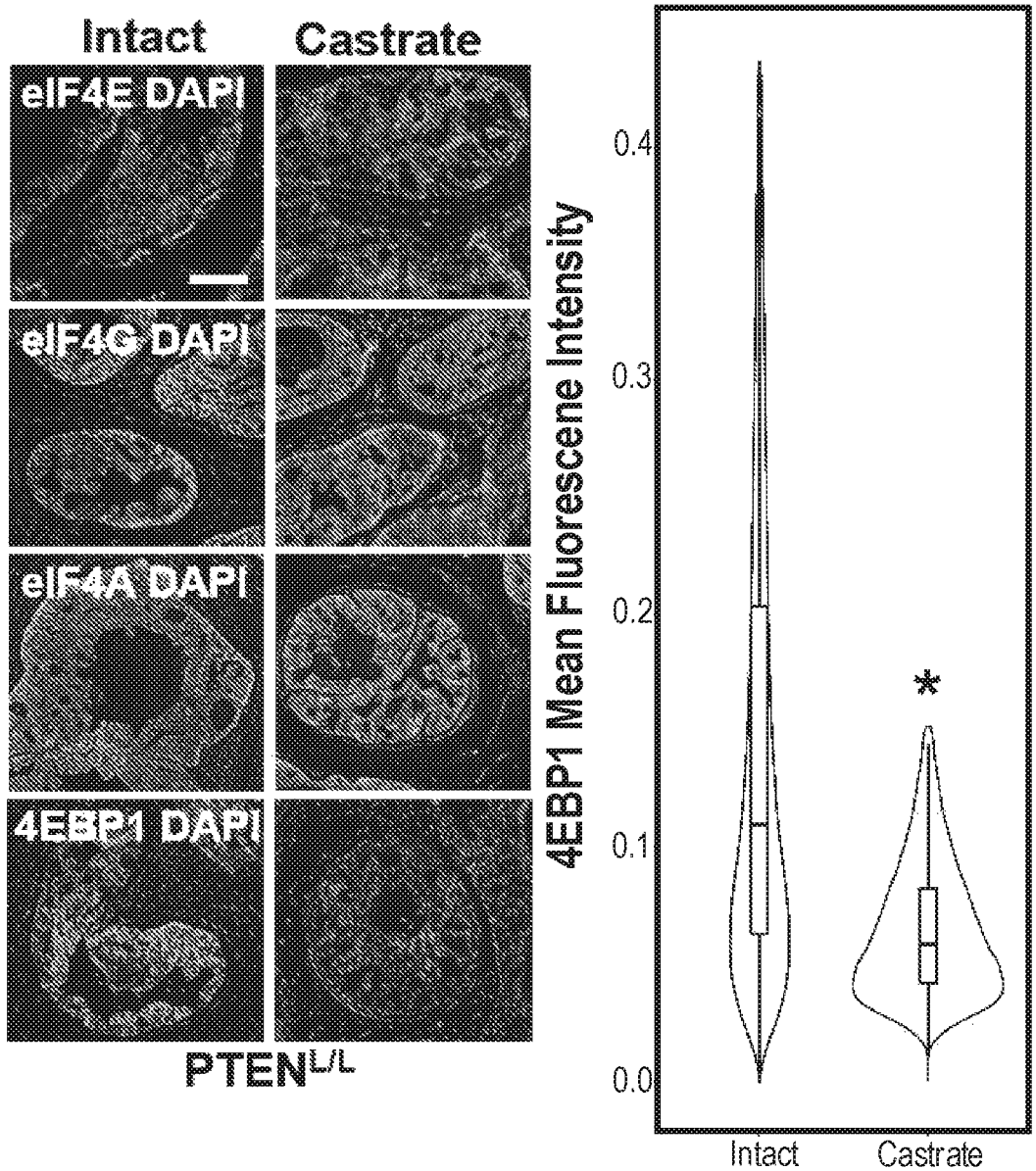
Figure 7E:
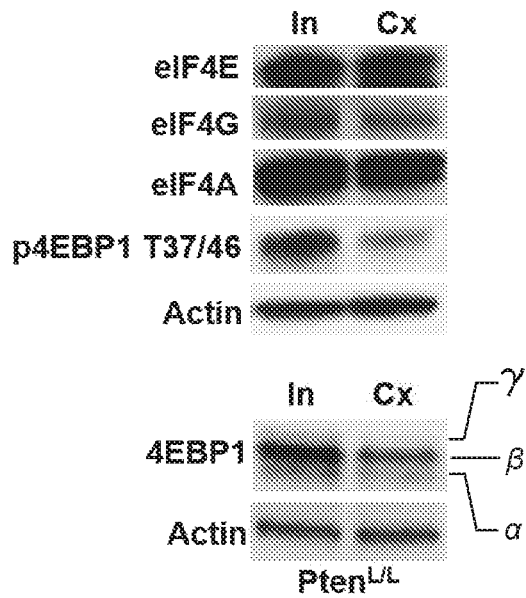
Figure 7F:
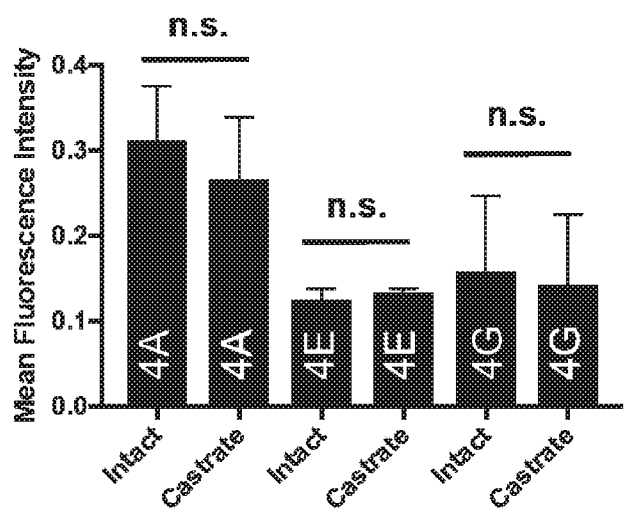

Next, the inventor sought to determine how AR controls protein synthesis dynamics. Translation initiation mediated by the eIF4F complex is a critical driver of protein synthesis and cell proliferation. This complex is composed of the oncogene eIF4E, which binds to the 5'-cap of mRNA; the scaffolding molecule eIF4G; and the RNA helicase eIF4A. In addition, 4EBP1 is an antagonist of translation initiation and prevents eIF4F complex formation by binding to the dorsal and lateral surfaces of eIF4E (FIG. 1B). 4EBP1 is phosphorylated and inhibited by the mechanistic target of rapamycin (mTOR) kinase. Translation initiation dynamics are strongly influenced by the stoichiometry of the translation initiation components eIF4E, eIF4G, eIF4A, and 4EBP1. To determine the relationship between AR-low prostate cancer and eIF4F-mediated translation, quantitative immunofluorescence and western blot analysis of these key translation initiation components in intact and castrate $Pten^{L/L}$ mice were conducted. Vo increase in eIF4E, eIF4G, or eIF4A protein abundance was observed (FIGS. 1C, 7E, and 7F). However, 4EBP1 protein was decreased in castrate mice relative to intact mice (FIGS. 1C, 7C, and 7E). Therefore, castration-induced low AR abundance results in a decrease in the translation inhibitor 4EBP1.

Figure 1D:
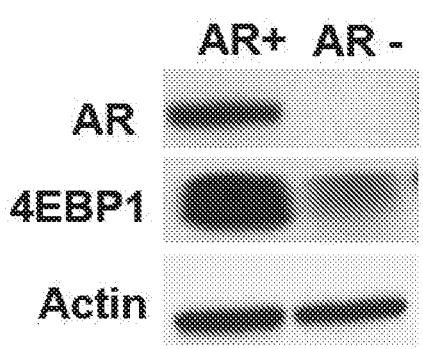
Figure 1E:
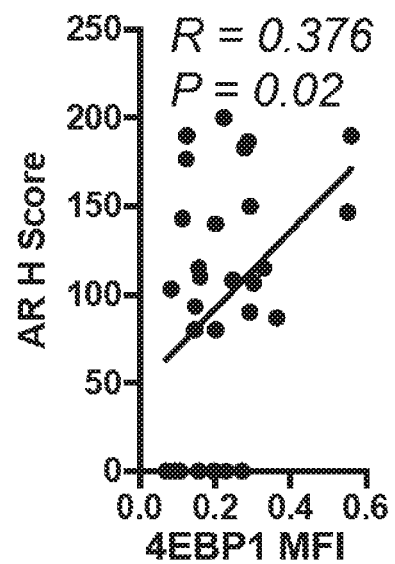
Figure 7G:
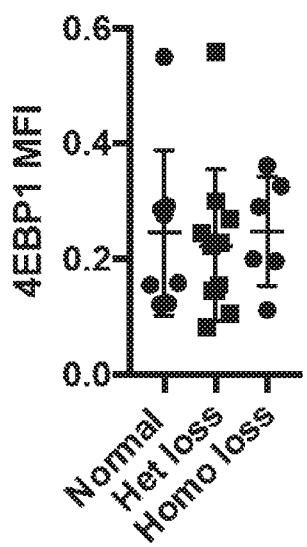
Figure 7H:

To determine if the relationship between AR and 4EBP1 is particular to the $Pten^{L/L}$ mouse model or a more general principle of prostate cancer, human LNCaP prostate cancer cells was used, in which AR has been stably knocked down by shRNA and counter-selected for using an AR-regulated suicide gene (herein referred to as APIPC cells). Comparing APIPC cells to their isogenic parental AR-positive cells, it was found that 4EBP1 protein expression is substantially decreased in the absence of AR (FIG. 1D). Next, to determine whether AR protein expression also correlates with 4EBP1 protein expression in human prostate cancer, the following experiments were conducted. 29 CRPC LuCaP patient-derived xenograft (PDX) models were evaluated for AR and 4EBP1 protein abundance. A positive correlation (R=0.376, P=0.02) was found between AR and total 4EBP1 protein expression in these specimens, which was independent of genomic PTEN status (FIGS. 1E, 7G, and 7H). Together, these findings demonstrate that AR strongly correlates with 4EBP1 in both mice and humans.

AR Directs 4Ebp1 Transcription Through an ARE Encoded in Intron 1

The finding that 4EBP1 protein expression consistently correlates with AR protein in three models of advanced prostate cancer (FIGS. 1C-1E) led to question how AR regulates 4EBP1 abundance. Because AR is a transcription factor, the inventor investigated if it regulates 4EBP1 directly through DNA-based mechanisms or indirectly through translation or protein decay (turnover). To determine whether AR affects 4EBP1 protein synthesis rates, the amount of ribosome-protected 4ebp1 mRNA compared to total 4ebp1 mRNA through in vivo ribosome profiling was measured (FIGS. 8A and 8B). No difference in 4ebp1 mRNA translation efficiency between intact and castrate Pten$^{L/L}$ mice was observed (FIG. 8C). To investigate whether 4EBP1 protein turnover is sensitive to AR protein expression, the phosphorylation status of 4EBP1 at T37/46, which is associated with its degradation, was examined. Western blot analysis revealed no increase in phosphorylation at those sites (FIG. 7E). In addition, 4EBP1 degradation rates were measured using cycloheximide in Pten$^{L/L}$ primary prostate cancer cells grown with or without dihydrotestosterone (DHT). No difference in 4EBP1 turnover rates between intact and castrate Pten$^{L/L}$ cells were observed (FIG. 8D).

Figure 1F:
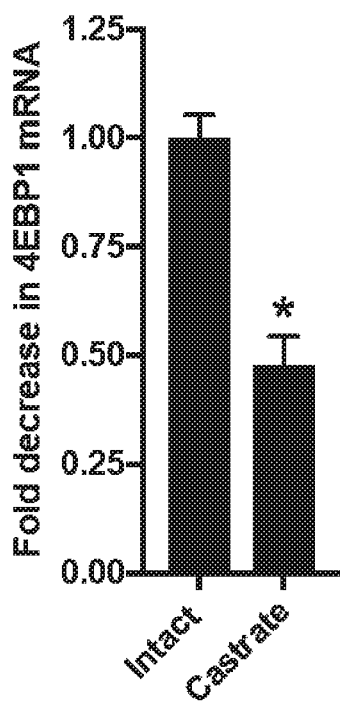
Figure 1G:
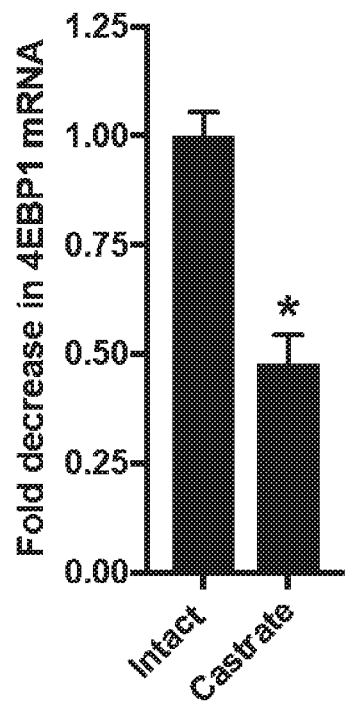

Next, a transcription-based mechanism was considered. It was found that in all three model systems (Pten$^{L/L}$ mouse model, APIPC human cell line, and LuCaP PDX models), 4ebp1 decreases at the mRNA level in the setting of low AR (FIGS. 1F, 8E, and 8F), which was not further affected by maximal AR blockade (FIG. 8G). Moreover, the same phenomenon in 4 different human prostate cancer cell lines was observed (FIGS. 9A and 9B). As such, it was suspected that 4ebp1 is an AR-responsive gene. To determine whether AR regulates 4ebp1 mRNA expression, androgens were reintroduced to Pten$^{L/L}$ primary cells derived from castrate mice to restore AR protein expression and activity. This resulted in a complete rescue of 4ebp1 mRNA back to AR− intact levels and a decrease in de novo protein synthesis (FIGS. 1G, 9C, and 9D). These findings suggested that AR may directly control the transcription of 4ebp1. To determine if AR binds the 4ebp1 genomic locus in vivo, d AR ChIPSeq from Pten$^{L/L}$ mice was analyzed. It was found that AR binds to the first intron of 4ebp1, which encodes a putative ARE (FIG. 10A). This was also observed in wild-type murine prostate, where knockout of AR also decreased 4ebp1 mRNA, as well as in the LNCaP human prostate cancer cell line (FIGS. 10B-10D).

Figure 1H:
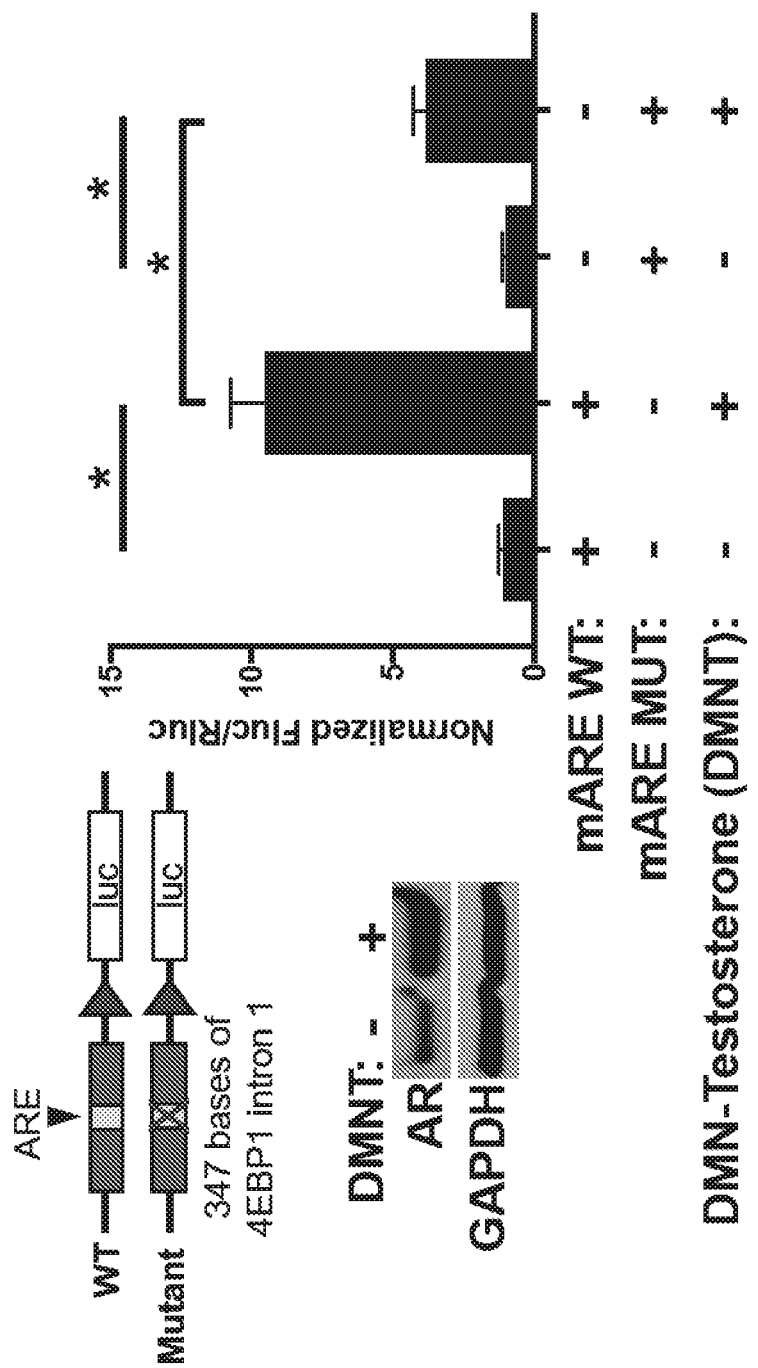

To determine the functionality of this element, the 347 bases encompassing the ChIPSeq peak were cloned, including the putative ARE into a luciferase reporter construct, and it was found that it was strikingly responsive to androgen stimulation in LNCaP prostate cancer cells (FIG. 1H). Next, the 15 base pair ARE was deleted, and it was found that this blunted the response to androgen stimulation (FIGS. 1H and 10E). A homologous region of the human 4EBP1 locus was cloned into the luciferase reporter construct, and it was found that it too increased luciferase activity in response to androgens (FIG. 10F). Together, these findings reveal that 4ebp1 is controlled by AR via an ARE encoded within the first intron in both mice and humans.

Figure 2A:
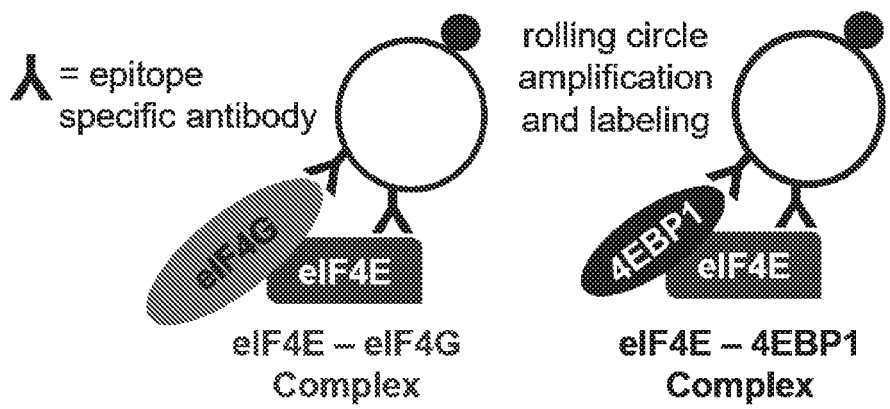
FIGS. 2A-2F demonstrate that 4EBP1 expression controls eIF4E-eIF4G interaction dynamics and proliferation in a cell-autonomous manner. All scale bars=100 m. Data presented as mean+/−SEM.
Figure 2B:
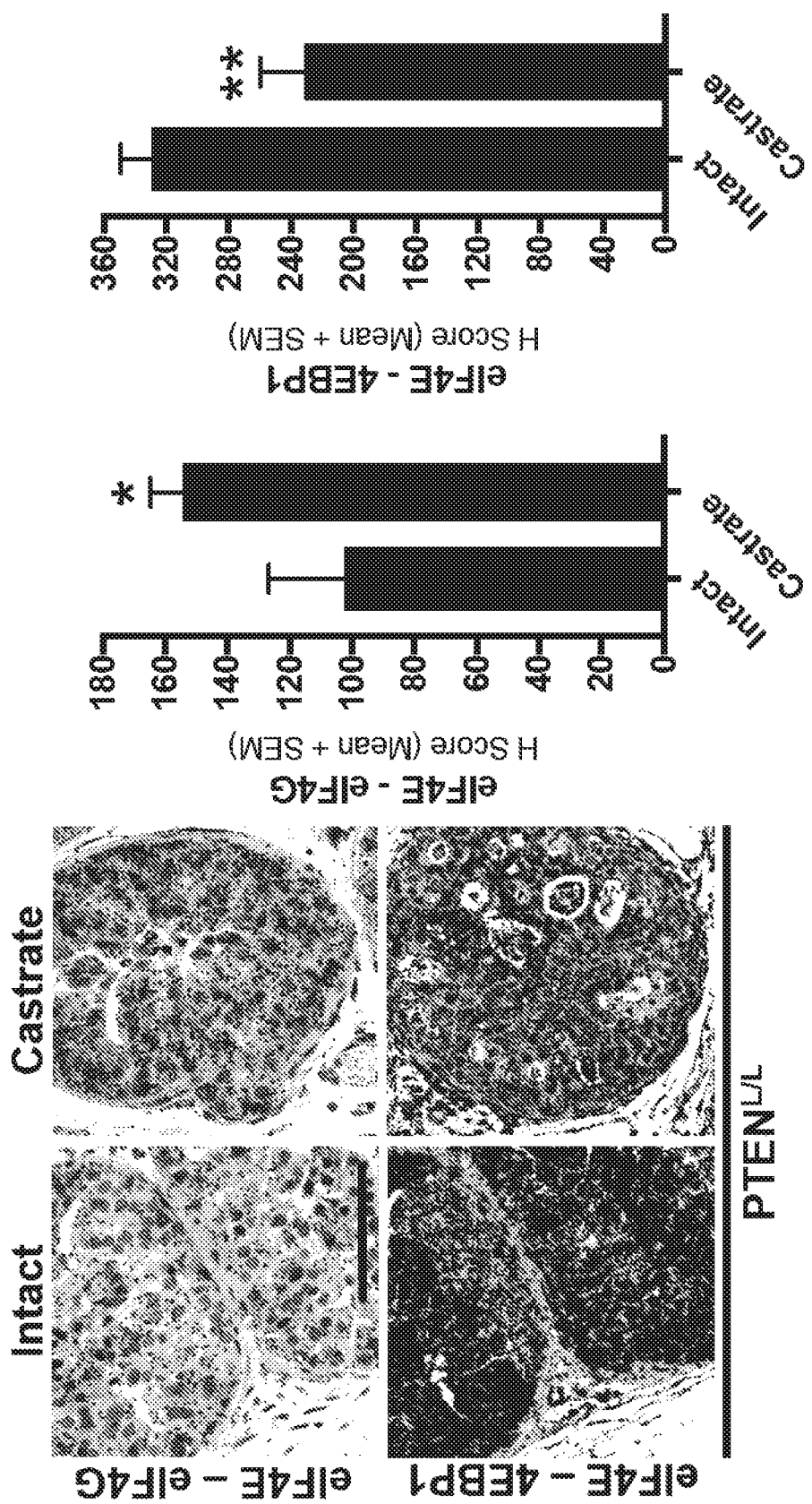

4EBP1 protein abundance dictates eIF4E-eIF4G interaction dynamics and proliferation in a cell-autonomous manner in AR-low prostate cancer The observations suggest that AR may control translation initiation complex formation in vivo. To test this hypothesis, proximity ligation assays (PLA) for eIF4E-eIF4G interactions and eIF4E-4EBP1 interactions were optimized (FIG. 2A). In tumors from castrate Pten$^{L/L}$ mice, it was found that eIF4E-eIF4G interactions increase while eIF4E-4EBP1 interactions decrease compared to those from intact mice (FIG. 2B). This was also confirmed by the cap-binding assay (FIG. 11A). Thus, low AR alters the balance between eIF4E-4EBP1 inhibitory complexes and eIF4E-eIF4G initiation complexes, resulting in a net increase in eIF4F translation initiation complex formation and an increase in protein synthesis (FIGS. 1A and 2B).

Figures 2C, 2D:
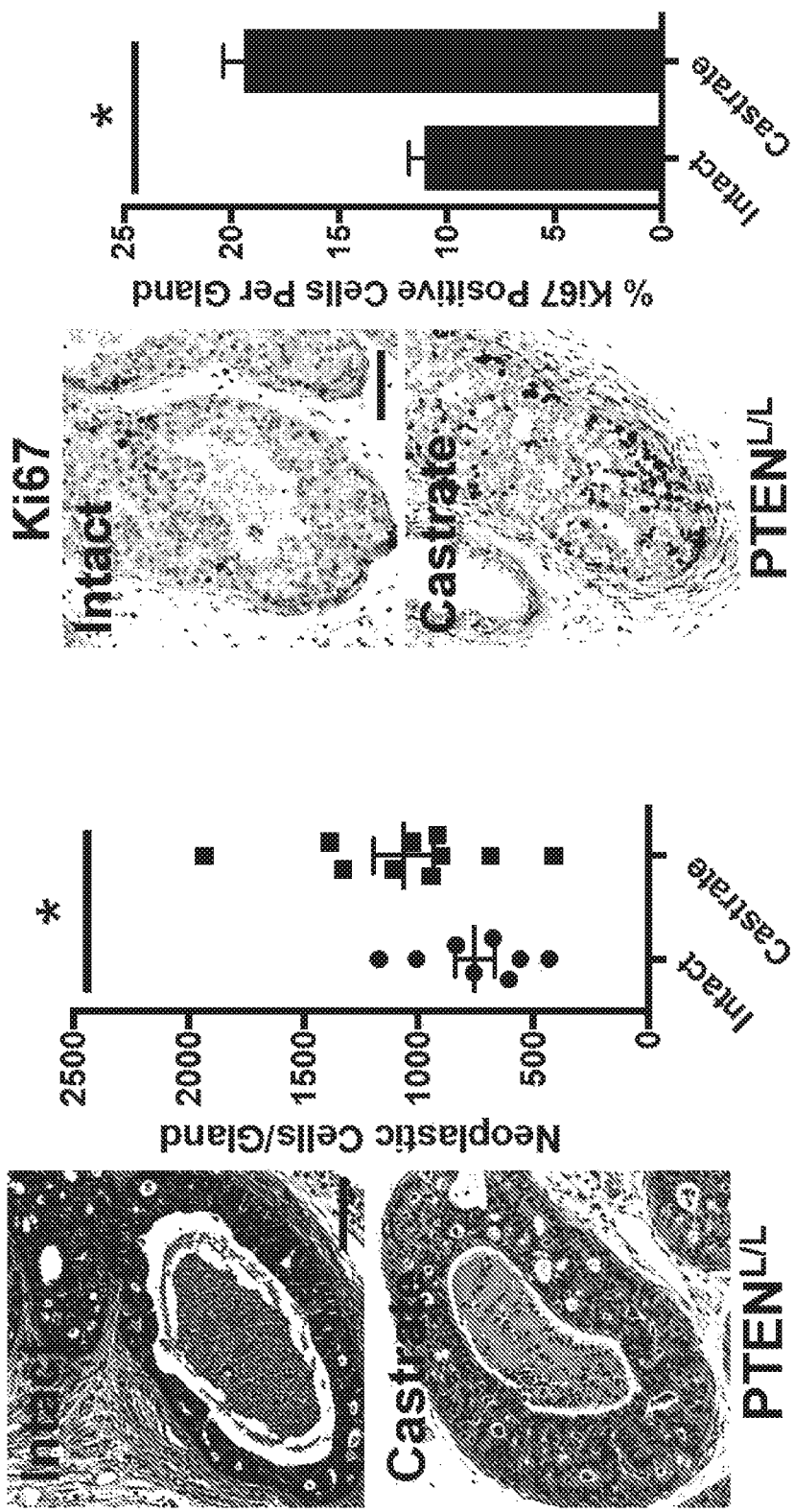
Figure 2E:
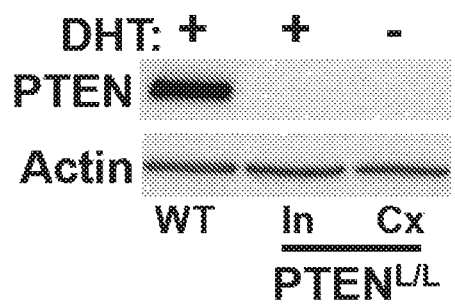
Figure 2E:
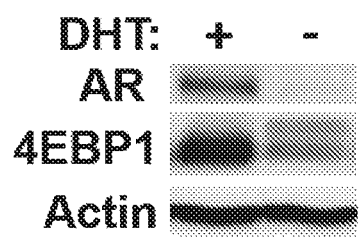
Figure 2F:
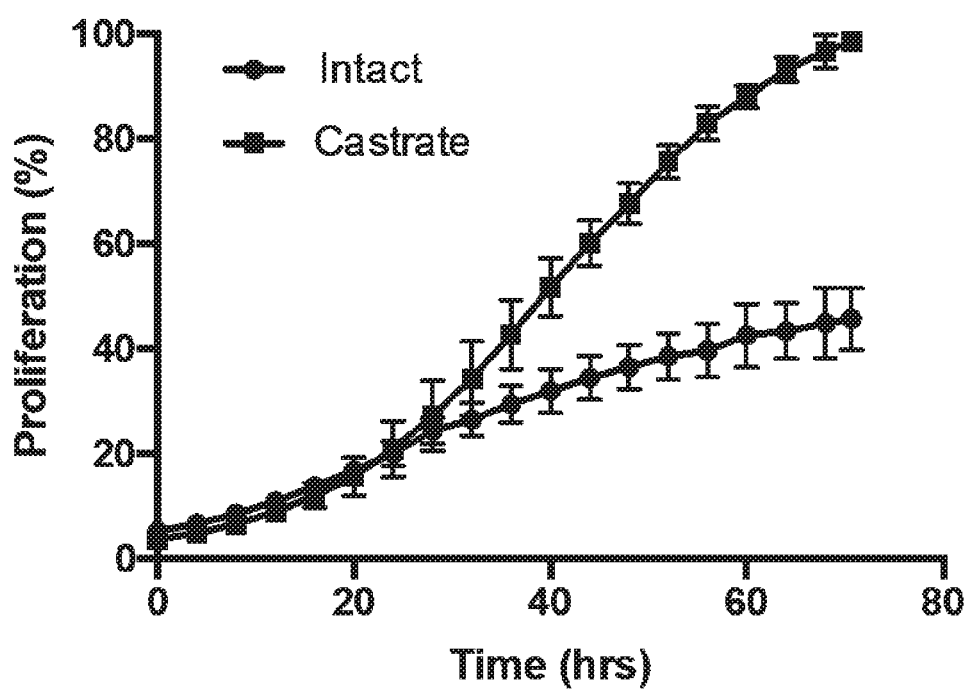

Next, the inventor sought to determine the physiologic consequences of decreasing AR-4EBP1 while increasing eIF4F translation initiation complex formation in Pten$^{L/L}$ mice. It was observed that long-term castrated Pten$^{L/L}$ mice exhibit increased tumor growth and cell proliferation, and more aggressive disease (FIGS. 2C, 2D, and 11B). This was independent of phenotypic changes such as neuroendocrine differentiation (FIGS. 11C and 11D), or re-engagement of the AKT or MNK1/2 signaling pathways (as measured by AKT or eIF4E phosphorylation, respectively) that can increase translation initiation (FIGS. 11E-11G). Next, it was determined whether the relationship between AR and 4EBP1 is intrinsic or extrinsic to prostate cancer epithelial cells. Using low passage primary intact (DHT+) and castrate (DHT−) Pten$^{L/L}$ cells, it was found that similar to the key in vivo findings, primary intact Pten$^{L/L}$ cells do not express PTEN or neuroendocrine markers (FIGS. 2E and 11H). Moreover, castrate cells expressed very low amounts of AR and 4EBP1 protein and proliferated faster than intact cells (FIGS. 2E and 2F). These findings demonstrate that a decrease in AR protein can diminish 4EBP1 abundance and increase cell proliferation in a cell autonomous manner. Together, these findings mimic in part an emerging subset of CRPC patients with low AR protein expression and resistance to 2$^{nd}$ generation therapeutics such as enzalutamide.

Figure 3A:
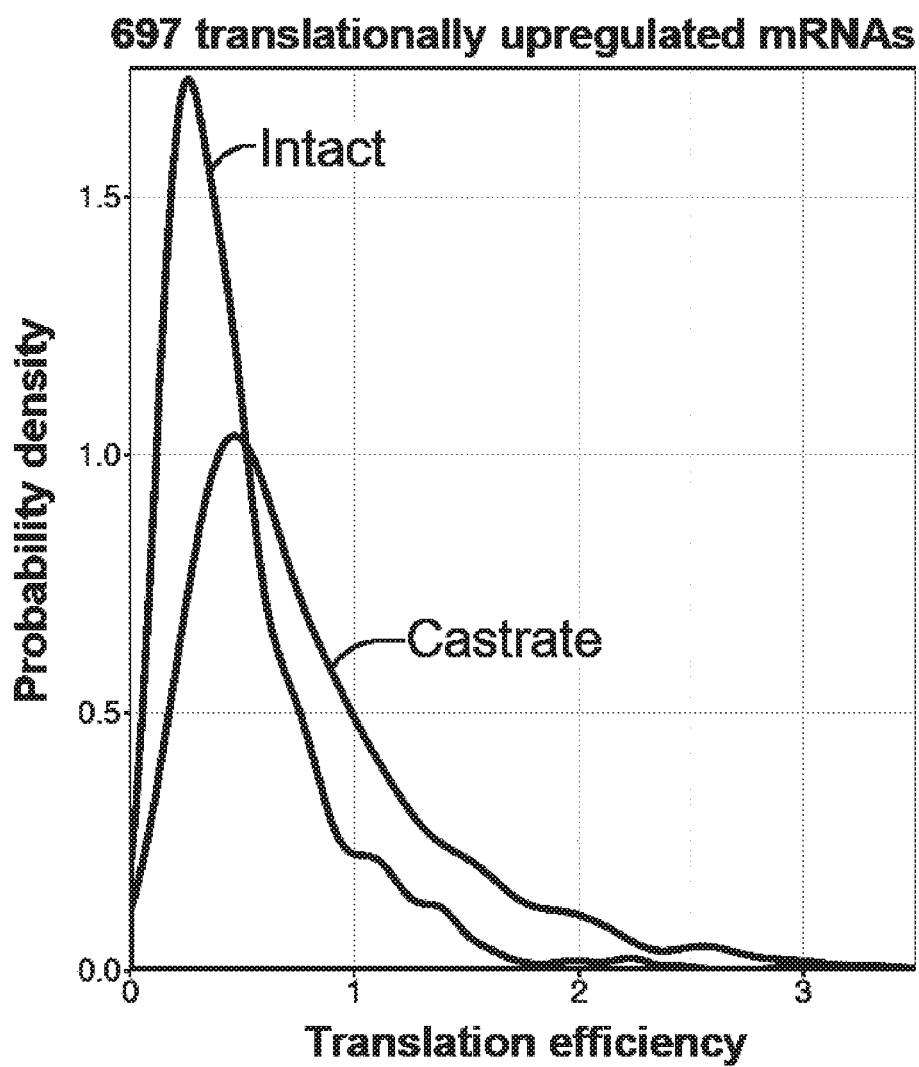

AR and eIF4F-Mediated mRNA-Specific Translation Controls a Regulon of Functional Cell Proliferation Regulators Given that AR-low prostate cancer increases eIF4F complex formation and de novo protein synthesis (FIGS. 1A and 2B), it was investigated whether this impacts the translation of all mRNAs or a subset of mRNAs. To do so, ribosome profiling of tumors from both intact and castrate Pten$^{L/L}$ mice was conducted to identify differentially translated mRNAs (FIG. 8A). Notably, castration and increased eIF4F complex formation were associated with an increase in the translation efficiency of a subset of 697 mRNAs as opposed to all mRNA species (log$_2$ fold change ≥0.75, P-value <2.2e−16) (FIG. 3A). This finding raised the important question of what makes these specific mRNAs particularly sensitive to increases in eIF4F activity.

Figure 3B:
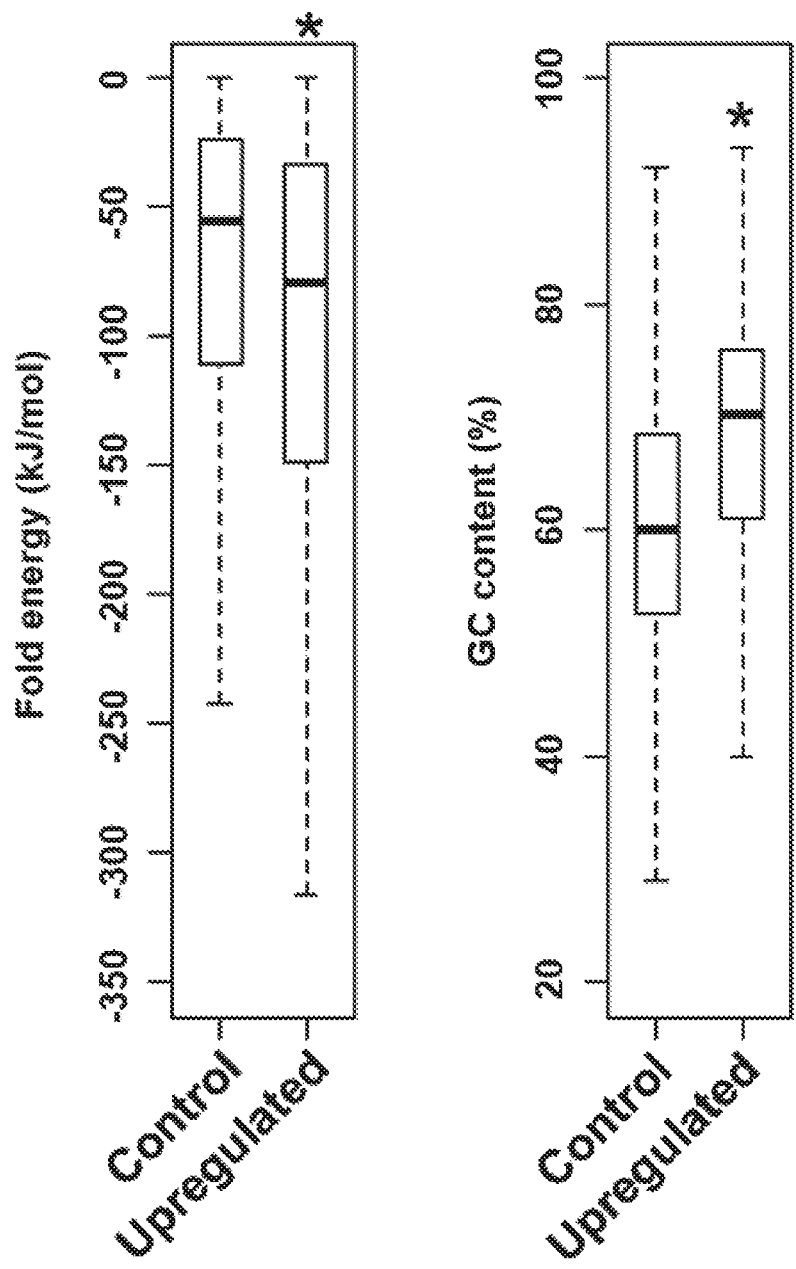
Figure 3C:
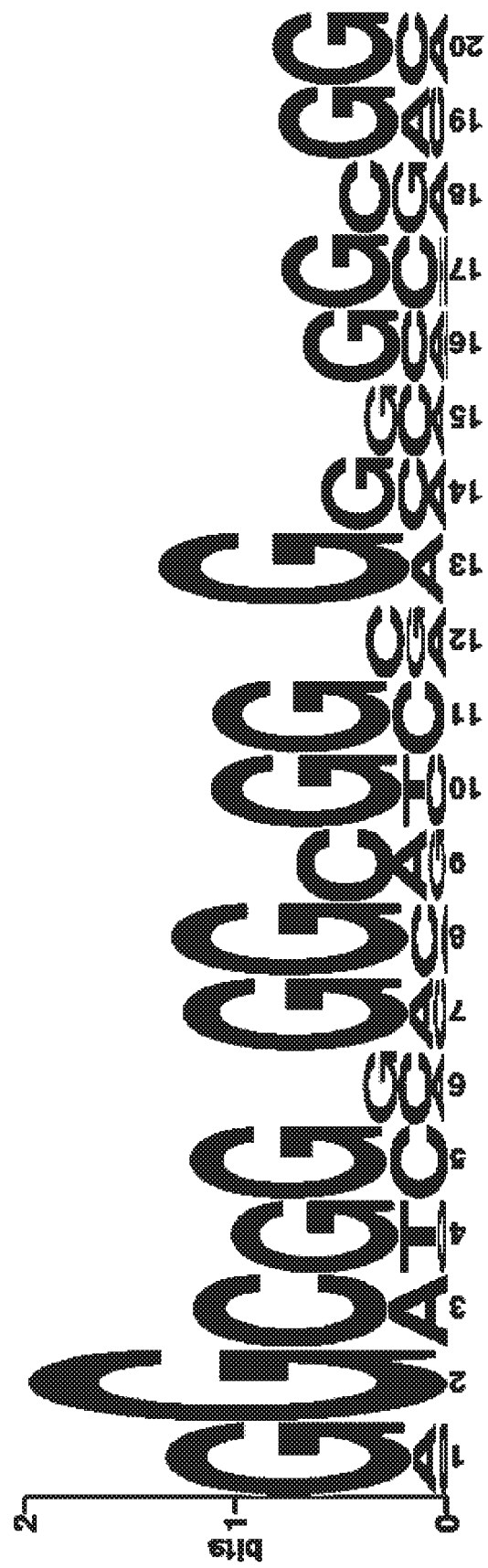
Figure 3E:
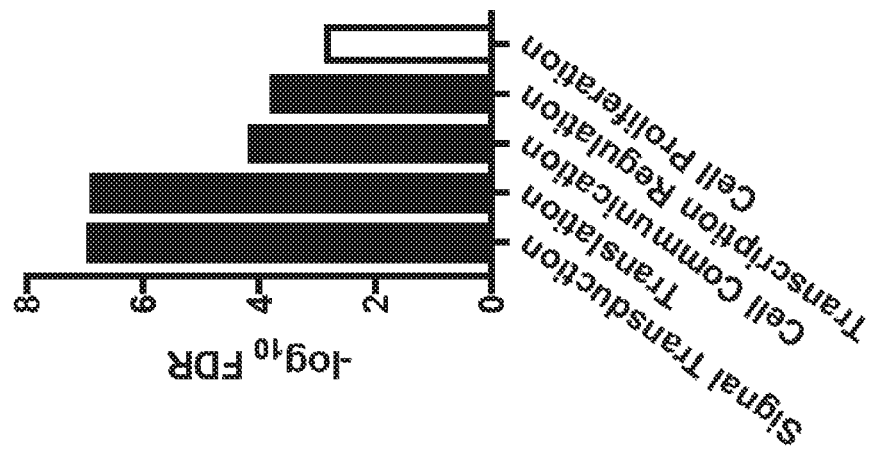
Figure 3D:
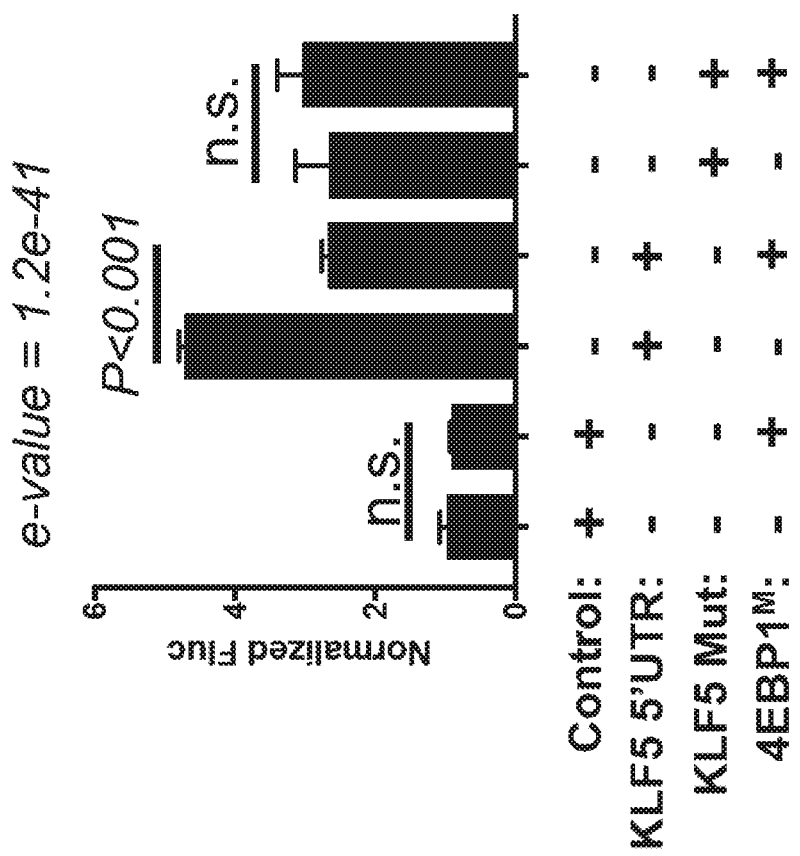

A major determinant of translation initiation rates is the composition of the 5′ untranslated region (UTR) of an mRNA. It was observed that the translationally upregulated mRNAs possess a higher GC content and are more thermodynamically stable compared to 19,009 control 5′ UTRs (FIG. 3B). There was no significant difference in 5′ UTR length (FIG. 12A). Together, these findings suggest that eIF4F sensitive mRNAs may have a cis-regulatory element encoded within the 5′ UTR. A motif analysis was conducted, and a guanine-enriched sequence was discovered, which was named the guanine-rich translational element (GRTE) (FIG. 3C and table 2). The GRTE was present in 66.8% of upregulated mRNAs and 39.6% of genomic 5′ UTR sequences (P=6.32e−14) and was distinct from the previously described mTOR-sensitive PRTE cis-regulatory element (FIGS. 12B and 12C). To determine if GRTE-containing 5′ UTRs were indeed responsive to fluctuations in eIF4F activity, the 5′ UTRs of Klf5 and Denr were cloned, which have this element, into luciferase reporter constructs, and also GRTE deletion mutants were generated (FIG. 12D). This was subsequently transduced into PC3-4EBP1$^M$ prostate cancer cells in which doxycycline can induce the expression of a non-phosphorylatable form of 4EBP1 to inhibit eIF4F complex formation (FIG. 12E). It was observed that wild-type Klf5 and Denr 5′ UTRs displayed a decrease in luciferase activity upon induction of the 4EBP1$^M$. However, the non-insert control vector and the GRTE deletion Klf5 and Denr 5′ UTRs were both insensitive to eIF4F complex disruption (FIG. 3D and FIG. 12F). Next, the inventor sought to determine the specificity of the GRTE by generating wild-type and mutant luciferase reporters with the Tcea1 5' UTR, which has a guanine enriched sequence but was not found to be translationally upregulated by ribosome profiling. Interestingly, in this context, mutating the element had no impact on translation (FIG. 12G). Together, these findings indicate that the GRTE is a specific 5' UTR cis-regulatory element that in part enables the enhanced translation of distinct mRNAs in the context of eIF4F hyperactivity.

Figure 3F:
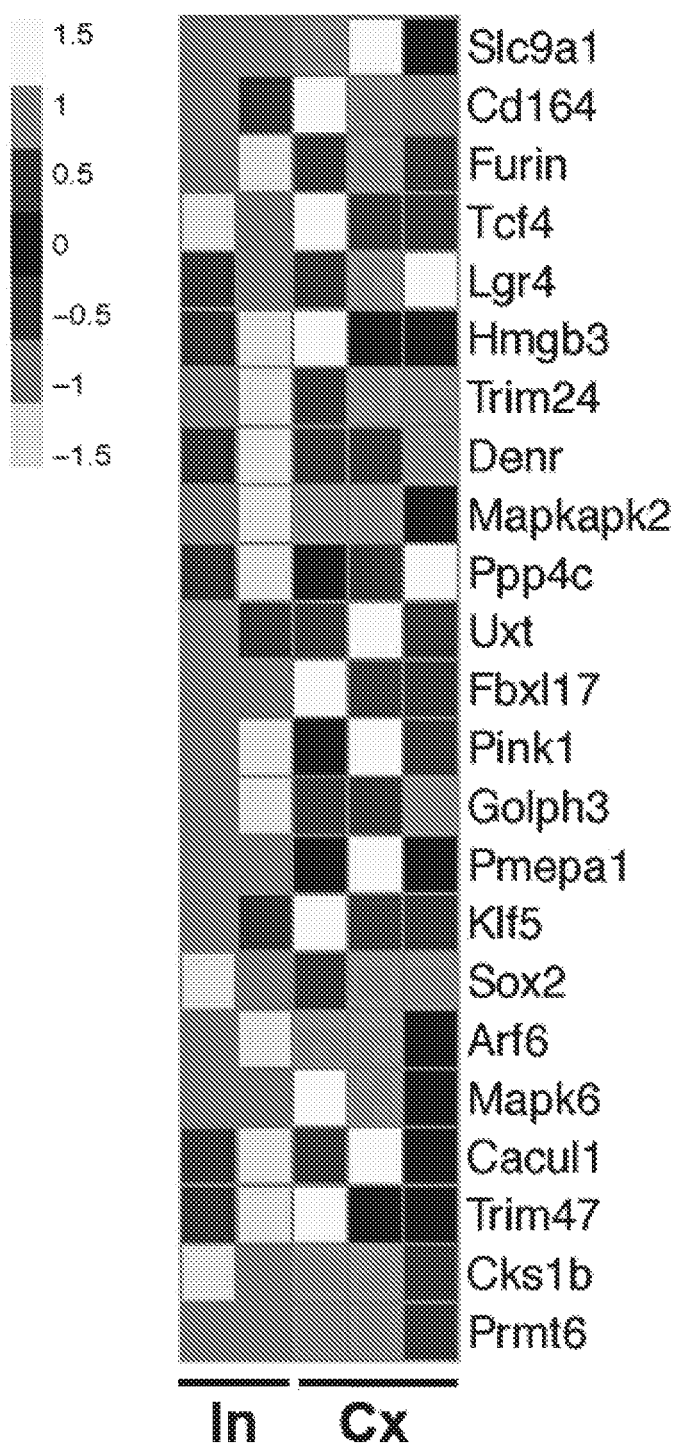

Next, it was determined if the translationally upregulated mRNAs identified by ribosome profiling organize into networks that may be responsible for specific phenotypes important for AR independence. Through gene set enrichment analysis, it was found that these translationally regulated mRNAs cluster into distinct biological processes including signal transduction, translation, cell communication, transcription regulation, and cell proliferation (FIG. 3E). This was corroborated at a gene-specific level. For example, a number of shared mTOR inhibitor-sensitive target genes were up-regulated in the AR-low setting, including Pabpc1, Rps13, Rps15, Rp17a, and Rpl14 (FIGS. 12B and 12H). Furthermore, 23 putative regulators of cell proliferation increased at the level of translation in castrate $Pten^{L/L}$ mice were identified (FIG. 3F). Together, these findings demonstrate that low AR and increased eIF4F complex formation may promote cancer progression through the translation of distinct networks of mRNAs.

Figure 3I:
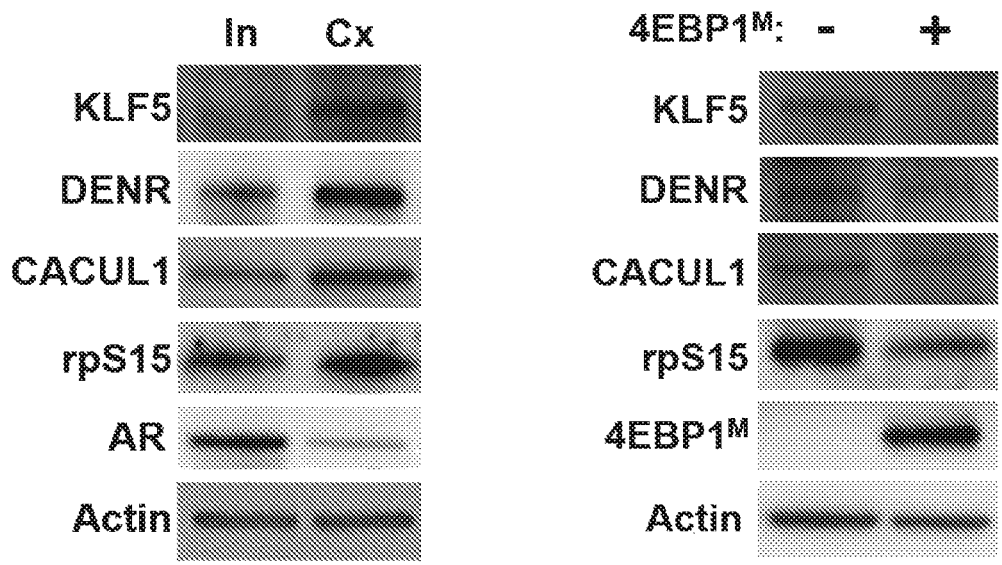
Figure 3I:
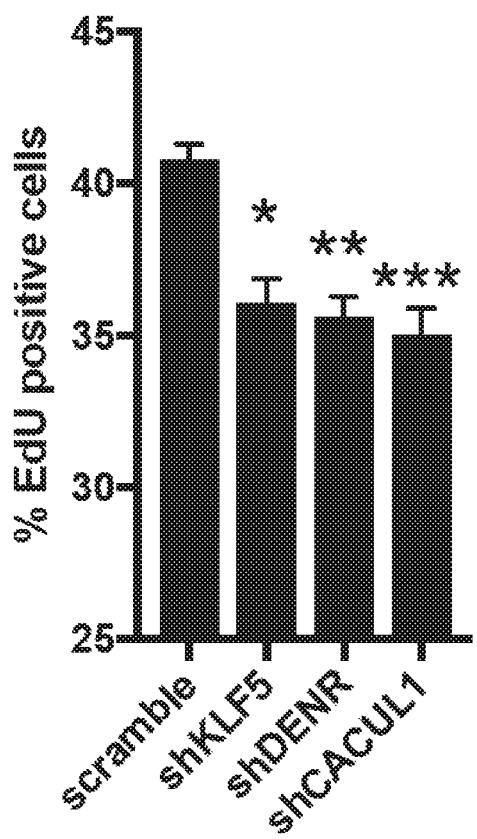

To confirm that the putative proliferation regulators identified by ribosome profiling are controlled at the post-transcriptional level, western blot and quantitative PCR (qPCR) analysis was conducted on a subset of targets including KLF5, a transcription factor critical for maintaining the proliferative capacity of cells; CACUL1, a cullin domain-containing protein that activates CDK2; and DENR, a translation re-initiation factor important for high-density cell proliferation. Notably, all three genes have at least one GRTE. As a positive control, the small ribosomal subunit protein rpS15 was analyzed It was then found that castrate primary $Pten^{L/L}$ organoids exhibited increases in the abundance of KLF5, DENR, CACUL1, and rpS15 proteins (FIGS. 3G and 13A). However, at the mRNA level, no increase was observed (FIG. 13B). Together these findings indicate that KLF5, DENR, and CACUL1 are regulated at the post-transcriptional level. To determine if these genes are regulated by the eIF4F complex, a reciprocal experiment was conducted using organoids derived from castrate $Pten^{L/L}$ mice, which also have a doxycycline-inducible $4EBP1^M$. In this system, castration and prostate-specific loss of PTEN cause non-neuroendocrine AR-low prostate cancer, and doxycycline drives the prostate-specific expression of an inducible non-phosphorylatable 4ebp1 mutant transgene (herein referred to as $Pten^{L/L};4ebp1^M$, FIG. 13C). Upon induction of the $4EBP1^M$, which diminishes eIF4F complex assembly, a marked decrease in the amounts of KLF5, DENR, CACUL1, and rpS15 proteins was observed (FIGS. 3H and 13D). This did not result from a decrease in mRNA (FIG. 13E). Thus, AR coordinates the translation of a distinct subset of mRNAs including a network of pro-proliferation regulators through aberrant eIF4F complex formation. To determine if KLF5, DENR, and CACUL1 are necessary to drive the enhanced growth of AR-low CRPC, RNAi was used to knock down each gene in castrate $Pten^{L/L}$ primary prostate cancer cells (FIG. 13F). Indeed, gene silencing of Klf5, Denr, and Cacul1 resulted in a sustained decrease in EdU incorporation compared to a scramble control (FIG. 3I). Together, these findings demonstrate that AR-low prostate cancer exhibits an increase in protein synthesis through the translation of specific subsets of GRTE-containing mRNAs, including an eIF4F-sensitive pro-proliferation regulon, which drives the enhanced growth of AR-low prostate cancer.

Figure 4A:
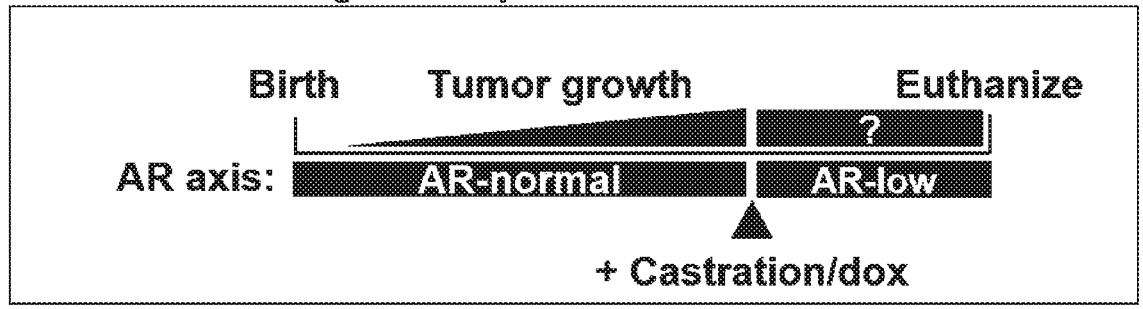
FIG. 4A-4G show that increased eIF4F complex formation is necessary for AR-low prostate cancer initiation and progression. All scale bars=100 µm. Data presented as mean+/−SEM.
Figure 4B:
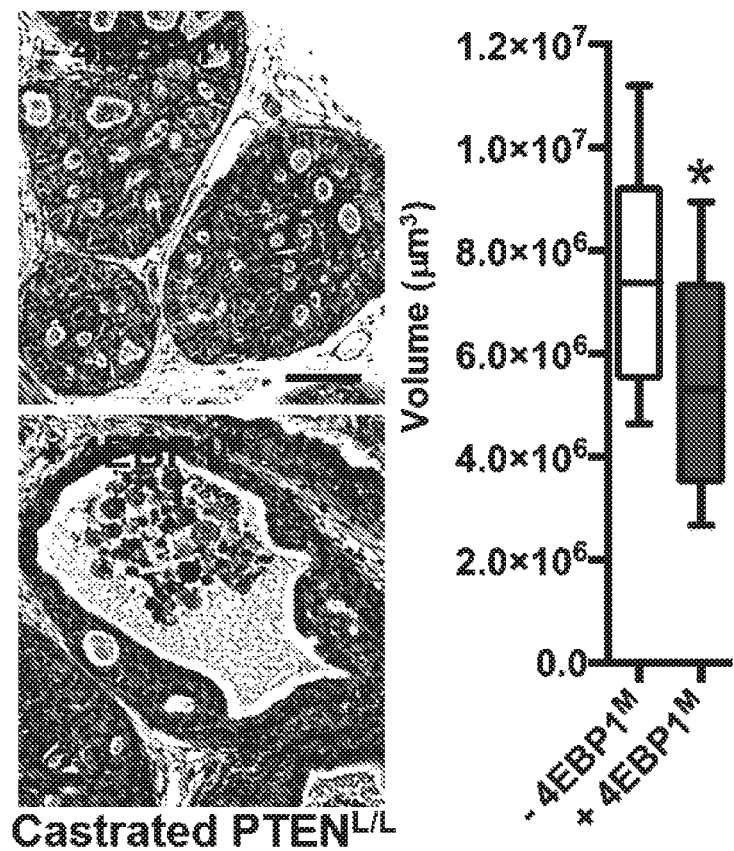
Figure 4C:
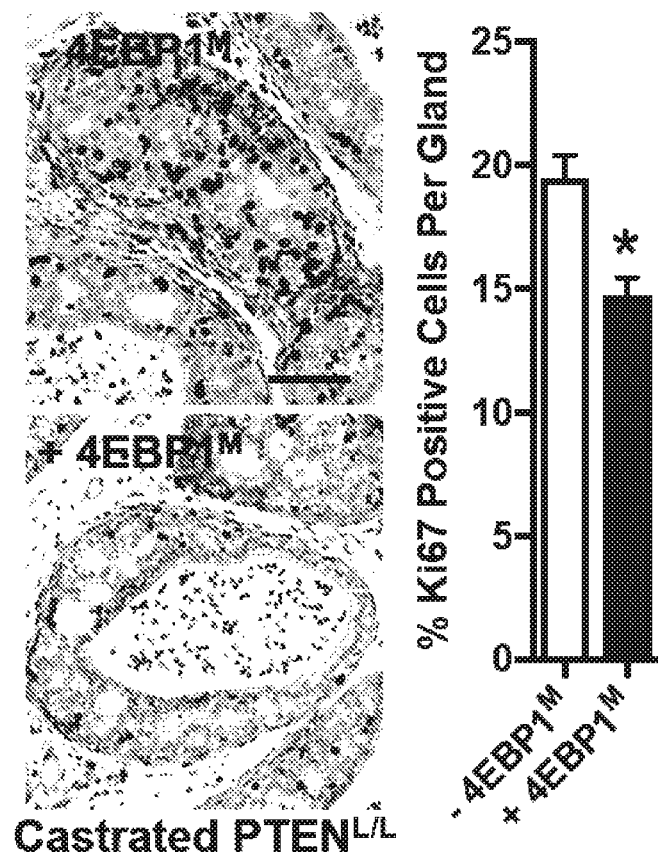

Increased eIF4F Complex Formation is Necessary for AR-Low Prostate Cancer Initiation and Progression These findings raised the question of whether the increase in eIF4F complex formation is necessary for AR-low prostate cancer pathogenesis. To test this, the $Pten^{L/L};4ebp1^M$ mouse model was used (FIG. 13C). Using the eIF4E-eIF4G proximity ligation assay, it was found that the $4EBP1^M$ decreases eIF4F complex formation by approximately 50% in vivo (FIG. 14A). A cohort of $Pten^{L/L};4ebp1^M$ mice was castrated and immediately doxycycline treatment was initiated to induce the $4EBP1^M$ (FIG. 4A). Eight weeks after induction, a decrease in tumor volumes and cell proliferation in $Pten^{L/L};4ebp1^M$ mice on doxycycline was observed (FIGS. 4B and 4C). As such, increased eIF4F complex formation drives AR-low prostate cancer initiation and enhanced cell proliferation in vivo.

Figure 4D:
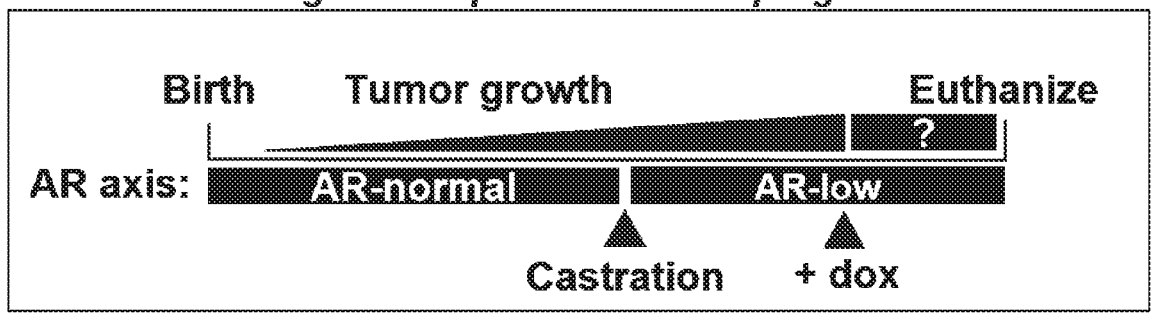
Figures 4E, 4F, 4G:
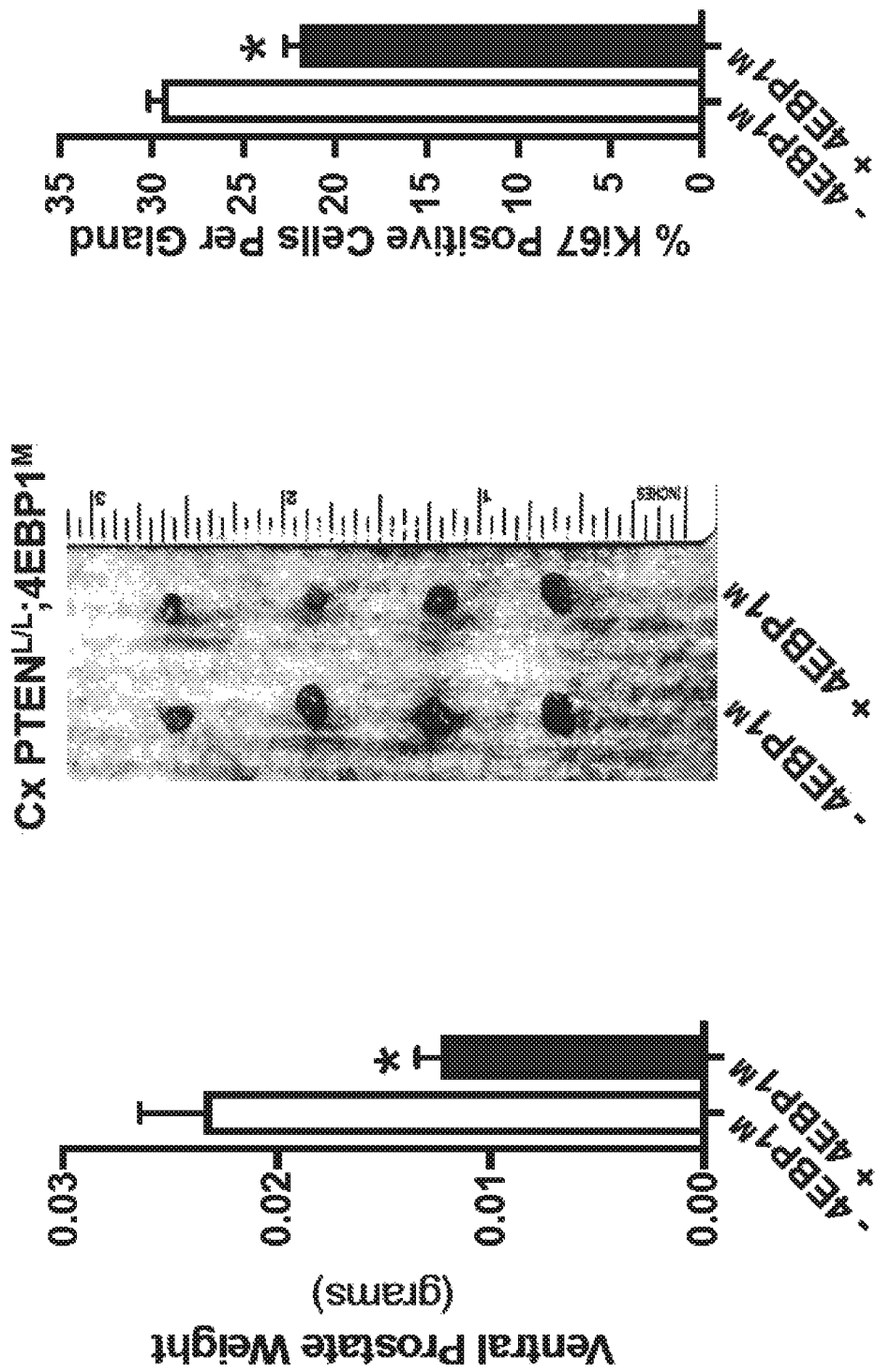

Next, it was asked if increased eIF4E-eIF4G interactions are necessary for AR-low prostate cancer progression. X $Pten^{L/L};4ebp1^M$ mice were first castrated and AR-low tumors were allowed to grow over 12 weeks. Then half the cohort was randomized onto doxycycline for 12 weeks (FIG. 4D). In this experiment, a 50% decrease in tumor weight, a decrease in cell proliferation, and a decrease in the formation of carcinoma in the doxycycline-treated group were observed (FIGS. 4E-4G, 14B, and C). Therefore, increased eIF4F complex formation also maintains the proliferative potential of established AR-low prostate cancer.

Figure 5A:
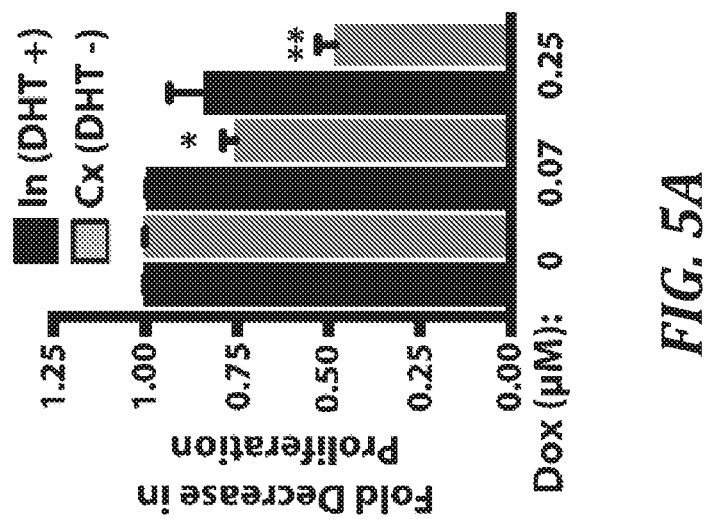
FIG. 5A-5G demonstrate that AR-low prostate cancer is more sensitive to disruption of the eIF4E-eIF4G interaction than AR-intact prostate cancer. Data presented as mean+/−SEM.

Therapeutic Disruption of the eIF4E-eIF4G Interaction in AR-Low Prostate Cancer Inhibits Tumor Growth and Extends Survival A question that arises from the findings is whether AR-low prostate cancer is more addicted to alterations of the eIF4F complex compared to AR-normal or intact prostate cancer. This has potential clinical implications, because no targeted therapies against translation regulators have been broadly efficacious in prostate cancer patients. To address this question, $Pten^{L/L};4ebp1^M$ primary cells grown with or without DHT were used. Cells were treated with doxycycline to induce $4EBP1^M$ to near equivalent expression between the intact and castrate settings (FIG. 15A). It was found that AR-low prostate cancer cell proliferation was more decreased by inhibition of eIF4F compared to AR intact cells (FIG. 5A). This increased sensitivity was also observed in vivo (FIG. 15B). As such, AR-low prostate cancer may represent an emerging subtype of treatment-resistant prostate cancer with a heightened addiction to increased eIF4E-eIF4G interactions.

Figure 5B:
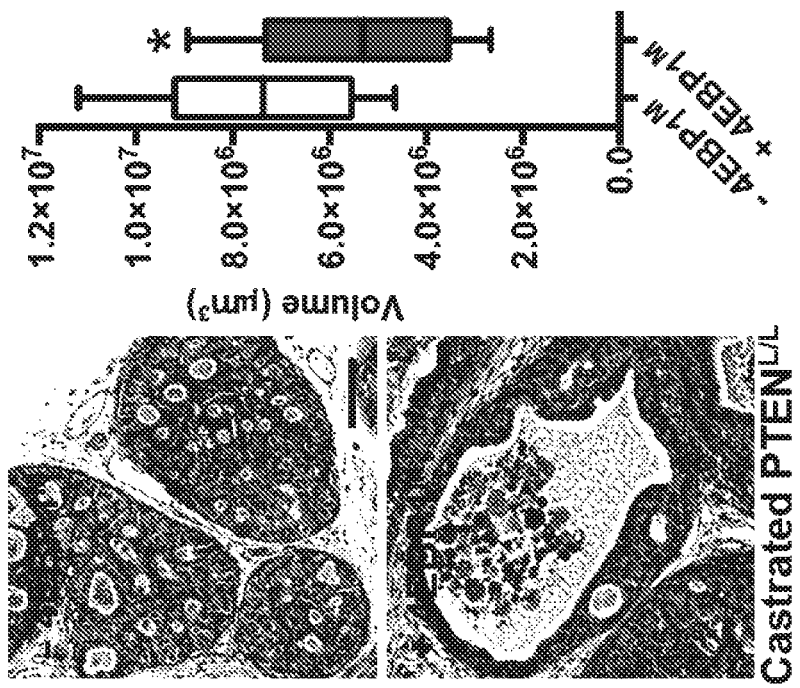
Figure 5C:
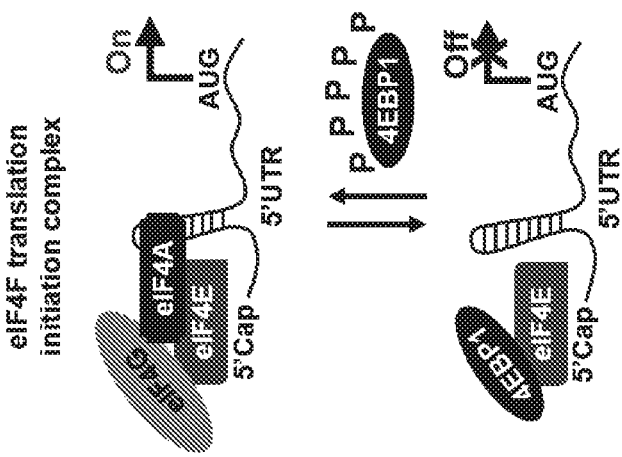
Figures 5D, 5E:
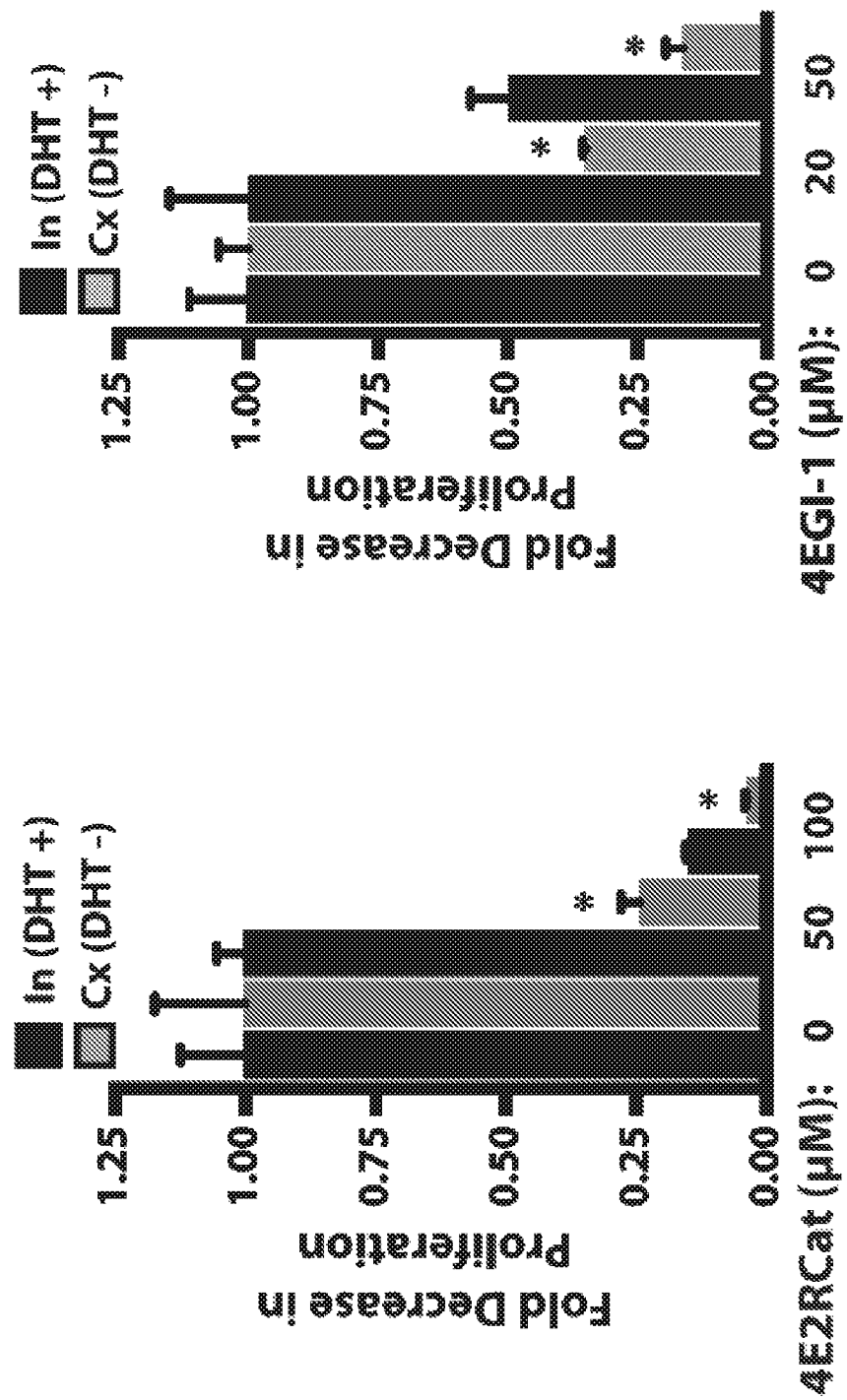
Figure 5G:
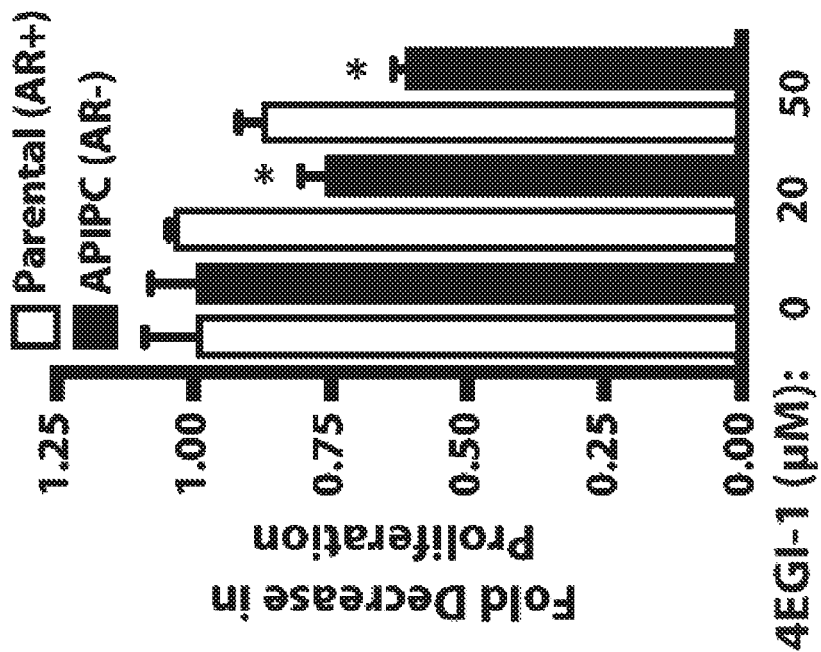
Figure 5F:
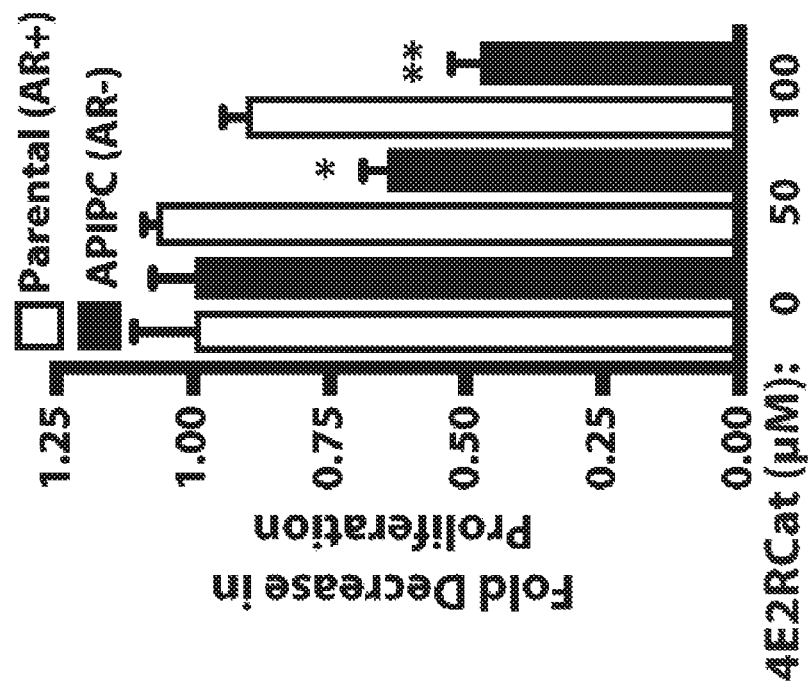

These findings confirm that the eIF4F complex is a therapeutic target in CRPC that is more functionally relevant in the context of low AR. This is further supported by the finding that end-stage CRPC patients and human CRPC PDX models exhibit lower 4EBP1 protein abundance when AR expression is low (FIGS. 1E and 5B). In contrast, the positive correlation between AR and 4EBP1 protein expression was not observed in treatment-naïve hormone-sensitive prostate cancer (HSPC) patients (FIG. 15C). To delineate the dependence on eIF4F in AR-low prostate cancer, 4E1RCat, 4E2RCat, and 4EGI-1, three small molecules that can disrupt the formation of the eIF4E-eIF4G complex, were used (FIG. 5C). It was found that drug concentrations with negligible effects on cell proliferation in primary intact (DHT+) Pten$^{L/L}$ cells induced profound changes in primary castrate (DHT−) Pten$^{L/L}$ cells (FIGS. 5D, 5E, and 16A). Next, it was determined if human prostate cancer cells exhibit a similar therapeutic profile. Parental (AR+) or APIPC (AR−) cells were treated with 4E2RCat or 4EGI-1. Similar to the findings in the murine models, AR-null APIPC cells were more sensitive to eIF4E-eIF4G disruption (FIGS. 5F, 5G, and 16B).

Figure 6D:
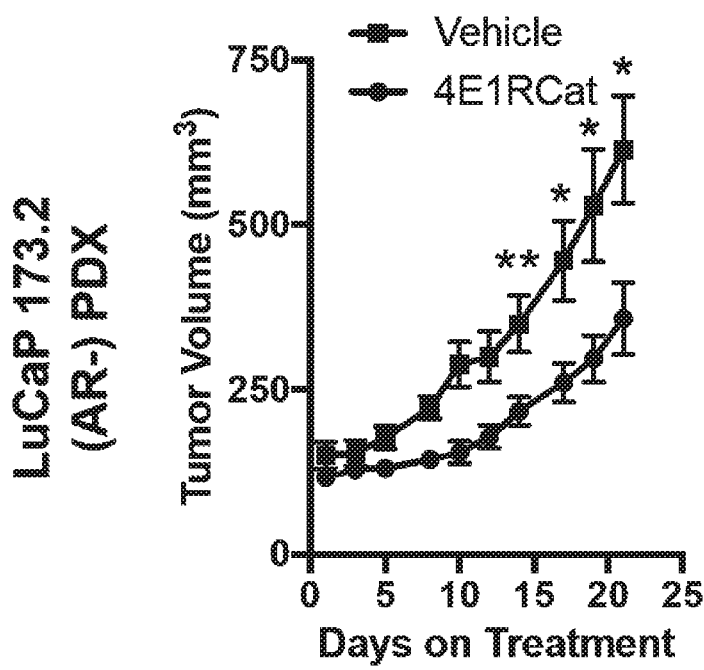
Figure 6E:
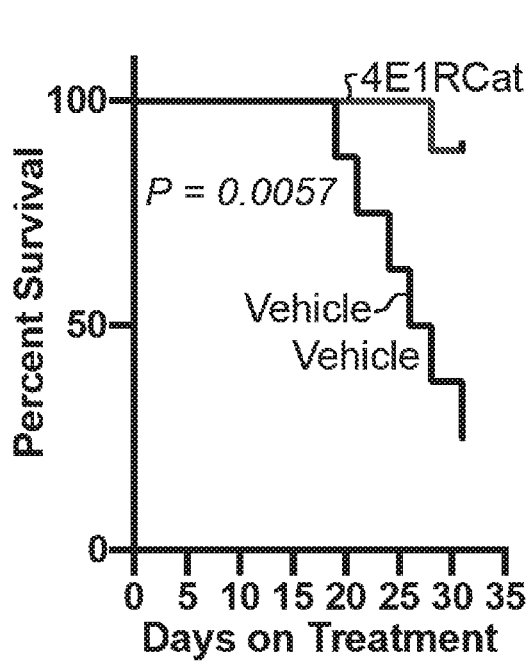
Figure 6F:
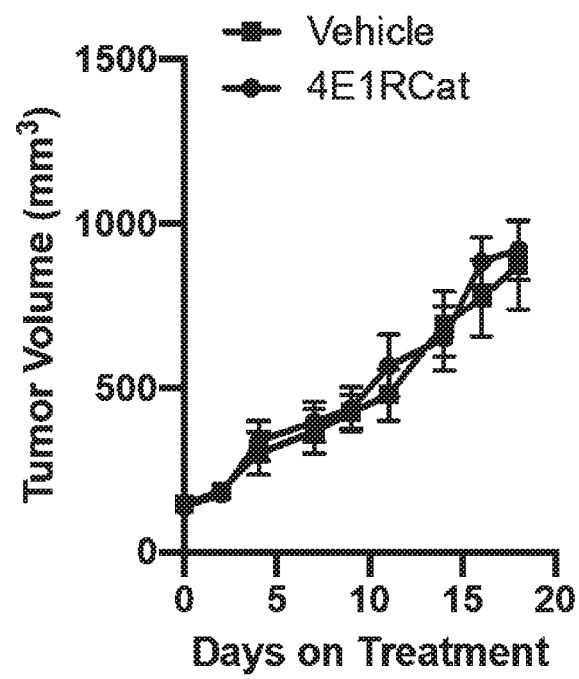

Given these promising in vitro findings, this approach was tested in in vivo models of advanced AR-low prostate cancer. Specifically, preclinical trials were conducted using 4E1RCat, an eIF4E-eIF4G disruptor with in vivo efficacy (FIG. 6A) on the APIPC xenograft model and the AR-null non-neuroendocrine LuCaP 173.2 PDX model. In both studies a marked decrease in tumor growth and improvement in survival was observed without overt toxicity to mice (FIGS. 6B-6E, 17A, and 17B). To determine if the therapeutic impact was specific to tumors with lower AR protein expression, AR+ parental APIPC xenograft mice was treated with 4E1RCat. Notably, this isogenic AR+ xenograft model was completely insensitive to the eIF4E-eIF4G disruptor (FIGS. 6F and 17C). Thus, patients with AR-deficient prostate cancer may benefit most from eIF4F complex disruption. Furthermore, eIF4F disruption may also improve the efficacy of maximal AR blockade therapies such as enzalutamide used in patients with new onset CRPC (FIGS. 17D-17F).

Discussion

Through mouse genetics and molecular analyses it is demonstrated herein that a relationship between AR signaling and translation initiation is instrumental in maintaining proteins synthesis rates in prostate cancer. In particular, AR represses protein synthesis by controlling the abundance of the translation initiation inhibitor 4EBP1 and eIF4F complex formation (FIG. 18). This conclusion is supported by the finding that AR binds to an ARE encoded within the first intron of 4ebp1 and promotes its transcription in both normal and cancerous prostates. Reduction or genetic ablation of AR impairs 4ebp1 expression, leading to a substantial increase in the pro-translation eIF4E-eIF4G complex resulting in greater translation initiation. Using the Pten$^{L/L}$; 4ebp1$^M$ mouse model, it was further demonstrated that eIF4F complex formation is essential to initiate and maintain the proliferative potential of AR-low prostate cancer. These findings are clinically relevant because the advent of potent inhibitors of AR or androgen biosynthesis over the past decade has resulted in a 2.5-fold increase of highly treatment-resistant prostate cancer characterized by AR deficiency. De-repression of translation initiation represents a bypass tract by which prostate cancers deprived of androgen signaling can maintain their proliferative potential leading to AR independence.

An important concept arising herein is that AR negatively regulates mRNA translation initiation. Without wishing to be bound by theory, one explanation is that AR promotes normal prostate epithelial cell differentiation and may use 4EBP1 to rapidly inhibit protein synthesis, cell growth, and proliferation to allow for tissue maintenance. This was partially demonstrated in prostate epithelial specific AR knockout mice, which exhibit impaired differentiation and increased cell proliferation that can be rescued through the transgenic expression of a constitutively activated AR. It remains to be determined if this phenotype is mediated by 4EBP1. Another possibility is that AR regulates metabolic homeostasis through 4EBP1. Alterations in testosterone and AR impact insulin sensitivity and energy metabolism in response to a high-fat diet. In a similar manner, 4ebp1 and 4ebp2 knockout mice phenocopy the metabolic defects seen in AR-null or low mice, and overexpression of 4EBP1 is sufficient to rescue the high fat diet-induced metabolic defects, but only in male mice. The finding that AR directly coordinates 4ebp1 expression provides a potential mechanistic basis for how hormone signaling directs tissue growth and metabolism. However, in the context of advanced enzalutamide- or abiraterone-resistant prostate cancer, low AR unleashes the translation initiation apparatus to drive previously inhibited gene networks that can be hijacked to overcome AR dependencies.

To determine the identity of the translational networks affected by a decrease in AR and an increase in eIF4F complex formation, ribosome profiling in intact and castrate Pten$^{L/L}$ mice was conducted. Despite the 30% increase in overall protein synthesis in vivo, only 697 mRNAs demonstrated an increase in translation efficiency. These findings highlight that increasing eIF4F assembly does not impact every mRNA equally and that specific mRNAs are more sensitive to changes in translation initiation dynamics. This is in part due to enrichment for the GRTE cis-regulatory element encoded within the 5' UTRs of the majority of these upregulated genes. Indeed, the Klf5 and Denr 5' UTRs have the GRTE and are sensitive to decreases in eIF4F complex formation. However, not all guanine-rich sequences are responsive to changes in eIF4F activity. For example, it was also shown that the Tcea1 5' UTR, which also encodes a guanine-rich motif but was not translationally upregulated upon castration, does not exhibit a decrease in translation when the sequence is mutated. Together, these data indicate that the surrounding sequence context of the GRTE may also play a role in eIF4F hypersensitivity. Future studies are required to substantiate this hypothesis.

In addition to this shared sequence motif, it was observed that these upregulated genes identified by ribosome profiling bin into distinct functional classes. Enrichment for a network of translationally regulated mRNAs involved in cell proliferation was found. The functional diversity of these genes reveals that eIF4F controls distinct cellular processes such as proliferation through coordinated regulation of transcription (KLF5), CDK function (CACUL1), and translation (DENR). As such, eIF4F-mediated translation enables the networking of multiple molecular modules that converge on shared cellular processes that can be usurped in the context of AR-low prostate cancer. The findings disclosed herein provide an example of how a DNA cis-element coordinates the function of a network of cis-regulatory element-containing mRNAs to drive a cellular process.

Lastly, it was shown that the eIF4E-eIF4G interaction represents a therapeutic vulnerability in AR-low prostate cancer (FIG. 18). This has clinical implications because it was observed that AR protein expression positively correlates with 4EBP1 abundance in patients with advanced stage prostate cancer, and no therapeutics targeting translation regulators have demonstrated broad clinical efficacy to date. To demonstrate this dependence, it was shown that AR-low prostate cancer is more sensitive to inhibition by the 4ebp1$^M$ transgene compared to AR-intact prostate cancer both in vitro and in vivo. Furthermore, using small molecule disruptors of the eIF4F complex, it was found that both human and murine models of AR-low prostate cancer depend on increased eIF4F complex formation to maintain their high proliferation rate more so than their AR-intact counterparts. Ultimately, targeting the eIF4F complex in human models of AR-low, but not AR-intact prostate cancer results in a decrease in tumor growth and an improvement in survival.

TABLE 1 mRNA expression of AR signature genes comparing castrate Pten$^{L/L}$ ventral prostates to intact Pten$^{L/L}$ ventral prostates.

| GENE DESCRIPTION | | edgeR | | |
|---|---|---|---|---|
| gene_symbol | entrez_id | logFC | pvalue | FDR |
| Cdo1 | 12583 | −1.563342528 | 0.004165807 | 0.085191829 |
| Msmb | 17695 | −11.67184689 | 2.66E−20 | 4.32E−17 |
| H2-Q10 | 15007 | −3.077647026 | 4.76E−10 | 1.47E−07 |
| Slc7a5 | 20539 | −0.722541949 | 0.000886544 | 0.028080781 |
| Kdelr3 | 105785 | −1.124650392 | 5.53E−05 | 0.003299381 |
| Nkx3-1 | 18095 | −5.076436493 | 5.32E−18 | 5.90E−15 |
| Fkbp5 | 14229 | −2.913668744 | 2.48E−70 | 2.02E−66 |
| Dnase1l2 | 66705 | −3.088080251 | 3.89E−51 | 2.37E−47 |
| Spink1 | 20730 | −8.304866334 | 3.67E−26 | 9.95E−23 |
| Mt2 | 17750 | −2.085890747 | 2.02E−19 | 3.08E−16 |
| Nfil3 | 18030 | −1.78429162 | 1.03E−22 | 2.28E−19 |
| Bmpr1b | 12167 | −5.149475537 | 4.71E−36 | 1.92E−32 |
| Mthfd2 | 17768 | −1.714515762 | 3.38E−13 | 1.75E−10 |
| Mt1 | 17748 | −1.042026866 | 3.69E−06 | 0.000353421 |
| Slc11a2 | 18174 | −0.723551151 | 0.000851935 | 0.027231817 |
| Apof | 103161 | −2.322452583 | 0.000117827 | 0.006007202 |
| Mme | 17380 | −1.782617492 | 2.30E−09 | 5.78E−07 |
| Sbp | 20234 | −4.962010892 | 0.000411194 | 0.015764162 |
| Arg2 | 11847 | −1.219481505 | 4.73E−07 | 6.21E−05 |
| Nans | 94181 | −0.932992305 | 3.57E−06 | 0.000348471 |

TABLE 2

Position-weighted map of the 5' UTR GRTE.

| A | C | G | T |
|---|---|---|---|
| 0.088235 | 0.036765 | 0.875 | 0 |
| 0 | 0 | 1 | 0 |
| 0.235294 | 0.764706 | 0 | 0 |
| 0.007353 | 0.044118 | 0.779412 | 0.169118 |
| 0 | 0.227941 | 0.772059 | 0 |
| 0.139706 | 0.404412 | 0.426471 | 0.029412 |
| 0.095588 | 0.051471 | 0.852941 | 0 |
| 0.029412 | 0.110294 | 0.860294 | 0 |
| 0.235294 | 0.639706 | 0.125 | 0 |
| 0 | 0.088235 | 0.816176 | 0.095588 |
| 0.007353 | 0.220588 | 0.764706 | 0.007353 |
| 0.242647 | 0.463235 | 0.279412 | 0.014706 |
| 0.110294 | 0.007353 | 0.875 | 0.007353 |
| 0.147059 | 0.25 | 0.595588 | 0.007353 |
| 0.139706 | 0.411765 | 0.419118 | 0.029412 |
| 0.110294 | 0.191176 | 0.676471 | 0.022059 |
| 0.029412 | 0.279412 | 0.661765 | 0.029412 |
| 0.176471 | 0.470588 | 0.352941 | 0 |
| 0.169118 | 0.095588 | 0.720588 | 0.014706 |
| 0.110294 | 0.191176 | 0.698529 | 0 |

TABLE 3

Primers used herein:

| Name | Sequence 5' -> 3' |
|---|---|
| primers for amplification of mouse eIF4EBP1 ARE genomic locus | |
| SEQ ID NO: 1 (mARE-F) | CCGCTCGAGCGGCCCTTGGAATAAGTGACGCCT |
| SEQ ID NO: 2 (mARE-R) | GAAGATCTTCCGGGTAGGTTTCATCAGCGT |
| primers for amplification of human eIF4EBP1 ARE genomic locus | |
| SEQ ID NO: 3 (hARE-F) | CCGCTCGAGCAGGAGAGGCCTGGCCTGG |
| SEQ ID NO: 4 (hARE-R) | GAAGATCTAGGAGCAAAAGGGGTGGGGC |
| mutagenic primers for ARE deletion from pGL4.28-mouse eIF4EBP1 ARE plasmid | |
| SEQ ID NO: 5 (mARE mutagenic-F) | GGGCCTGGGGGGCAGGGC |
| SEQ ID NO: 6 (mARE mutagenic-R) | TGCACTACACCAGACGCCGCCC |
| SEQ ID NO: 7 (Mouse 4EBP1 #1-F) | GATGAGCCTCCCATGCAA |
| SEQ ID NO: 8 (Mouse 4EBP1 #1-R) | AATGTCCATCTCAAATTGTGACTC |
| SEQ ID NO: 9 (Mouse 4EBP1 #2-F) | CTAGCCCTACCAGCGATGAG |
| SEQ ID NO: 10 (Mouse 4EBP1 #2-R) | AATTGTGACTCTTCACCGCC |
| SEQ ID NO: 11 (Mouse 4EBP1 #3-F) | GGGGTCACTAGCCCTACCAG |
| SEQ ID NO: 12 (Mouse 4EBP1 #3-R) | CAAATTGTGACTCTTCACCGCC |
| SEQ ID NO: 13 (Human 4EBP1 #1-F) | TCACCAGCCCTTCCAGTGAT |
| SEQ ID NO: 14 (Human 4EBP1 #1-R) | ACTGTGACTCTTCACCGCCC |
| SEQ ID NO: 15 (Human 4EBP1 #2-F) | GCGGGCGGTGAAGAGTCA |
| SEQ ID NO: 16 (Human 4EBP1 #2-R) | CTTGGTAGTGCTCCACACGAT |
| SEQ ID NO: 17 (Human 4EBP1 #3-F) | CCGGGAGGTACCAGGATCATCTA |

TABLE 3-continued

Primers used herein:

| Name | Sequence 5' -> 3' |
|---|---|
| SEQ ID NO: 18 (Human 4EBP1 #3-R) | CAGATCCCTTGGGGGTGTTT |
| SEQ ID NO: 19 (Mouse RPS15-F) | CATTGGTGAATTTGAGATCATTG |
| SEQ ID NO: 20 (Mouse RPS15-R) | GGGCTTATAACGCCACACTT |
| SEQ ID NO: 21 (Mouse CACUL1 (c10orf46)-F) | CTGCCTCTCAGAACCAGACC |
| SEQ ID NO:22 (Mouse CACUL1 (c10orf46)-R) | TTCATTAGGAACTTGGAGGTGGAG |
| SEQ ID NO:23 (Mouse DENR-F) | GTGGCCAGAGGTGGATGACG |
| SEQ ID NO:24 (Mouse DENR-R) | AAGTTTGCTCAGCTCTCTACCC |
| SEQ ID NO:25 (Mouse KLF5-F) | CGACGTATCCACTTCTGCGA |
| SEQ ID NO:26 (Mouse KLF5-R) | GTAGGGCTTCTCGCCCGTAT |
| SEQ ID NO:27 (Mouse GAPDH-F) | CAATGAATACGGCTACAGCAAC |
| SEQ ID NO:28 (Mouse GAPDH-R) | AGGGAGATGCTCAGTGTTGG |
| SEQ ID NO:29 (Human Actin-F) | AGACCGCGTCCGCCC |
| SEQ ID NO:30 (Human Actin-R) | ATCATCCATGGTGAGCTGGCG |

The embodiments of the invention in which an exclusive property or privilege is claimed are defined as follows:

1. A method for treatment of androgen-receptor deficient, androgen-receptor low, or castration-resistant prostate cancer, the method comprising administering to a subject in need thereof a therapeutically effective amount of an agent that disrupts eIF4F translation-initiation complexes;
   wherein the agent inhibits activity of eIF4E translation initiation factor and comprises 4-[(3E)-3-[[5-(4-nitrophenyl)furan-2-yl]methylidene]-2-oxo-5-phenylpyrrol-1-yl]benzoic acid (4E1RCat), 5-[5-[(E)-(3-Benzyl-4-oxo-2-sulfanylidene-1,3-thiazolidin-5-ylidene)methyl]furan-2-yl]-2-chlorobenzoic acid (4E2RCat), or α-[2-[4-(3,4-Dichlorophenyl)-2-thiazolyl]-hydrazinylidene]-2-nitro-benzene-propanoic acid (4EGI-1); or
   wherein the agent is an inhibitor of eIF4A and comprises silvesterol, hippuristanol, rocaglates, pateamine A, elatol, sanguinarine, elisabatin A, 15d-PGJ2, eFT226, or a combination thereof.

2. The method of claim 1, wherein the prostate cancer is androgen-receptor deficient prostate cancer.

3. The method of claim 1, wherein the method further comprises administering to the subject a therapeutically effective amount of an additional agent that is a peptide, wherein the peptide is a peptide mimetic of non-phosphorylated 4EBP1.

4. The method of claim 1, wherein the method further comprises administering to the subject a therapeutically effective amount of an androgen lowering agent, an androgen receptor blocker, or a combination thereof; wherein the androgen lowering agent is abiraterone, TAK700, buserelin, goserelin, leuproelin, degarelix, or a combination thereof; and wherein the androgen blocker is enzalutamide, bicalutamide, apalutamide, flutamide, nilutamide, finasteride, dutasteride, or a combination thereof.

5. The method of claim 4, wherein the androgen lowering agent, the androgen receptor blocker, or the combination thereof is administered prior to administration of the agent or together with administration of the agent.

* * * * *